US006532413B1

(12) United States Patent
Lee

(10) Patent No.: US 6,532,413 B1
(45) Date of Patent: Mar. 11, 2003

(54) METHOD AND APPARATUS FOR PROVIDING TIME-VARIANT GEOGRAPHICAL INFORMATION AND A USER DEVICE THEREFOR

(76) Inventor: Heung-Soo Lee, 801-17 Shiheung 4-dong, Keumcheon-ku Seoul 153-034 (KR)

( * ) Notice: Subject to any disclaimer, the term of this patent is extended or adjusted under 35 U.S.C. 154(b) by 0 days.

(21) Appl. No.: 09/787,120

(22) PCT Filed: Sep. 15, 1999

(86) PCT No.: PCT/KR99/00549

§ 371 (c)(1), (2), (4) Date: Jun. 27, 2001

(87) PCT Pub. No.: WO00/16292

PCT Pub. Date: Mar. 23, 2000

(30) Foreign Application Priority Data

Sep. 15, 1998 (KR) ........................................ 98-37971

(51) Int. Cl.[7] ........................ G06F 19/00; G08G 1/09

(52) U.S. Cl. ..................... 701/117; 701/118; 701/208; 340/995

(58) Field of Search ............................ 701/117, 118, 701/119, 208, 211; 340/990, 995

(56) References Cited

U.S. PATENT DOCUMENTS 5,757,290 A 5/1998 Watanabe et al. ........... 340/995
5,948,042 A * 9/1999 Heimann et al. ........... 701/117
6,297,748 B1 * 10/2001 Lappenbusch et al. ...... 340/905

FOREIGN PATENT DOCUMENTS

WO 95/24029 9/1995

* cited by examiner

*Primary Examiner*—Tan Q. Nguyen
(74) *Attorney, Agent, or Firm*—Finnegan, Henderson, Farabow, Garrett & Dunner, L.L.P.

(57) ABSTRACT

A method for providing an image based time-variant geographical information such as traffic information is disclosed. A method and a user device for processing this image based time-variant geographical information are also disclosed. A traffic state information composed of a map identifier and a plurality of traffic state data in section-wise is transmitted to a user device, and is to be incorporated with corresponding traffic section map(or TSM(=traffic state map)) including a plurality of sections. The traffic section map is preferably stored in a user device. Each section of traffic section map(or TSM) includes at least one vector entity which includes a shape designating statement (e.g. 'LINE') and a position designating statement. The traffic section map(or TSM) also includes a plurality of section discriminating code which is preferably an attribute designating command. The traffic state data for respective section is used to update or designate the attribute value (e.g. color) of corresponding to section's vector entity. The updated TSM is used for displaying traffic information-containing image along with at least one corresponding basic map which is also stored in the user device.

107 Claims, 47 Drawing Sheets

FIG. 1A

| SECTION NUMBER | REAL SECTION INFORMATION |
|---|---|
| 1 | P(KYODAI station), P(KANGNAM station) |
| 2 | P(KANGNAM station), P(YEOKSAM station ) |
| 3 | P(YEOKSAM station ) , P(SEONNEUNG station) |
| 4 | P(YANGKAE station), P(KANGNAM station) |
| ⋮ | ⋮ |

FIG. 1B

| SECTION NUMBER | SECTION NODE |
|---|---|
| 1 | NODE1, NODE2 |
| 2 | NODE2, NODE3 |
| 3 | NODE1, NODE3, NODE 4 |
| ⋮ | ⋮ |

FIG. 1C

| SECTION NUMBER | VECTOR ENTITY |
|---|---|
| 1 | LINE1, LINE2 |
| 2 | LINE3 |
| 3 | POINT SET1, POLY LINE1 |
| 4 | ARC1 |
| 5 | POINT SET2, LINE4, LINE5 |
| 6 | LINE6 |
| ⋮ | ⋮ |

TRAFFIC STATE INFORMATION

* SV1, SV2, SVn : SECTION VELOCITY

TRAFFIC STATE INFORMATION

TRAFFIC STATE INFORMATION

The Process at a User Device

The Process at a User Device

The Process at a User Device

The Process at a User Device

FIG. 6A

GENERATE TRAFFIC STATE MAP

Received TSI (Traffic State Information)

| 601 | 602 | 603 | 604 | |
|---|---|---|---|---|
| MAP NAME | SV1 (30km/h) | SV2 (60km/h) | SV3 (50km/h) | ••• |

FIG. 6B

Velocity-to-Color Assignment

| | |
|---|---|
| 0km/h -10km/h | Yellow |
| 11km/h -30km/h | Yellow-green |
| 31km/h -50km/h | Green |
| 51km/h -70km/h | Blue-green |
| 71km/h -90km/h | Blue |
| ⋮ | ⋮ |

EXEMPLARY FORMAT OF MAP NAME

EXEMPLARY FORMAT OF ROUTE MAP INFORMATION

EXEMPLARY FORMAT OF GPS II (GPS INDICATION INFORMATION)

EXEMPLARY FORMAT OF MAP EDIT INFORMATION

EXEMPLARY FORMAT OF EI for "insert"

EXEMPLARY FORMAT OF EI for "overwrite"

EXEMPLARY FORMAT OF EI for "delete"

EXEMPLARY FORMAT OF EI for "version"

Format of TSIEI(Traffic State Information Edit Information)

Edit data (1903) in TSIEI(TSI Edit Information) for "partial updating"

Edit data (1903) in TSI Edit Information for "Entire Updating"

*FC: Forward Color

BC: Backward Color

CDC: Color Designating Command

VE: Vector Entity

Update MASTER DATA

FIG. 24B

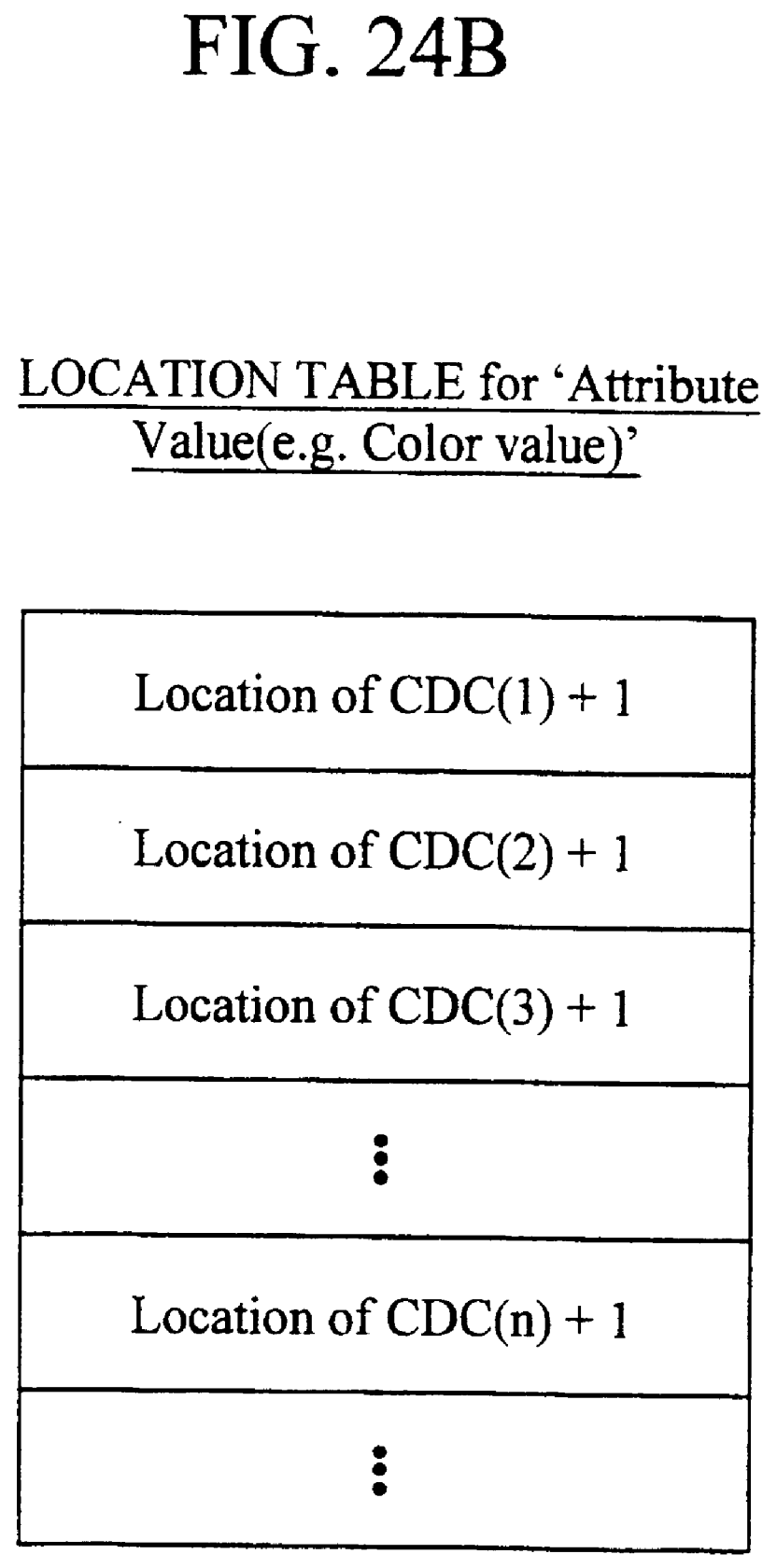

LOCATION TABLE for 'Attribute Value(e.g. Color value)'

| |
|---|
| Location of CDC(1) + 1 |
| Location of CDC(2) + 1 |
| Location of CDC(3) + 1 |
| ⋮ |
| Location of CDC(n) + 1 |
| ⋮ |

METHOD AND APPARATUS FOR PROVIDING TIME-VARIANT GEOGRAPHICAL INFORMATION AND A USER DEVICE THEREFOR

TECHNICAL FIELD

The present invention relates to a method and an apparatus for providing time-invariant geographical information such as traffic information, and more particularly to a method and apparatus for efficiently transmitting image-based time-variant geographical information. The present invention also relates to a user device for processing such time-variant geographical information so as to produce an information-containing image on a screen.

BACKGROUND ART

A time-variant traffic information is provided to a large number of people in order to disperse traffic, resulting in saving the transportation time and reducing the transportation cost.

As a method for providing traffic information to a large number of people, there are various methods for providing voice-based traffic information, text-based traffic information and image-based traffic information and the like.

The method for providing voice-based traffic information has a disadvantage that a user should spend a considerable time in acquiring the traffic information of a desired region. For example, a user should select a voice-based traffic information service and then should select a desired region following an automatic voice guide. At this time, since not only the desired regional code but also unnecessary regional code should be listened in voice as long as a user does not keep the desired regional code in mind, a large quantity of time should be spent in listening the code guide. Furthermore, when the code for region is configured in hierarchy too many levels, the access time shows a tendency to increase. Also, there is another disadvantage that a user should listen with considerable care in order to clearly know the traffic information of the desired region. The voice-based traffic information service also requires that a user should repeatedly perform the similar steps, when the user wishes to know the traffic information of an adjacent or alternative region since the desired region has heavy traffic. Thus, this method has a problem that the traffic information providing service for dispersing traffic can not be efficiently made.

Meanwhile, text-based traffic information service has an advantage that it can reduce the access time to the service compared with the voice-based traffic information service. However, the text-based traffic information service is typically provided through a communication network to a computer terminal, so that a driver may have a difficulty to exploit the service while driving. Further, the quantity of the text traffic information within a screen is limited due to the size of the LCD display of a beeper or a mobile cellular phone device, so that this type service is not efficient. Also, due to the characteristic of character, a user should read the text-based traffic information from the head to the tail to perceive the traffic information, that is the information transferability is low. Furthermore, it is undesirable that a driver reads a text-based traffic information during driving because the reading a text requires to call away driver's attention for a long time.

Finally, in the case of image-based traffic information service, it has an advantage that the service access time is reduced, as is the case of text-based traffic information service. This also has another advantage that a user can perceive the traffic information at a glance to the screen on which the traffic information is displayed, due to the characteristics of image.

However, the image-base information typically has a large quantity of data to be transmitted, compared with the voice-based traffic information or the text-based traffic information. Thus, it has a problem in transmitting/receiving data. More specifically, it requires much time in transmitting one screen image of traffic information. Accordingly, considering the sum of the time for data transmitting and the time for user's perception of the traffic information, the image-based traffic information service is not efficient compared with the above-described voice-based traffic information service or the text-based traffic information service.

There is a node-based image traffic information service as a conventional method for improving transmitting efficiency of the image-based traffic information service. However, the node-based has a problem that a number of nodes within a region, where the traffic information service is provided, should be managed. The cost for node management is so large that the image traffic information service can not be implemented.

DISCLOSURE OF INVENTION

Accordingly, the object of the present invention is to provide a method for efficiently transmitting image-based traffic information.

Another object of the present invention is to provide traffic information service method which can be implemented using a beeper, a mobile phone, a PCS (Personal Communication System) phone and so on.

Still another object of the present invention is to provide a user device for processing such traffic information.

The present invention has still other objects to provide a method for providing time-variant geographical information and a user device therefor.

The present invention also provides a data signal embodied in a carrier wave having an inventive characteristics for implementing such methods.

The present invention also provides computer-readable mediums containing a program of instructions to perform the above methods.

In accordance with one aspect of this invention, there is provided with a data signal embodied in a carrier wave, the data signal providing traffic state information to a user device which stores at least one basic map and at least one traffic section map, wherein the traffic section map includes at least one section including at least one vector entity, the data signal comprising:

a map identifier to be used for selecting a suitable traffic state map which corresponds to the traffic state information; and at least one traffic state data in section-wise, wherein each of the traffic state data is to be used for designating an attribute of the vector entity included in corresponding section of the traffic section map. The the user device may further store at least one basic map. Each section of the traffic section map may further include a section discriminating code which is preferably an attribute designating command(e.g. color designating command). In preferred embodiments, the traffic state data is a color value and the map identifier comprises a version identification.

The traffic state data for one section in TSI more preferably includes a forward color value and a backward color value.

In addition, each of the traffic state data may include a data type flag having a first value or a second value;

the first value being indicative of 'no change'; and the second value being followed by a 'changed traffic state data.'

The present invention also provides a data signal embodied in a carrier wave, the data signal providing time-variant geographical information to a user device which stores at least one section map, wherein the section map includes at least one section, the data signal comprising:

a map identifier to be used for selecting a suitable section map at the user device; and at least one time-variant value in section-wise, wherein the time-variant value is to be used for updating at least one component included in corresponding section of the section map. In preferred embodiment, the section of the section map includes at least one vector entity and the time-variant value is to be used for designating an attribute of at least one vector entity included in corresponding section of the section map.

In accordance with another aspect of the present invention, there is provided with a method for providing traffic information to a user device comprising the step of:

transmitting a TSI(=traffic state information) to the user device, wherein the user device stores at least one basic map and at least one traffic section map;

wherein the traffic section map includes at least one section including at least one vector entity; and wherein the TSI comprises:

a map identifier to be used for selecting a suitable traffic section map which corresponds to the TSI at the user device; and at least one traffic state data in section-wise, wherein each of the traffic state data is to be used for designating an attribute of the vector entity included in corresponding section of the traffic section map.

In preferred embodiments, the user device further stores at least one basic map. Each section of the traffic section map further includes a section discriminating code. The section discriminating code is prferably an attribute(e.g. color) designating command and the traffic state data is a color value.

In addition, each of the traffic state data includes a data type flag having a first value or a second value;

the first value being indicative of 'no change'; and the second value being followed by a 'changed traffic state data.'

The method for providing traffic information, may further comprise the step of:

transmitting the traffic section map; and wherein the traffic section map includes a map identification and a plurality of sections; and wherein the section of the traffic section map comprises:
an attribute designating command; and
at least one vector entity.

This method may further comprises the step of:

transmitting a MEI(=map edit information) which includes a map identification and a plurality of edit information blocks, wherein the map identification of MEI is to be used for selecting a map to be edited; and wherein each of the plurality of edit information blocks includes an edit command.

If the edit command is 'insert' command, each of the plurality of edit information block further comprises:

a start address representing an address at which an inserting is started;

a data size representing the size of data to be inserted; and at least one data to be inserted.

If the edit command is 'delete'command, each of the plurality of edit information blocks further comprises:

a start address representing an address at which an deleting is started; and a data size representing the size of data to be deleted.

If the edit command is 'overwrite' command, each of the plurality of edit information blocks further comprises:

a start address representing an address at which an overwriting is started;

a data size representing the size of data to be overwritten; and at least one data to be used for overwriting.

The method may further comprises the step of:

transmitting a basic map including a map identification and an image data, the map identification representing a region covered by the basic map.

The method may further comprises the step of:

transmitting a RII(route indication information) including a map identification and a plurality of graphic vectors;

wherein the user device stores at least one basic map including a map identification and an image data, the map identification of the basic map representing a region covered by the basic map;

wherein the map identification of RII is used for selecting at least one suitable basic map at the user device; and wherein each of the graphic vectors for RII including an attribute designating statement, a shape designating statement and a position designating statement, the attribute designating statement being composed of an attribute designating command and at least one attribute value.

Each of the traffic state data in section-wise of TSI may include a section number and at least one section value which may be color.

The present invention also provides a method for providing a geographical information to a user device including at least one map to be used for displaying an information-containing image, comprising the step of:

transmitting a MEI(=map edit information) which includes a map identification and a plurality of edit information blocks, wherein the map identification of MEI is to be used for selecting a map to be edited; and wherein each of the plurality of edit information blocks includes an edit command.

In preferred embodiments, if the edit command is 'insert' command, each of the plurality of edit information blocks further comprises:

a start address representing an address at which an inserting is started;

a data size representing the size of data to be inserted; and at least one data to be inserted, if the edit command is 'delete' command, each of the plurality of edit information blocks further comprises:

a start address representing an address at which an deleting is started; and a data size representing the size of data to be deleted, and if the edit command is ‘overwrite’ command, each of the plurality of edit information blocks further comprises:

a start address representing an address at which an overwriting is started;

a data size representing the size of data to be overwritten; and at least one data to be used for overwriting.

In accordance with still another aspect of the present invention, there is provided with a method for providing time-variant geographical information to a user device storing at least one basic map including a map identification and an image data, the map identification of the basic map representing a region covered by the basic map, comprising the step of:

transmitting a RII(route indication information) including a map identification and a plurality of graphic vectors, the RII and the basic map being used for producing an information-containing image at the user device;

wherein the map identification of RII is used for selecting at least one suitable basic map at the user device; and wherein each of the graphic vectors for RII including an attribute designating statement, a shape designating statement and a position designating statement, the attribute designating statement being composed of an attribute designating command and at least one attribute value.

The present invention also provides a method for providing a time-variant geographical information to a user device comprising the step of:

transmitting a TVI(=time-variant information) to the user device, wherein the user device stores at least one section map;

wherein the section map includes at least one section including at least one component; and wherein the TVI comprises:

a map identifier to be used for selecting a suitable section map which corresponds to the TVI, at the user device; and at least one time-variant data in section-wise, wherein each of the time-variant data is to be used for updating at least one component included in corresponding section of the section map.

In preferred embodiments, the section of the section map includes at least one vector entity, and wherein the time-variant value is to be used for designating an attribute of at least one vector entity included in corresponding section of the section map.

In accordance with still yet another aspect of the present invention, there is provided a method for processing traffic information at a user device comprising the steps of:

receiving a TSI(=traffic state information), the TSI including a map identifier and at least one traffic state data in section-wise;

retrieving at least one traffic section map in accordance with the map identifier of the TSI from a library of stored traffic section maps, wherein each of the traffic section maps includes a plurality of sections and each section includes at least one vector entity;

producing a TSM(=traffic state map) using the traffic section map and the TSI, each of the traffic state data of TSI being used for designating an attribute of the vector entity included in corresponding section of the traffic section map;

retrieving at least one BM(-basic map) in accordance with the map identifier of the TSI from a library of stored basic maps, the BM including an image data for time-invariant components in a region; and displaying a traffic-information containing image in accordance with the BM and the TSM.

The present invention also provides a method for processing traffic information at a user device comprising the steps of:

receiving a TSI(=traffic state information), the TSI including a map identifier and at least one traffic state data in section-wise;

selecting at least one TSM(=traffic state map) based on the map identifier of the TSI, wherein the TSM includes at least one section and each section of the TSM includes an attribute designating statement and at least one vector entity, the attribute designating statement including an attribute designating command and at least one attribute value;

modifying the TSM using the TSI, each of the traffic state data of TSI being used for updating the attribute value of corresponding section of the TSM;

selecting at least one BM(=basic map) based on the map identifier of the TSI, the BM including an image data for representing time-invariant components in a region; and displaying a traffic-information containing image in accordance with the BM and the TSM.

In preferred embodiments, the attribute value is color value and the method further comprises the steps of:

receiving a RII(route indication information) including a map identification and a plurality of graphic vectors, each of the graphic vectors for RII including an attribute designating statement, a shape designating statement and a position designating statement, the attribute designating statement being composed of an attribute designating command and at least one attribute value; and selecting the basic map in accordance with the map identification of the RII; and displaying a route-information containing image in accordance with the BM and the RII.

The method may further comprises the steps of:

receiving a MEI(=map edit information) which includes a map identification and a plurality of edit information blocks;

selecting one of the TSM and the BM in accordance with the map identification of MEI; and editing the selected map according to the plurality of edit information blocks.

Each of the plurality of edit information blocks preferably includes an edit command. If the edit command is an ‘insert’ command, each of the plurality of edit information blocks further comprises: a start address representing an address at which an inserting is started; a data size representing the size of data to be inserted; and at least one data to be inserted.

If the edit command is ‘delete’ command, each of the plurality of edit information blocks further comprises: a start address representing an address at which an deleting is started; and a data size representing the size of data to be deleted.

If the edit command is ‘overwrite’ command, each of the plurality of edit information blocks further comprises: a start address representing an address at which an overwriting is started; a data size representing the size of data to be overwritten; and at least one data to be used for overwriting.

In accordance with still yet another aspect of this invention, there is provided with a method for processing a route information representing at least one path to a specific location at a user device, comprising the steps of:

receiving a RII(route indication information) including a map identification and a plurality of graphic vectors, each of the graphic vectors for RII including an attribute designating statement, a shape designating statement and a position designating statement, the attribute designating statement being composed of an attribute designating command and at least one attribute value; and selecting a basic map in accordance with the map identification of the RII, the BM including an image data for representing time-invariant components in a region; and displaying a route-information containing image in accordance with the BM and the RII.

The present invention also provides a method for processing a time-variant geographical traffic information at a user device comprising the steps of: receiving a MEI(=map edit information) which includes a map identification and a plurality of edit information blocks; selecting one of a plurality of maps in accordance with the map identification of MEI, each map including an image data to be used for producing an information-containing geographical image; and editing the selected map according to the plurality of edit information blocks.

In preferred embodiments, each of the plurality of edit information blocks includes an edit command; and if the edit command is an ‘insert’ command, each of the plurality of edit information blocks further comprises: a start address representing an address at which an inserting is started; a data size representing the size of data to be inserted; and at least one data to be inserted, if the edit command is ‘delete’ command, each of the plurality of edit information blocks further comprises: a start address representing an address at which an deleting is started; and a data size representing the size of data to be deleted, and if the edit command is ‘overwrite’ command, each of the plurality of edit information blocks further comprises: a start address representing an address at which an overwriting is started; a data size representing the size of data to be overwritten; and at least one data to be used for overwriting.

In accordance with still yet another aspect of this invention, there is provided with a method for processing time-variant geographical information at a user device comprising the steps of: receiving a TVI(=time-variant information), the TVI including a map identifier and at least one time-variant data in section-wise; selecting at least one section map based on the map identifier of the TVI, wherein the section map includes a plurality of sections, each section of the section map including at least one component; designating an attribute of the component based on the time-variant data of the TVI in section-wise, so as to produce a graphic file for a region; and displaying an information-containing image in accordance with the graphic file. The component is preferably a vector entity or a position data of a point within the region.

In accordance with still yet another aspect of this invention, there is provided with traffic information device capable of being coupled to a display panel comprising: receiver for receiving a TSI(=traffic state information), the TSI including a map identifier and at least one traffic state data in section-wise; means for selecting at least one TSM (=traffic state map) based on the map identifier of the TSI, wherein the TSM includes at least one section and each section of the TSM includes an attribute designating statement and at least one vector entity, the attribute designating statement including an attribute designating command and at least one attribute value; means for modifying the TSM using the TSI, each of the traffic state data of TSI being used for updating the attribute value of corresponding section of the TSM; means for selecting at least one BM(=basic map) based on the map identifier of the TSI, the BM including an image data for representing time-invariant components in a region; means for producing traffic information-containing image data in accordance with the BM and the TSM so as to apply the traffic information-containing image data to the display panel; and memory for storing the BM and the TSM.

In preferred embodiments, the traffic information device further receives a RII(route indication information) including a map identification and a plurality of graphic vectors, each of the graphic vectors for RII including an attribute designating statement, a shape designating statement and a position designating statement, the attribute designating statement being composed of an attribute designating command and at least one attribute value; and the traffic information device further comprising: means for selecting the basic map in accordance with the map identification of the RII; and means for producing a route-information containing image in accordance with the BM and the RII to the display panel.

The traffic information device further receives a MEI(=map edit information) which includes a map identification and a plurality of edit information blocks, and the traffic information device further comprises: means for selecting one of the TSM and the BM in accordance with the map identification of MEI; and means for editing the selected map according to the plurality of edit information blocks.

Each of the plurality of edit information blocks includes an edit command; and if the edit command is an ‘insert’ command, each of the plurality of edit information blocks further comprises: a start address representing an address at which an inserting is started; a data size representing the size of data to be inserted; and at least one data to be inserted, if the edit command is ‘delete’ command, each of the plurality of edit information blocks further comprises: a start address representing an address at which an deleting is started; and a data size representing the size of data to be deleted, and if the edit command is ‘overwrite’ command, each of the plurality of edit information blocks further comprises: a start address representing an address at which an overwriting is started; a data size representing the size of data to be overwritten; and at least one data to be used for overwriting.

In accordance with still yet another aspect of this invention, there is provided with time-variant geographical information device capable of being coupled to a display panel, comprising:

a receiver for receiving a RII(route indication information) including a map identification and a plurality of graphic vectors, each of the graphic vectors for RII including an attribute designating statement, a shape designating statement and a position designating statement, the attribute designating statement being composed of an attribute designating command and at least one attribute value;

a memory for storing at least one BM(=basic map), the BM including an image data for representing time-invariant components in a region;

means for selecting a basic map in accordance with the map identification of the RII; and means for producing a route-information containing image in accordance with the BM and the RII, the route information-containing image representing at least one path to a specific location.

The present invention also provides time-variant geographical information device capable of being coupled to a diaplay panel, comprising: receiver a MEI(=map edit information) which includes a map identification and a plurality of edit information blocks; memory for storing a plurality of maps, each map including an image data to be used for producing an information-containing geographical image; means for selecting one of the plurality of maps in accordance with the map identification of MEI; and means for editing the selected map according to the plurality of edit information blocks.

In preferred embodiments, each of the plurality of edit information blocks includes an edit command; and if the edit command is an 'insert' command, each of the plurality of edit information blocks further comprises: a start address representing an address at which an inserting is started; a data size representing the size of data to be inserted; and at least one data to be inserted, if the edit command is 'delete' command, each of the plurality of edit information blocks further comprises: a start address representing an address at which an deleting is started; and a data size representing the size of data to be deleted, and if the edit command is 'overwrite' command, each of the plurality of edit information blocks further comprises: a start address representing an address at which an overwriting is started; a data size representing the size of data to be overwritten; and at least one data to be used for overwriting.

The present invention also provides time-variant geographical information device capable of being coupled to a display panel comprising:

receiver a TVI(=time-variant information), the TVI including a map identifier and at least one time-variant data in section-wise;

means for selecting at least one section map based on the map identifier of the TVI, wherein the section map includes a plurality of sections, each section of the section map including at least one component;

means for designating an attribute of the component based on the time-variant data of the TVI in section-wise, so as to produce a graphic file for a region; and means for producing an information-containing image in accordance with the graphic file, so as to apply the information-containing image data to the display panel.

In preferred embodiments, the component is vector entity or a position data of a point within the region.

In accordance with still yet another aspect of this invention, there is provided with time-variant geographical information device capable of being coupled to a display panel, comprising:

a receiver for receiving a PII(Position indication information) including a map identification, at least one position vector entity and at least one text vector entity;

a memory for storing at least one BM(=basic map), the BM including an image data for representing time-invariant components in a region;

means for selecting a basic map in accordance with the map identification of the PII; and means for producing a position-indicative-information containing image data in accordance with the BM and the PII, so as to apply the position-indicative-information containing image data to the display panel.

The present invention also provides a computer-readable medium containing a program for processing traffic information, comprising the steps of: receiving a TSI(=traffic state information), the TSI including a map identifier and at least one traffic state data in section-wise; retrieving at least one traffic section map in accordance with the map identifier of the TSI from a library of stored traffic section maps, wherein each of the traffic section maps includes a plurality of sections and each section includes at least one vector entity; producing a TSM(=traffic state map) using the traffic section map and the TSI, each of the traffic state data of TSI being used for designating an attribute of the vector entity included in corresponding section of the traffic section map; retrieving at least one BM(=basic map) in accordance with the map identifier of the TSI from a library of stored basic maps, the BM including an image data for time-invariant components in a region; and producing a traffic-information containing image data in accordance with the BM and the TSM, the traffic-information containing image data being to be applied to a display panel.

In addition, the present invention provides a computer-readable medium containing a program of instructions to perform a method for processing traffic information, the method comprising the steps of: receiving a TSI(=traffic state information), the TSI including a map identifier and at least one traffic state data in section-wise; retrieving at least one TSM(=traffic state map) based on the map identifier of the TSI from a library of stored TSMs, wherein the TSM includes at least one section and each section of the TSM includes an attribute designating statement and at least one vector entity, the attribute designating statement including an attribute designating command and at least one attribute value; modifying the TSM using the TSI, each of the traffic state data of TSI being used for updating the attribute value of corresponding section of the TSM; retrieving at least one BM(=basic map) based on the map identifier of the TSI from a library of stored BMs, the BM including an image data for -representing time-invariant components in a region; and producing a traffic-information containing image data in accordance with the BM and the TSM, which is to be applied to a display panel.

The present invention also provides a computer-readable medium containing a program of instructions to perform a method for processing a route information representing at least one path to a specific location, the method comprising the steps of: receiving a RII(route indication information) including a map identification and a plurality of graphic vectors, each of the graphic vectors for RII including an attribute designating statement, a shape designating statement and a position designating statement, the attribute designating statement being composed of an attribute designating command and at least one attribute value; and selecting a basic map in accordance with the map identification of the RII, the BM including an image data for representing time-invariant components in a region; and producing a route-information containing image data in accordance with the BM and the RII which is to be applied to a display panel.

The present invention also provides a computer-readable medium containing a program of instructions to perform a method for a time-variant geographical traffic information, the method comprising the steps of: receiving a MEI(=map edit information) which includes a map identification and a plurality of edit information blocks; selecting one of a plurality of maps in accordance with the map identification of MEI, each map including an image data to be used for producing an information-containing geographical image; and editing the selected map according to the plurality of edit information blocks.

The present invention also provides a computer-readable medium containing a program of instructions to perform a method for a time-variant geographical traffic information, the method comprising the steps of: receiving a TVI(=time-variant information), the TVI including a map identifier and at least one time-variant data in section-wise; selecting at least one section map based on the map identifier of the TVI, wherein the section map includes a plurality of sections, each section of the section map including at least one component; designating an attribute of the component based on the time-variant data of the TVI in section-wise, so as to produce a graphic file for a region; and producing an information-containing image data in accordance with the graphic file, which is to be applied to a display panel.

The present invention also provides a method for providing time-variant geographical information to a user device storing at least one basic map including a map identification and an image data, the map identification of the basic map representing a region covered by the basic map, comprising the step of: transmitting a PII(position indication information) including a map identification, at least one position vector entity and at least one text vector entity, to the user device, wherein the map identification of PII is used for selecting at least one suitable basic map at the user device; and wherein the user device displays a position-indicative-information containing image in accordance with the selected BM and the PII.

The present invention also provides a method for processing time-variant geographical information at a user device comprising the steps of: receiving a PII(Position indication information) including a map identification, at least one position vector entity and at least one text vector entity; selecting a basic map in accordance with the map identification of the PII from a library of stored BM(=basic map)s, each of the BM including an image data for representing time-invariant components in a region; and producing a position-indicative-information containing image data in accordance with the selected BM and the PII, which is to be applied to a display panel coupled to the user device.

The present invention also provides a computer-readable medium containing a program of instructions to perform a method for processing time-variant geographical information, the method comprising the steps of: receiving a PII(Position indication information) including a map identification, at least one position vector entity and at least one text vector entity; retrieving a basic map in accordance with the map identification of the PII from a library of stored BM(=basic map)s, each of the BM including an image data for representing time-invariant components in a region; and producing a position-indicative-information containing image data in accordance with the selected BM and the PII, which is to be applied to a display panel coupled to the user device.

In accordance with still yet another aspect of the invention, there is provided with an apparatus for providing traffic information through a network to a user device comprising: means for generating a TSI(=traffic state information) so as to provide the TSI to the user device, wherein the user device stores at least one basic map and at least one traffic section map; wherein the traffic section map includes at least one section including at least one vector entity; and wherein the TSI comprises:

a map identifier to be used for selecting a suitable traffic section map which corresponds to the TSI at the user device; and at least one traffic state data in section-wise, wherein each of the traffic state data is to be used for designating an attribute of the vector entity included in corresponding section of the traffic section map.

In preferred embodiments, the apparatus further comprises means for generating the traffic section map so as to provide the traffic section map to the user device through the network. Here, the traffic section map includes a map identification and a plurality of sections and the section of the traffic section map comprises an attribute designating command; and at least one vector entity. Also, the apparatus may further comprise means for generating a basic map including a map identification and an image data, so as to provide the basic map to the user device through the network, wherein the map identification representing a region covered by the basic map.

The apparatus may further comprises: means for generating a RII(route indication information) including a map identification and a plurality of graphic vectors, so as to provide the RII to the user device through the network. At this time, the user device stores at least one basic map including a map identification and an image data, the map identification of the basic map representing a region covered by the basic map. The map identification of RII is used for selecting at least one suitable basic map at the user device. Also each of the graphic vectors for RII including an attribute designating statement, a shape designating statement and a position designating statement, the attribute designating statement being composed of an attribute designating command and at least one attribute value.

The present invention also provides an apparatus for providing a geographical information to a user device including at least one map to be used for displaying an information-containing image, comprising: means for generating a MEI(=map edit information) which includes a map identification and a plurality of edit information blocks, so as to provide the MEI to the user device through a network. Here, the map identification of MEI is to be used for selecting a map to be edited; and each of the plurality of edit information blocks includes an edit command.

The present invention also provides an apparatus for providing time-variant geographical information to a user device storing at least one basic map including a map identification and an image data, the map identification of the basic map representing a region covered by the basic map, comprising: means for generating a RII(route indication information) including a map identification and a plurality of graphic vectors, so as to provide the RII to the user device through a network, the RII and the basic map being used for producing an information-containing image at the user device. At this time, the map identification of RII is used for selecting at least one suitable basic map at the user device; and each of the graphic vectors for RII including an attribute designating statement, a shape designating statement and a position designating statement, the attribute designating statement being composed of an attribute designating command and at least one attribute value.

The present invention also provides an apparatus for providing a time-variant geographical information to a user device through a network, comprising: means for generating a TVI(=time-variant information) so as to provide the TVI to the user device, wherein the user device stores at least one section map.

Here, the section map includes at least one section including at least one component. Also the TVI comprises: a map identifier to be used for selecting a suitable section map which corresponds to the TVI, at the user device; and at least one time-variant data in section-wise, wherein each of the time-variant data is to be used for updating at least one component included in corresponding section of the section map.

BRIEF DESCRIPTION OF DRAWINGS

For a more complete understanding of the present invention and for further features and advantages, reference is now made to the following description taken in conjunction with the accompanying drawings, wherein like reference numerals represent like parts, in which:

FIGS. 1A–1C are schematic diagrams for explaining the section adopted by the method for providing image-based traffic information in accordance with the present invention;

FIGS. 6A–6C are the diagrams for explaining the TSM generating process at a user device of the present invention;

FIG. 11B is a diagram for explaining an exemplary configuration of the reference coordinate and the map length of FIG. 10;

FIG. 24B represents an exemplary LOCATION TABLE for 'Attribute Value' available for the alternative updating method;

BEST MODE FOR CARRYING OUT THE INVENTION

Figure 2A:
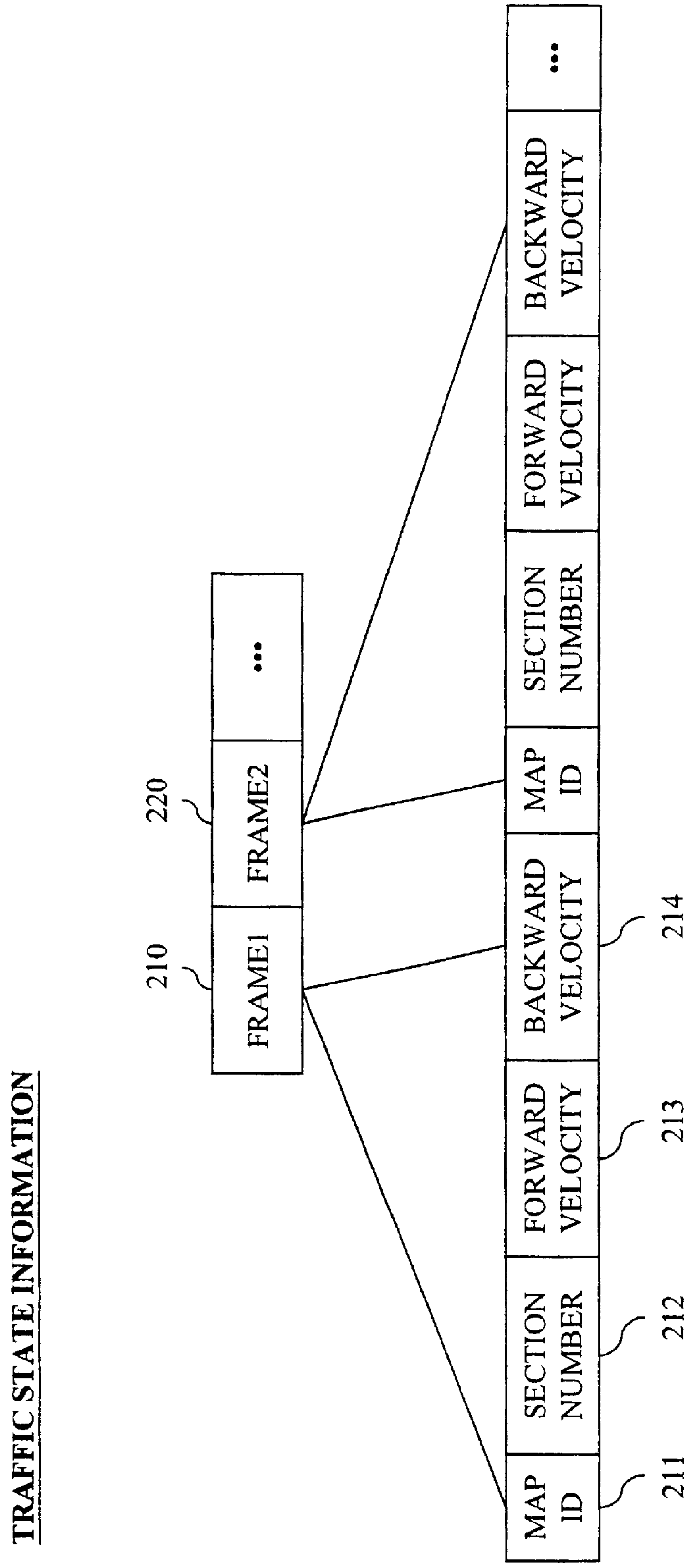
FIGS. 2A–2I illustrate exemplary formats of TSI(Traffic State Information) of the present invention.

FIGS. 1A to 1C are diagrams of section table, which illustrate the concept of 'section' of the present invention. The 'section number' is preferably a serial number in these drawings. Further, for reducing the bit required for representing the 'section number', it is preferable that the section number should be renewed for respective maps.

First, referring to FIG. 1A, the section informations for describing sections (e. g. position (coordinate or node)) are stored, corresponding to the section numbers. This section table is preferably stored within a user device (especially in a user traffic information device. The section number is preferably a serial number. In this case, the section number may not be stored in the section table.

A method for providing traffic information using a section table as shown in FIG. 1A, will be explained.

A traffic information provider sends section numbers along with corresponding traffic state information to a user device. Then, the user device retrieves the corresponding section positions from the section table using the received section number. Here, the section may be a line whose starting and ending points are the section positions. Subsequently the traffic information device displays traffic information image on a display panel such as LCD panel, using the retrieved section nodes and corresponding traffic state information.

By transmitting traffic state information along with corresponding section number, it is possible that traffic state information for not all sections but a part of sections should be transmitted. Thus, this method is suitable for transmitting only the traffic state information of updated sections, instead of transmitting that of all sections.

Another method is disclosed that the traffic state information for all sections without section numbers are serially transmitted. In this case, the user device assigns the traffic state information to corresponding section as it is received to form a traffic state map, and displays an image of traffic information on a screen thereof based on the traffic state map. This method eliminates the necessity of transmitting the section number, thereby reducing the time in occupying the frequency band for transmitting the traffic information. Also, this method is so useful when all traffic state data for all sections in a region are required for serving to a user device, as is the case of first providing traffic information for the region to the user device.

Referring to FIG. 1B, the section table includes a plurality of section nodes which are accessed by means of corresponding section number. A section may be composed of a line whose initial point, (middle point) and final point are determined by corresponding section nodes, respectively. Thus, in this method, for designating one road component, only one section number is required for being transmitted, which is different from the conventional node-based traffic information service where at least two node numbers should be transmitted for designating one road component. In other words, the traffic information provider sends section state information along with corresponding section number to a user device and the user device converts the section number into corresponding nodes so as to display an image of traffic information on a screen based on the converted nodes and the received traffic state information. The section table shown in FIG. 1B is preferably stored in traffic information provider and a user device. Here, the section number may be omitted as long as they have some regularity (such as serial number).

Also, when the traffic state information for all sections is transmitted to a user device, the traffic information provider may send only the traffic state information for all sections in sequential without any section number, like the case of FIG. 1A. At this time, at the user device the received traffic state information are assigned to corresponding section and an image of traffic information is displayed on a display panel in accordance with the section nodes and received traffic state information.

In the case of using section number as that of FIGS. 1A and 1B, only one section number is required to be transmitted for designating one section on a map, instead of transmitting section starting point and section ending point, so that the transmitted data quantity is reduced to half Furthermore, the transmitted data quantity is still more reduced because only traffic state information for all section in a region (or map) without any section number will be sequentially transmitted. Thus, the frequency occupying time (or the channel occupying time) required for transmitting traffic information is much reduced.

The method for sending traffic state data along with section number or node numbers has the data quantity proportional to 'n·log n' ('n' represents the number of sections or the number of nodes included in a region(or map)) but the method for sequentially sending only traffic state data for all sections has the data quantity proportional to 'n.' Thus, the more the sections is in a region, the more the data quantity is reduced in the latter method, compared with the former method.

Typically 12–28% of the sections of a region varies in traffic information, when the region includes 10000 or more sections. When the ratio of sections having changed traffic information is roughly less than 28%, it is preferable that the traffic state data along with corresponding section number should be send to the user device.

Referring to the section table shown in FIG. 1C, a section includes at least one vector entity. The section number is preferably sequential number and the vector entity includes a graphic command such as LINE1, POINT SET1, ARC1, POLYLINE1 or the like each of which represents one road component included in corresponding section. Preferably, the graphic command of a vector entity may be composed of a shape designating statement(e. g. 'LINE') and a position designating statement(e. g. 'position 1, position 2'). Also, the vector entity may further include an attribute designating statement.

The road component of this invention represents a part of or the entire of a road, which is time-variant. For example, the road from KANG-NAM station to YEOK-SAM station can be assigned to one road component or to one section. The accuracy of the traffic information and the data quantity of the traffic state map may vary on how much small the road component is made. In addition, they vary on how many road components in a section are included. For example, if one section includes only one road components, not only the accuracy of traffic information but also the data quantity of the traffic state map are increased. Thus, vector entities having the same traffic flow are preferably assigned to one section.

In accordance with one preferred embodiment of the present invention, the sections are preferably designed such that they are the same with the road units of the traffic information collector (e. g. the Korea Road Traffic Safety Association) for data compatibility.

It is also possible that the section table shown in FIG. 1C may not be stored within a user device. The detailed description for this will be made later.

Prior to the explanation of the exemplary data formats of the present invention, some items in this specification will be defined as follows. However, the meaning of these items are not limited to the following but they also includes the ordinary meaning used in this art. 'BM(Basic Map)': is a time-invariant image of a region, which may be a bit-map image and preferably may be a vector-based image. A vector-based image of basic map includes time-invariant vector entities in a region, wherein each of time-invariant vector entities represents a part or the entire of a real entity (e. g. a river, a building, a mountain, a boundary line and so on). Here, each time-invariant vector entity may represent the shape or the name of a real entity.

In accordance with one preferred embodiment of the present invention, the vector entities in the basic map can be represented by VTX format.

Thus-described basic map may be stored in a memory to be mounted into a user device at manufacturing stage. The basic map is stored in a non-volatile memory such as a flash memory, or CD-ROM to be incorporated within a user device. More preferably, the basic map is stored in a re-writable non-volatile memory such as flash memory.

'Traffic Section Map': includes a plurality of sections in a region, for which traffic information service is performed. In similar to the case of basic map, traffic section maps can be stored in a re-writable memory such as flash memory, preferably at manufacturing stage of a user device.

'TSI(Traffic State Information)': includes a plurality of traffic state data corresponding to a plurality of sections included in a traffic section map. In one preferred embodiment of the present invention, the vector entity of a section may includes an attribute designating statement, which represents the traffic state data of the section. For example, the color of a vector entity, a line type or a line thickness of vector entity and so on can be used as the attribute designating statement. The color of a vector entity is much preferable since the perceptibility of color is much better than any other attribute.

The colors are preferably pre-assigned to respective velocity ranges and the color-velocity table can be stored in a non-volatile memory such as ROM, flash memory or CD-ROM at manufacturing stage of a user device.

'TSM(Traffic State Map)': is made by incorporating the traffic state data into the traffic section map. That is, TSM is considered as a specific traffic section map. A traffic state map can be transmitted from traffic information provider to a user device. Otherwise, a traffic state map can be stored in a memory at manufacturing stage of a user device, in which the attribute designating statements of sections may be set as default values. Here, the memory for storing the traffic state map is preferably a re-writable non-volatile memory such as flash memory. In the case where a traffic state map is included in a user device at manufacturing stage, the user device may receive traffic state information so as to update the traffic state map when required.

FIGS. 2A–2I illustrate exemplary formats of TSI(Traffic State Information) of the present invention.

Referring to FIG. 2A, the traffic state information includes a plurality of frames 210 and 220, each of which includes a map ID 211, a section ID 212, at least one traffic state data (e. g. forward velocity 213, backward velocity 214) as section value.

The map ID (or map name) 211 is an alphanumeric code unique to each map and the section ID is preferably a numeric code unique to each section corresponding to the traffic state data included in the frame. As the traffic state data, the forward velocity 213 is indicative of the velocity in the forward direction of the road component and the backward velocity 214 is indicative of the velocity in the backward direction of the road component. Here, one road component in a map can be represented by two parts: forward part and backward part. In one preferred embodiment, the vector entity for road component is preferably indicative of right side thereof or vice versa. In FIG. 2, the forward velocity 213 and the backward velocity 214 represents the velocities in forward and backward directions on the road components, respectively.

Figure 2B:
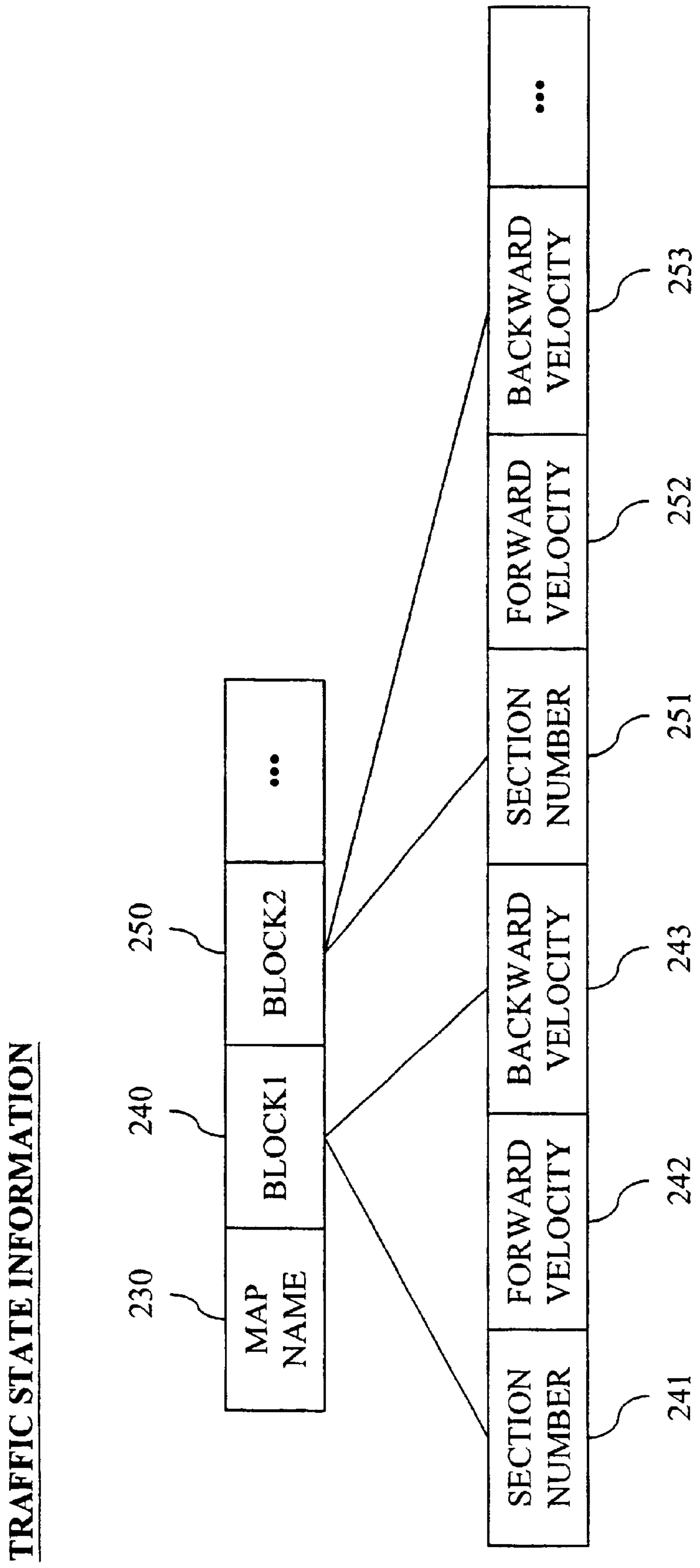

FIG. 2B is a diagram indicative of another exemplary data format for traffic state information in the traffic information providing method of this invention.

Referring to FIG. 2B, the data.format for traffic state information is composed of a map name 230, a plurality of blocks 240, 250 and etc. Each block 240 may be composed of a section ID 241, a forward velocity 242 and a backward velocity 243, each of which is indicative of the same as in FIG. 2A. Here, the forward velocity 242 and the backward velocity 243 are to be referred to as section values in claims.

In the case of FIG. 2B, the transmission efficiency is advantageously increased, compared with that in FIG. 2A, since the number of map ID transmission is dramatically reduced.

Figure 2C:
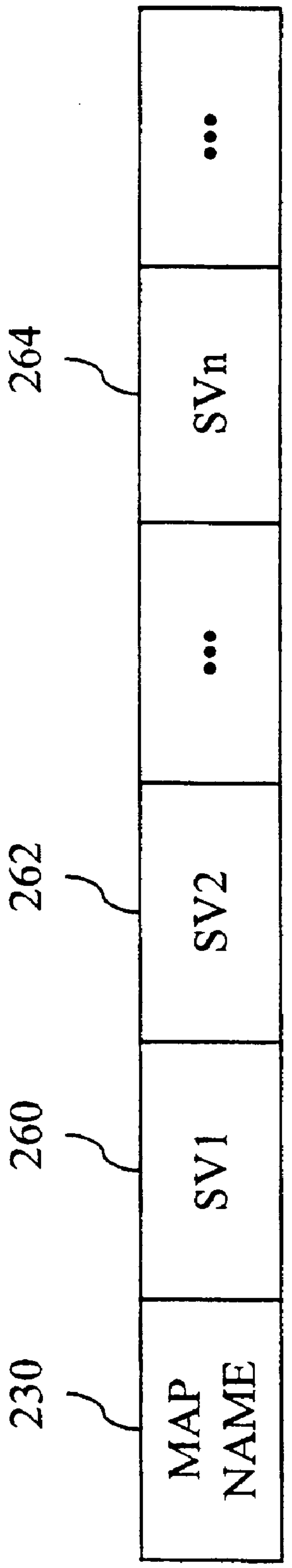

In FIG. 2C, TSI(Traffic state Information) is composed of a map name (or map ID) 230 and a plurality of section velocities 260, 262 and 264. SV1 represents the velocity at the first section, SV2 represents the velocity at the second section and the SVn represents the velocity at the n-th section. Here, the Map Name 230 would not be sent for respective section but be sent only one time for the map. This format is beneficial for the case that the traffic state information for all the sections in the map would be sent all at once. In this case, the information about the map can be obtained from the map name 230.

Figure 2D:
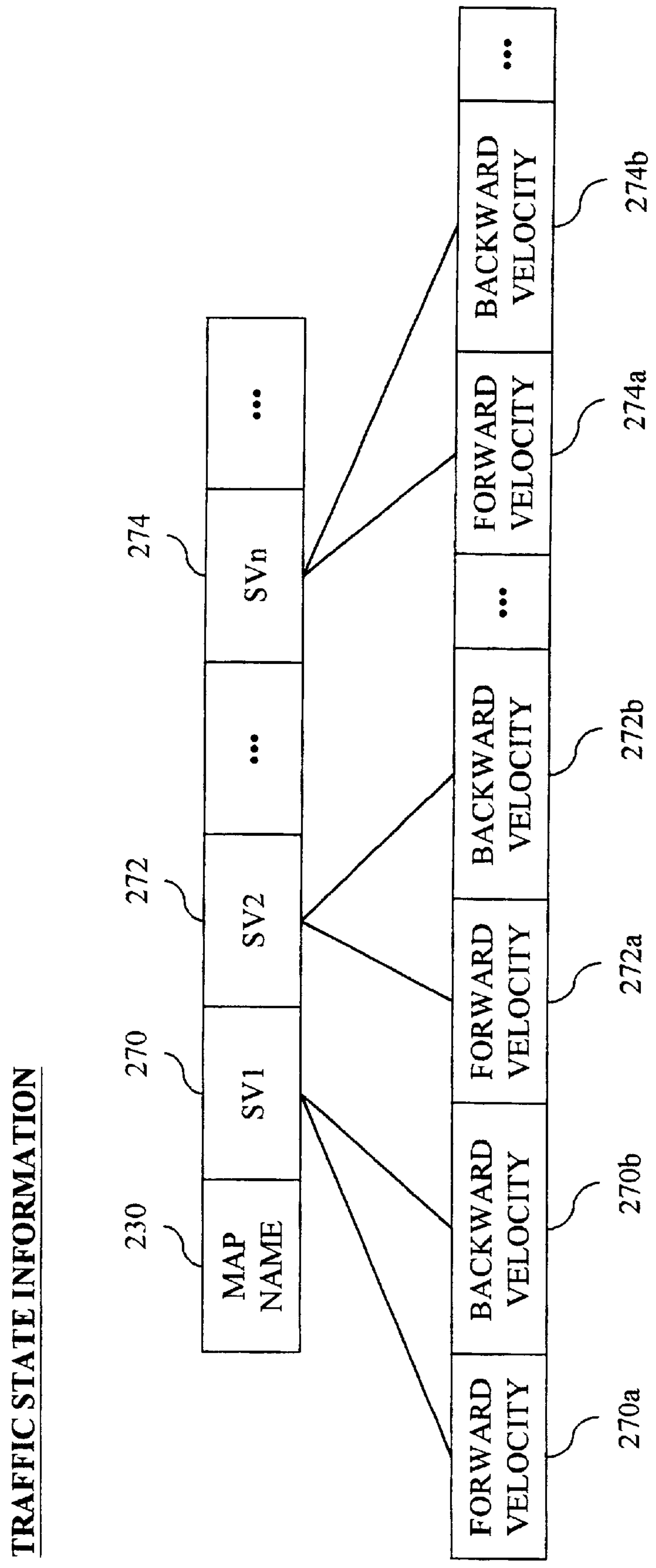

Referring to FIG. 2D, TSI includes a Map Name 230 and a plurality of section velocities 270, 272 and 274, in which each section velocity is composed of a forward velocity 270*a*, 272*a* or 274*a* and a backward velocity 270*b*, 272*b* or 274*b*.

In the TSI of FIG. 2D, the SVs(section velocities) have a predetermined data length and are in order of section number. As shown in this figure, since any section number is not sent to a user device from traffic information provider(i. e. traffic information providing server), the occupancy time in communication channel is decreased.

The TSIs of FIGS. 2E–2I may be related to the section as shown in FIG. 1C. In other words, when a SECTION can be represented by at least one vector entity, these TSIs can be used. The attribute values (e. g. color) have predetermined relationship with the ranges of velocity.

Figure 2E:
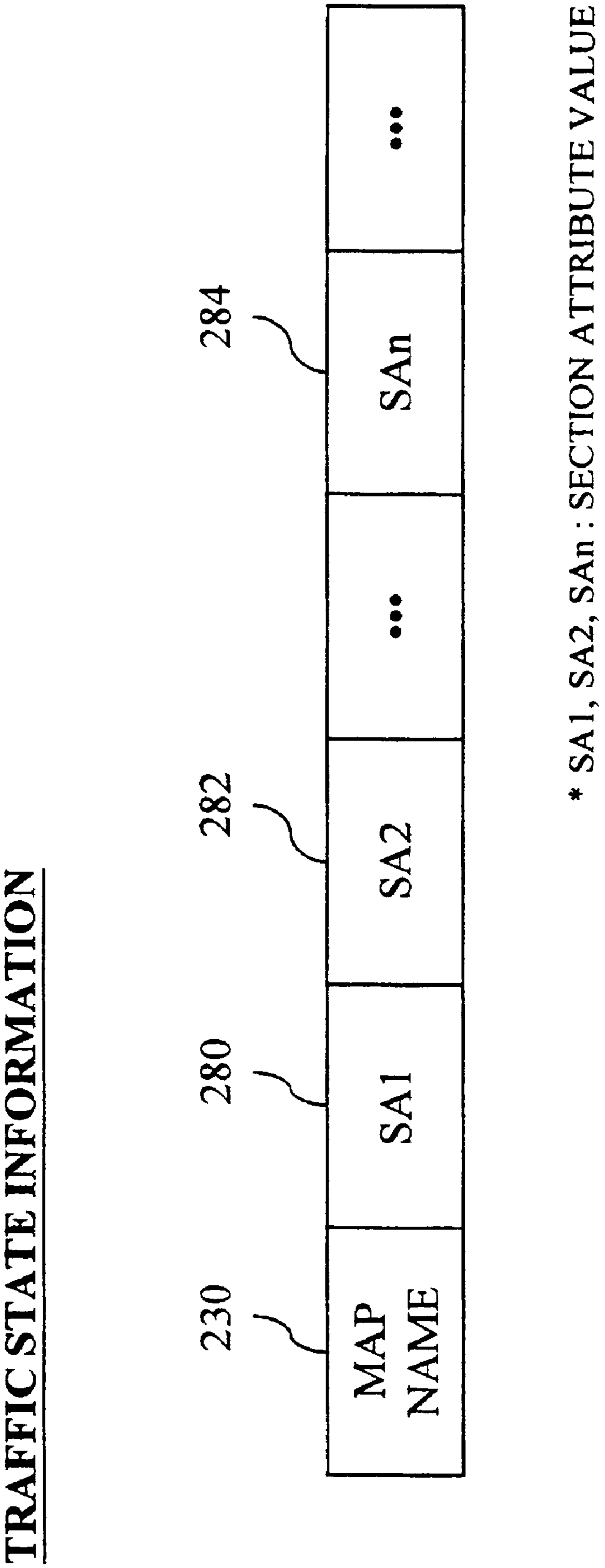

Referring to FIG. 2E, TSI includes a Map Name 230 and a plurality of SAs(Section Attribute values) 280, 282 and 284. A SA represents the attribute such as line thickness, line type or line pattern of the vector entity of corresponding section. SA1 means the attribute value of the first section in the map, SA2 means the attribute value of the second section and SAn means the attribute value of the n-th section.

Figure 2F:
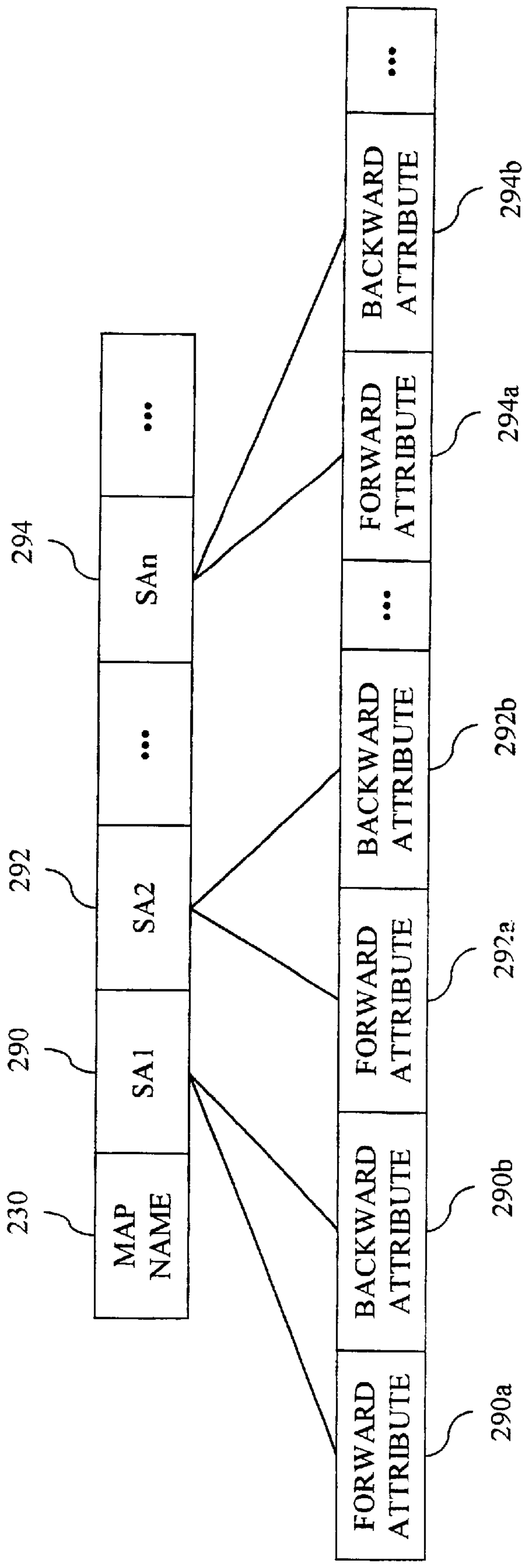

In FIG. 2F, each SA includes two attribute values: a forward attribute value and a backward attribute value. SA1 290 is composed of forward attribute 290*a* and 290*b*; SA2 292 is composed of forward attribute 292*a* and 292*b*; and SAn 294 is composed of forward attribute 294*a* and 294*b*.

Figure 2G:
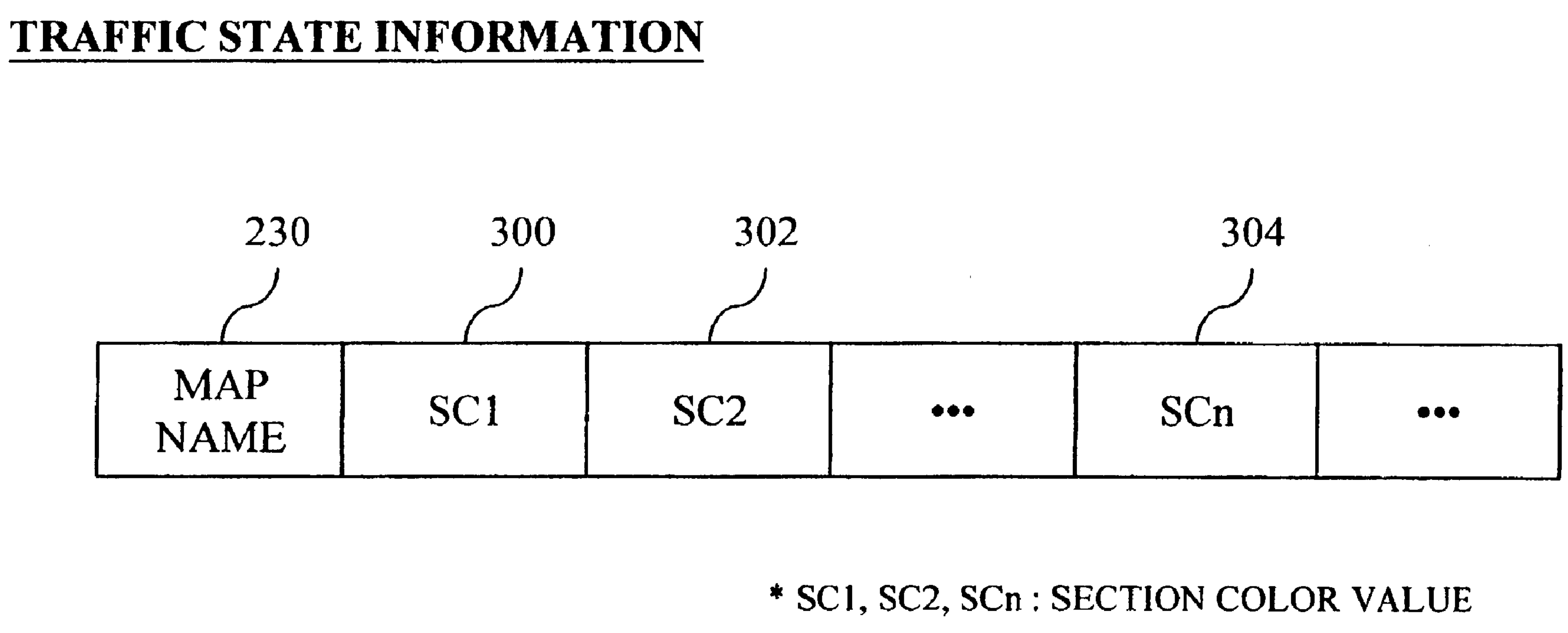

Referring to FIG. 2G, TSI includes a Map Name 230 and a plurality of SCs(Section Color values) 300, 302 and 304. SCs(Section Color values) represent the color of the vector entity in corresponding section. SC1 is the color of the first section, SC2 is the color of the second section and SCn is the color of the n-th section, in the map.

Figure 2H:
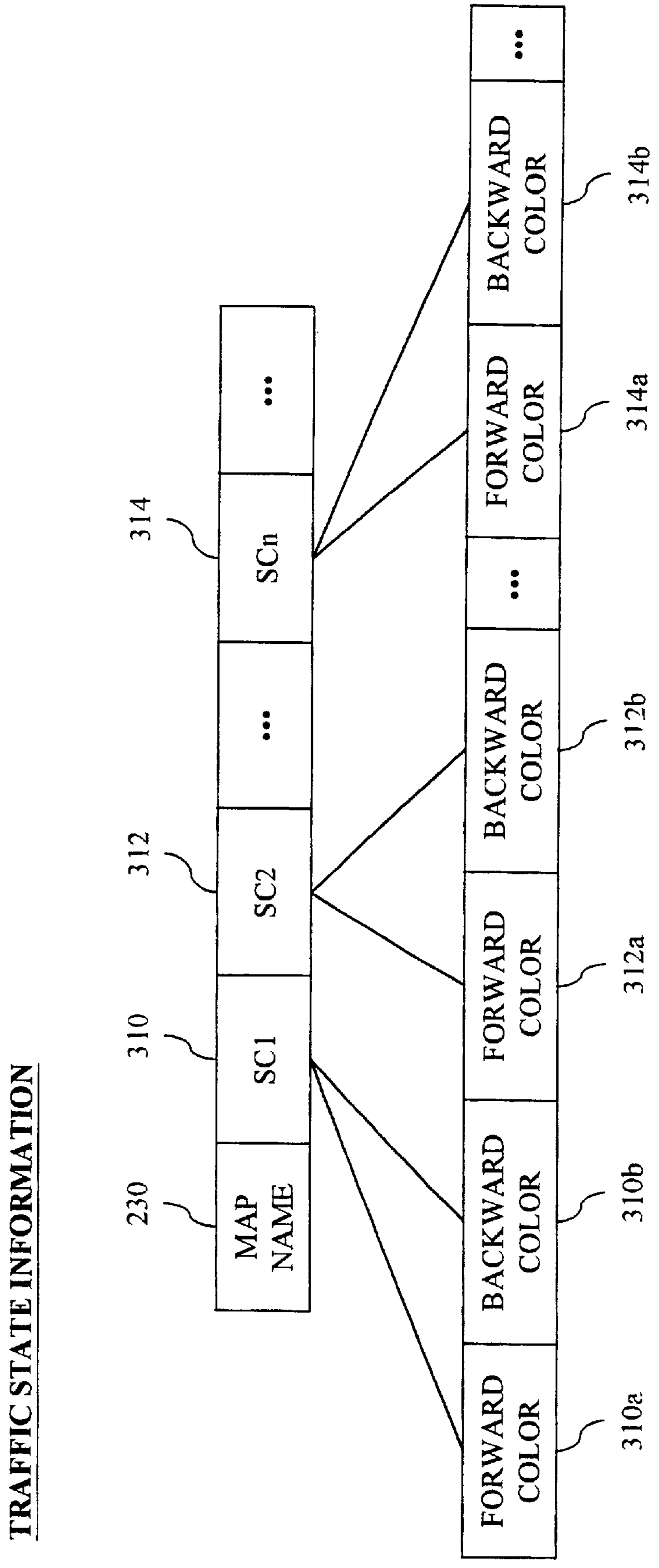

FIG. 2H is a diagram for illustrating a still another exemplary format of TSI including a Map Name 230 and a plurality of SCs(Section Color values) 310, 312 and 314, in which each of SC 310, 312 and 314 is composed of two colors: a forward color 310*a*, 312*a* or 314*a* and a backward color 310*b*, 312*b* or 314*b*. The forward color 310*a*, 312*a* or 314*a* is indicative of the forward velocity at the vector entity of the corresponding section and the backward color 310*b*, 312*b* or 314*b* is indicative of the backward velocity at the vector entity of the corresponding section. The forward color 310*a* is indicative of the forward velocity in the first section; the forward color 312*a* is indicative of the forward velocity in the second section; and the forward color 314*a* is indicative of the forward velocity in the n-th section. Likewise, the backward color 310*b* is indicative of the backward velocity in the first section; the backward color 312*b* is indicative of the backward velocity in the second section; and the backward color 314*b* is indicative of the backward velocity in the n-th section.

The color indicative of velocity is preferably 4-bit data. That is, each of forward colors 310*a*, 312*a* and 314*a* and backward colors 310*b*, 312*b* and 314*b* can be represented by 4 bits. The traffic information for one section can be represented by one byte(=8 bit). Thus, this scheme has considerable compatibleness with conventional data processing schemes and time-variant TSI is efficiently transmitted to a user device since the required band is very small.

Figure 2I:
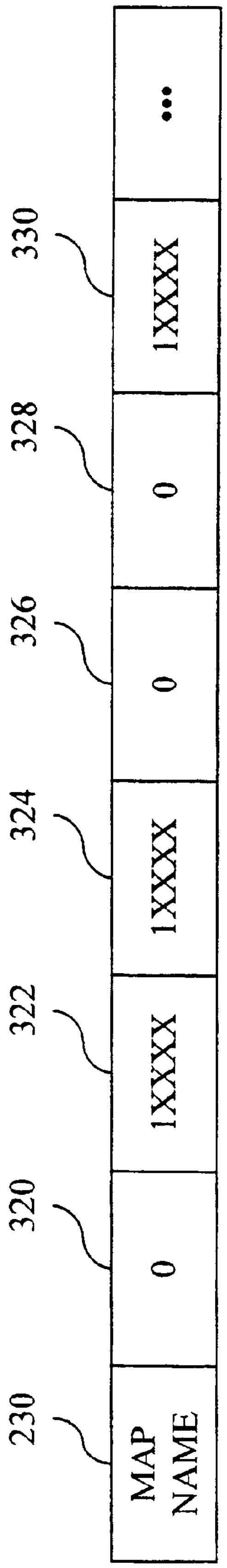

FIG. 2I is a diagram for showing a still another exemplary format of TSI of this invention. This drawing especially represents a Flag-coded TSI format.

Referring to FIG. 21, TSI(Traffic State Information) includes a Map Name 230 and a plurality of section velocity fields 320, 322, 324, 326, 328 and 330. The length of each section velocity field is selected between two values (e. g. 1 bit and 5 bit(=1 bit+4 bits) in this figure, when each color indicative of velocity is 4 bits). The first bit of each SVF(= Section Velocity Field) 320, 322, 324, 326, 328 and 330 is a data type flag bit for indicating whether the content of the SVF is null or not. In the preferred embodiment of this invention, the data type flag bit '0' means that the content of SVF is null(or 'no change in velocity'), while the data type flag bit '1' means that the subsequent predetermined bits(e. g. 4 bits) represent the velocity value of the section (or the attribute value or the color of the section).

The following table is an example of code assignment in the SVF in one preferred embodiment.

| CONTENT OF SVF | MEANING |
|---|---|
| 0 | no change in velocity |
| 10001 | 0~10 km/h |
| 10010 | 10 km/h~20 km/h |
| 10011 | 20 km/h~30 km/h |
| 10100 | 30 km/h~40 km/h |
| 10101 | 40 km/h~50 km/h |
| 10110 | 50 km/h~60 km/h |
| 10111 | 60 km/h~70 km/h |
| 11000 | 70 km/h~80 km/h |
| 11001 | 80 km/h~90 km/h |
| 11010 | 90 km/h~100 km/h |
| 11011 | 100 km/h~140 km/h |
| 11100 | Road block |
| 11101 | traffic accident |
| 11110 | construction |
| 11111 | others |

As shown in this table, in SVF, codes are assigned to not only velocity ranges but also abnormal traffic situations such as road block, traffic accident, construction and etc.

FIGS. 3A–3D illustrate exemplary formats of TSM (Traffic State Map) of the present invention.

Figure 3A:
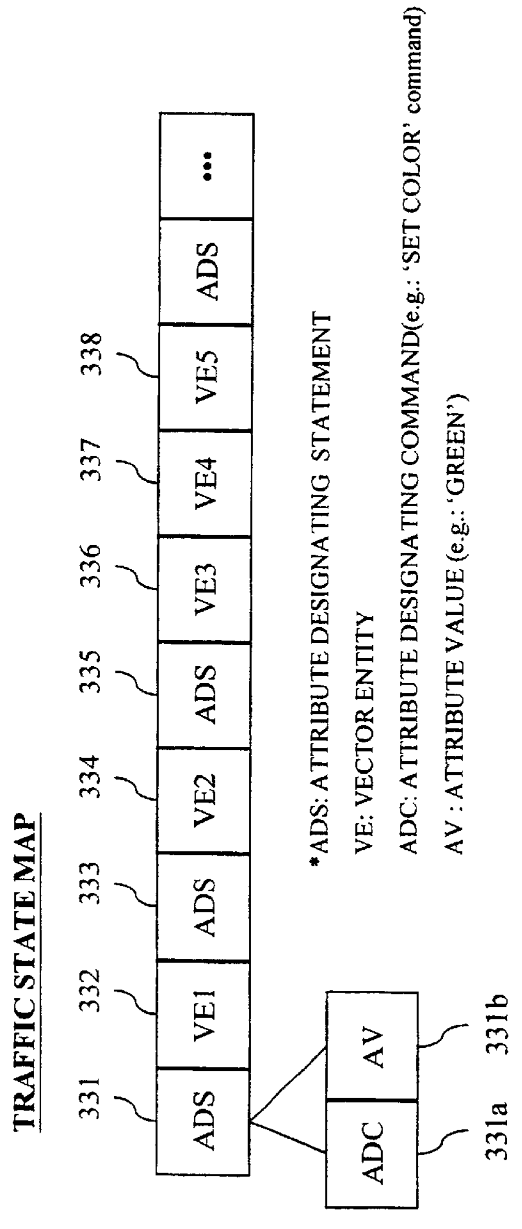
FIGS. 3A–3D illustrate exemplary formats of TSM (Traffic State Map) of the present invention.

Referring to FIG. 3A, TSM includes a plurality of pairs composed of an ADS(Attribute Designating Statement) and at least one VE(Vector Entity). Each pair corresponds to one section. Specifically, ADS 331 and VE1 332 correspond to the first section; ADS 333 and VE2 334 correspond to the second section; and ADS 335, VE3 336, VE4 337 and VE5 338 correspond to the third section in this map. Each ADS 331 is preferably composed of an ADC(Attribute Designating Command) 331*a* and an AV(Attribute Value)331*b*. Here, ADC makes a role of SDC(Section Discrinminating Code).

Also, TSM preferably further includes a Map Name(not shown).

Figure 3B:
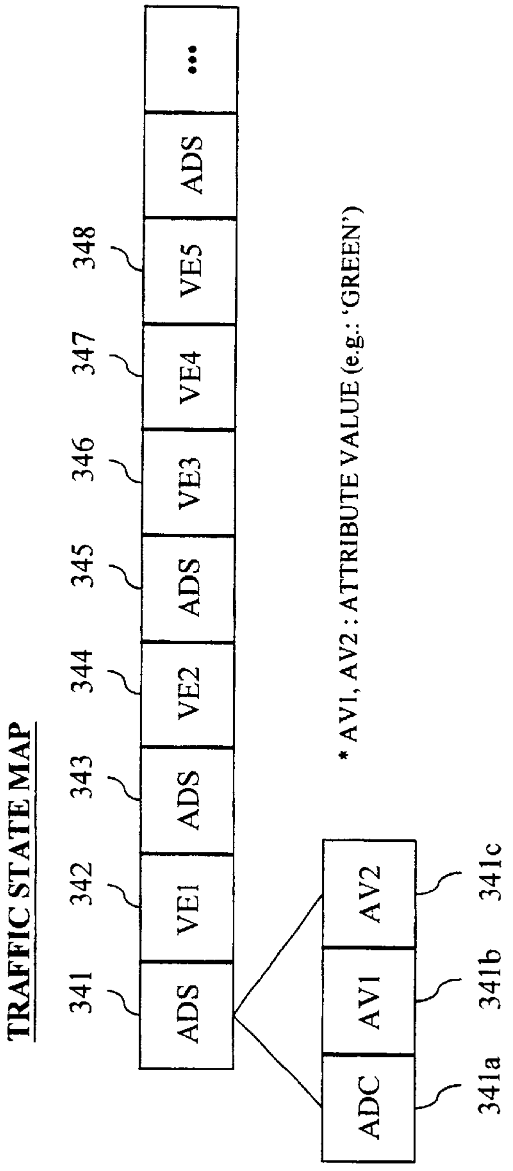

Referring to FIG. 3B, TSM includes a plurality of pairs composed of an ADS(Attribute Designating Statement) and at least one VE(Vector Entity). Specifically, ADS 341 and VE1 342 correspond to the first section; ADS 343 and VE2 344 correspond to the second section; and ADS 345, VE3 346, VE4 347 and VE5 348 correspond to the third section in this map.

Different from FIG. 3A, each of ADSs 341, 343 and 345 in FIG. 3B is preferably composed of an ADC(Attribute Designating Command) 341*a*, two AV(i. e. AV1 341*b* and AV2 341*c*). AV1(Attribute value) is indicative of the forward attribute and AV2 is indicative of the backward attribute. Similarly as in FIG. 3A, ADC makes a role of SDC(Section Discriminating Code). In addition, this TSM may further includes a Map Name.

Figure 3C:
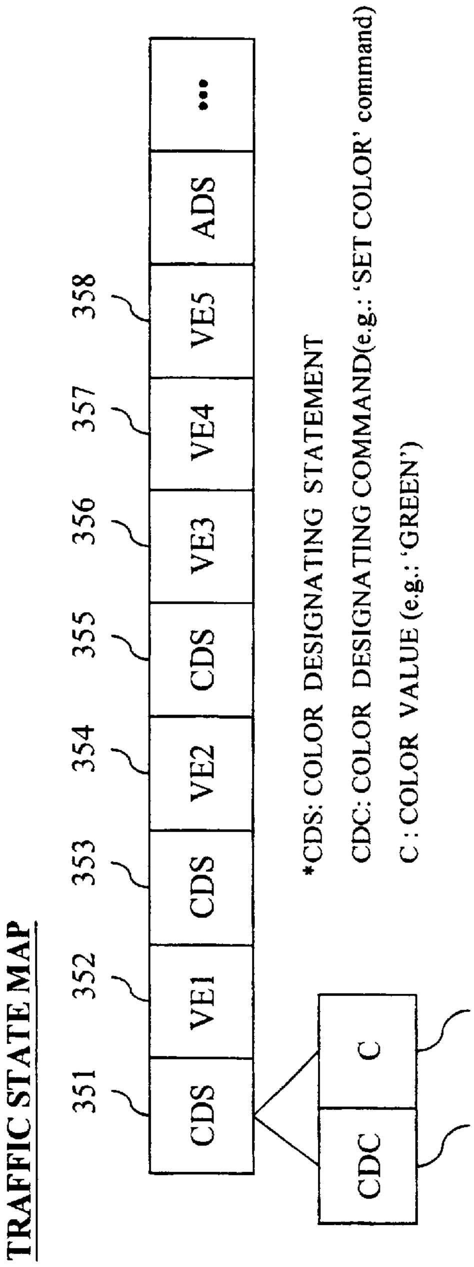

In FIG. 3C, TSM includes a plurality of pairs composed of a CDS(Color Designating Statement) and at least one VE(Vector Entity). Likewise, each pair corresponds to one section. Specifically, CDS 351 and VE1 352 correspond to the first section; CDS 353 and VE2 354 correspond to the second section; and CDS 355, VE3 356, VE4 357 and VE5 358 correspond to the third section in this map. In addition, CDS 351 is composed of an CDC(Color Designating Command) 351*a* and an C(Color Value) 351*b*.

Figure 3D:
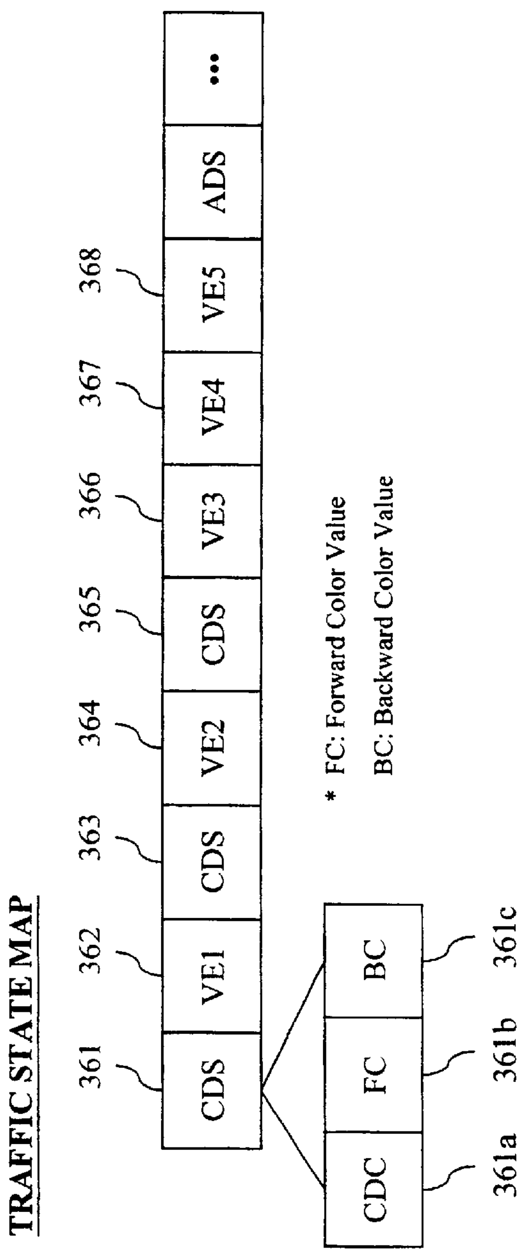

In FIG. 3D, each pair of TSM is composed of a CDS and at least one VE. CDS 361 and VE1 362 correspond to the first section; CDS 363 and VE2 364 correspond to the second section; and CDS 365 and VE3 366, VE4 367, VE5 368 correspond to the third section in this map. Each of CDSs 361, 363 and 365 in FIG. 3D is preferably composed of a CDC(Color Designating Command) 361*a*, a FC(Forward color) 361*b* and a BC(Backward Color) 361*c*.

In FIGS. 3C and 3D, CDC makes a role of SDC(Section Discriminating Code) and TSM may further includes a Map Name.

Figure 4A:
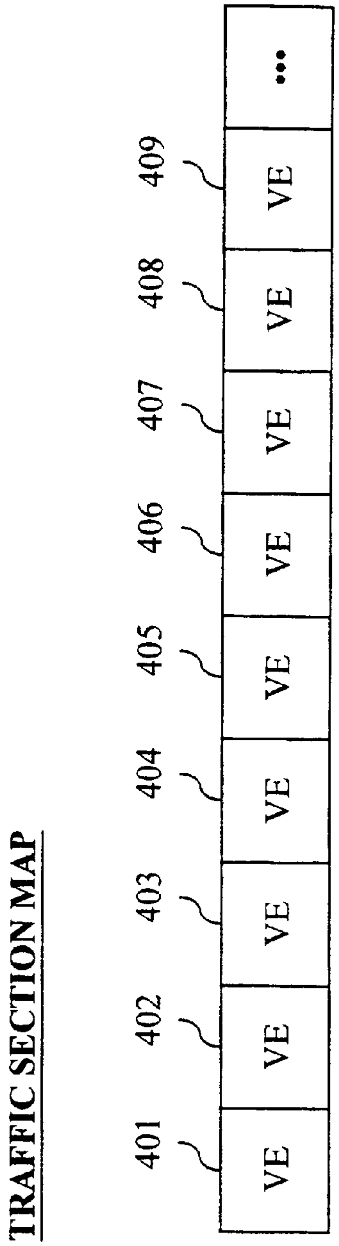
FIGS. 4A–4B illustrate exemplary formats of Traffic Section Map of the present invention.
Figure 4B:
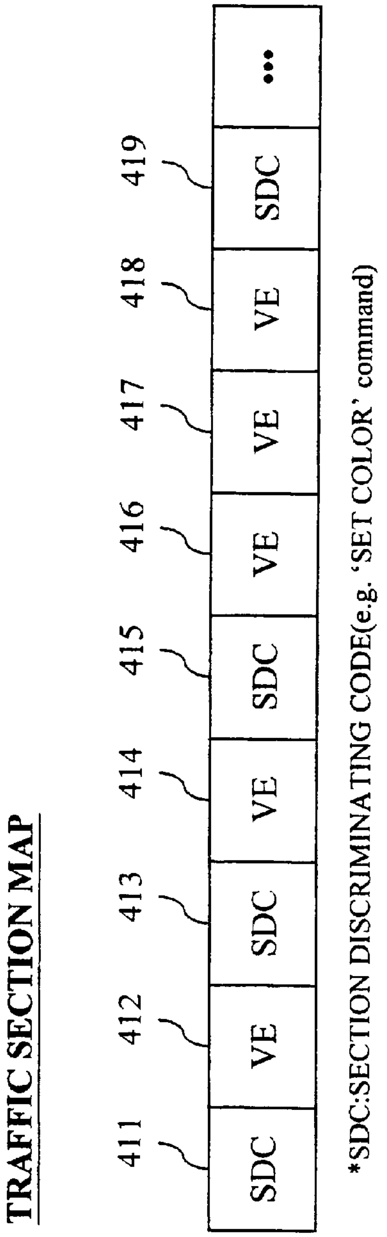

FIGS. 4A–4B illustrate exemplary formats of Traffic Section Map of the present invention;

Referring to FIG. 4A, TSectM(Traffic Section Map) includes a plurality of VEs(Vector Entities) 401–409. In this format, one VE corresponds to one section. More specifically, VE 401 corresponds to the first section; VE 402 to the second section; VE 403 to the third section; VE 404 to the fourth section; VE 405 to the fifth section; VE 406 to the sixth section; VE 407 to the seventh section; VE 408 to the eighth section; and VE 409 to the ninth section, in this map and so on. Each of VEs represents a component(e. g. a road) whose time-variant traffic information is to be provided to a user device.

More specifically, in a traffic section map, a road component is represented by a vector entity and at least one vector entity constitutes a section. For example, the road component from KANG-NAM station to YEOK-SAM station may be represented by one line vector entity and the road from YEOK-SAM station to SEON-NEUNG station may be represented by another line vector entity. If these two line vector entities have substantially the same traffic flow all the time, they might be assigned to one section. As this, at least one vector entities representing road components having substantially the same traffic flow can be assigned to one section. FIG. 4B is for this.

Referring to FIG. 4B, the first section includes one VE 412 and the second section includes one VE 414, while the third section includes three VEs 416, 417 and 418. Each section is discriminated by SDC(Section Discriminating Code) 411, 413, 415 and 419. In preferred embodiments of this invention, SDC is a CDC(Color Designating Command) such as 'SET COLOR' command or 'SELECT COLOR' command in VTX format.

FIGS. 5A–5G explain the processes at a user device for displaying image-based traffic information of the present invention.

Figure 5B:
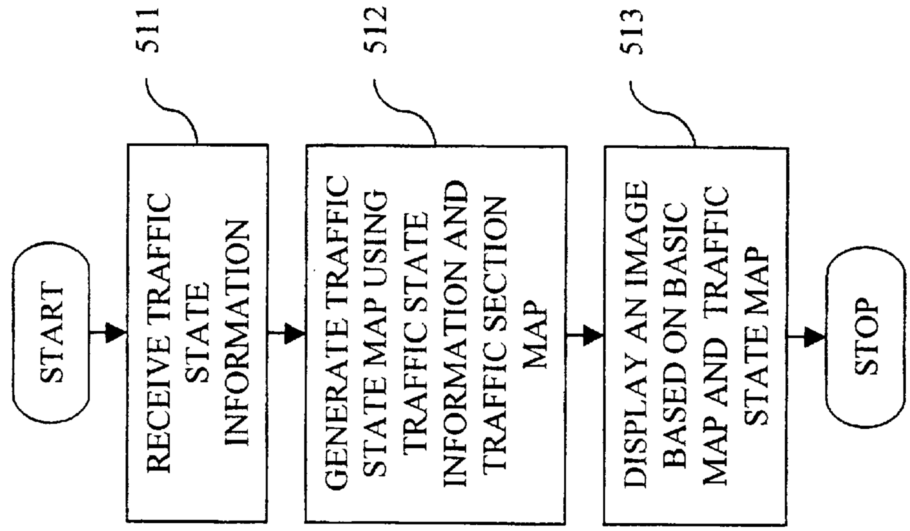
FIGS. 5A–5G explain the processes at a user device for displaying image-based traffic information of the present invention.
Figure 5A:
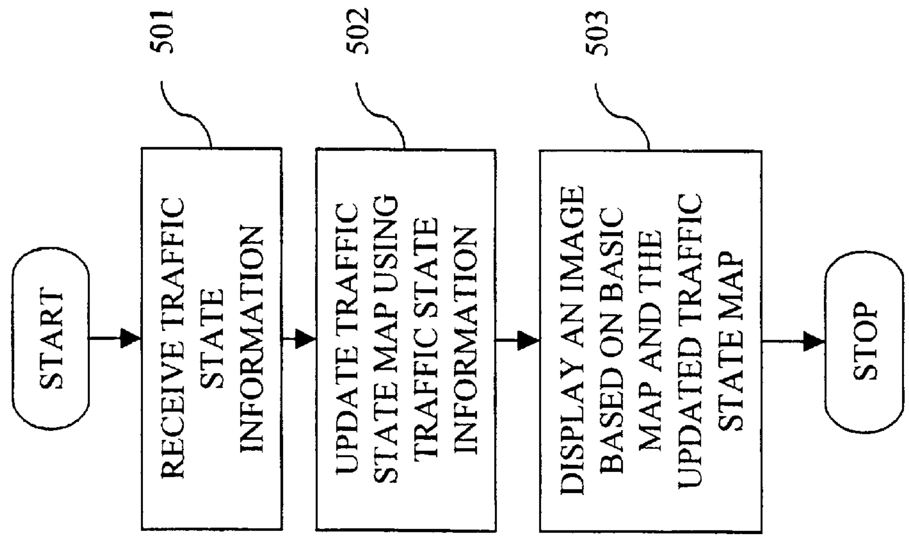

Referring to FIG. 5A, at step 501 a user device receives TSI from traffic information provider via communication network such as a mobile network, an Internet, an Intranet and so on. Here, at least one basic map and at least one TSM(Traffic State Map) or at least one TSectM(Traffic Section Map) are stored in the user device. At step 502, the user device updates TSM(s) using the received TSI and at step 503 displays an image based on a basic map and the updated TSM(s). In preferred embodiment of this invention, the user device displays a first image using the BM and then displays a second image using the TSM whish is superimposed on the first image.

In FIG. 5B, a user device receives TSI at step 511 and generate at least one TSM using the received TSI and at least one TSectM(Traffic Section Map). Then, at step 513 the user device displays an image based on at least one corresponding basic map and the generated TSM(s).

Figure 5C:
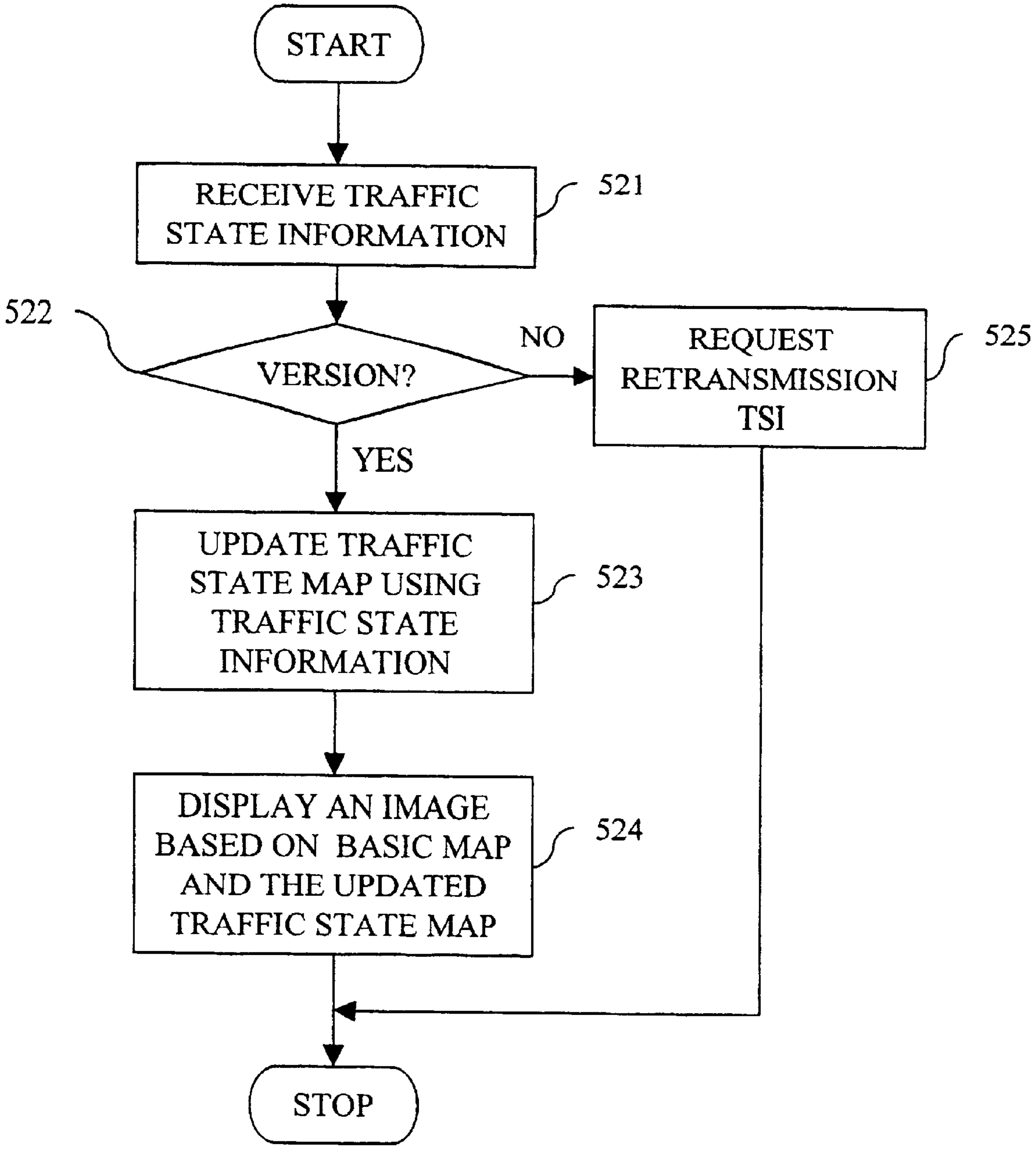

In FIG. 5C, the steps of 521, 523 and 524 are substantially the same with those of 501, 502 and 503 of FIG. 5A, respectively. The step 522 is for confirming whether the version of the received TSI can be used (or supported) by the user device or not. In other words, the step 522 checks the compatibleness between the received TSI and TSM (or TSectM) of the user device.

As described above, there are many kinds of maps (or data): BM(Basic Map), TSM(Traffic State Map), TSI(Traffic State Information), TSectM(Traffic Section Map) and so on, each of which represents the information in a region. In addition, each kind of maps for a region may be plural. The Version (which may be included in the Map Name) is for discriminating between the same kind of maps for the same region. For example, when there are two TSMs: old one and new one for a specific region, they can be discriminated by 'Version.' The concept of 'version' is introduced, considering the fact that a new road, a new building and so on can be constructed, thereby causing the necessity of changing TSM, BM, TSectM or the like.

If the check result of step 522 is positive, the process proceeds to step 523. Otherwise, the process proceeds to step 525 where the user device sends a request of re-transmission TSI. This step 525 is optional.

Figure 5D:
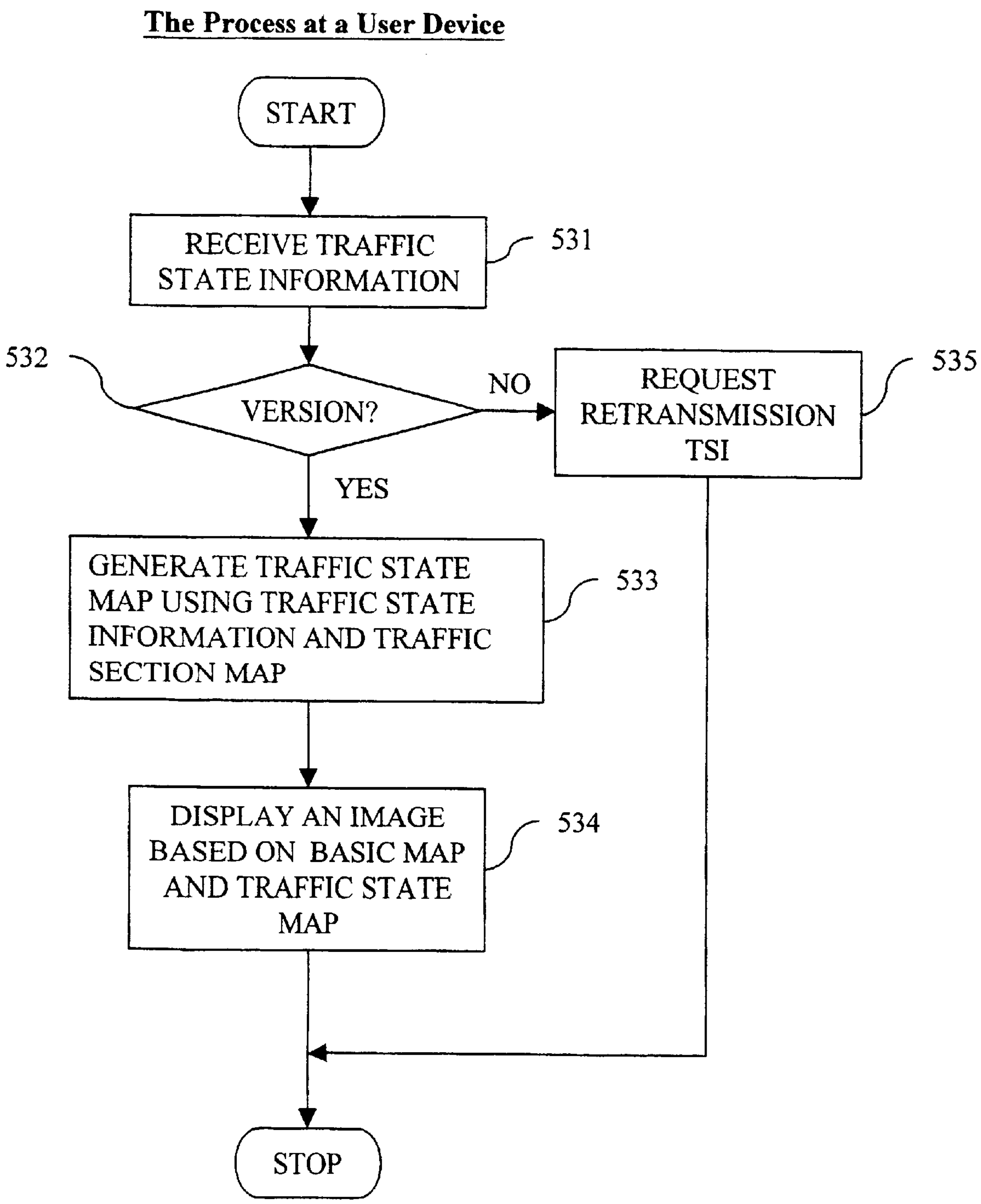

Referring to alternative process of FIG. 5D, steps 531, 533 and 534 are substantially the same with steps 511, 512 and 513 of FIG. 5B, respectively. Also, steps 532 and 535 are substantially the same with steps of 522 and 525 of FIG. 5C, respectively. So, the detailed description will be omitted.

Figure 5E:
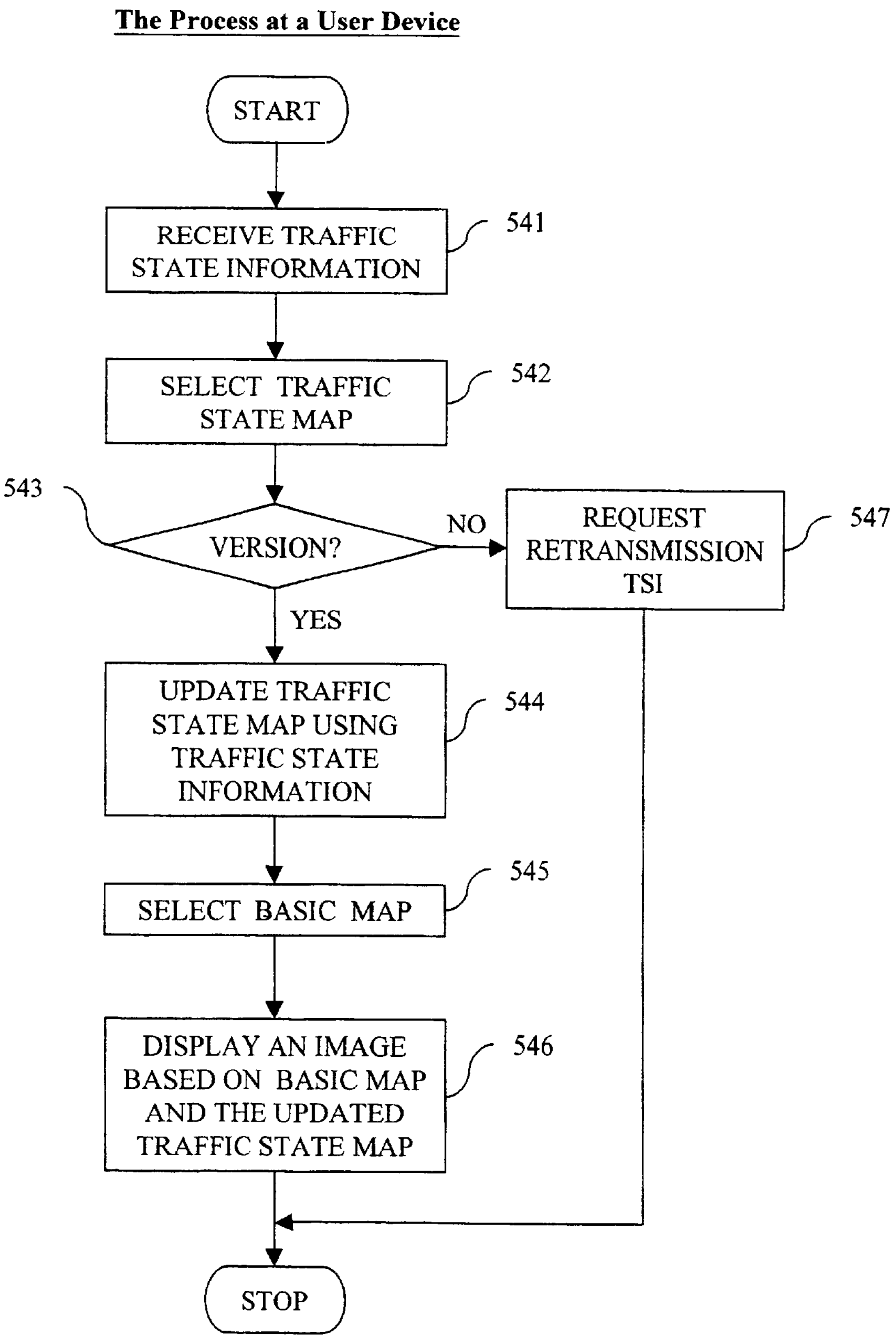

The process of FIG. 5E are substantially the same with that of FIG. 5C, except for steps 542 and 545. The step 542 is for selecting at least one suitable TSM based on the received TSI (more specifically based on the Map Name of the TSI).

Likewise, step 545 is for selecting at least one BM(Basic Map) which is related to the received TSI and preferably compatible with the received TSI and/or TSM.

Figure 5F:
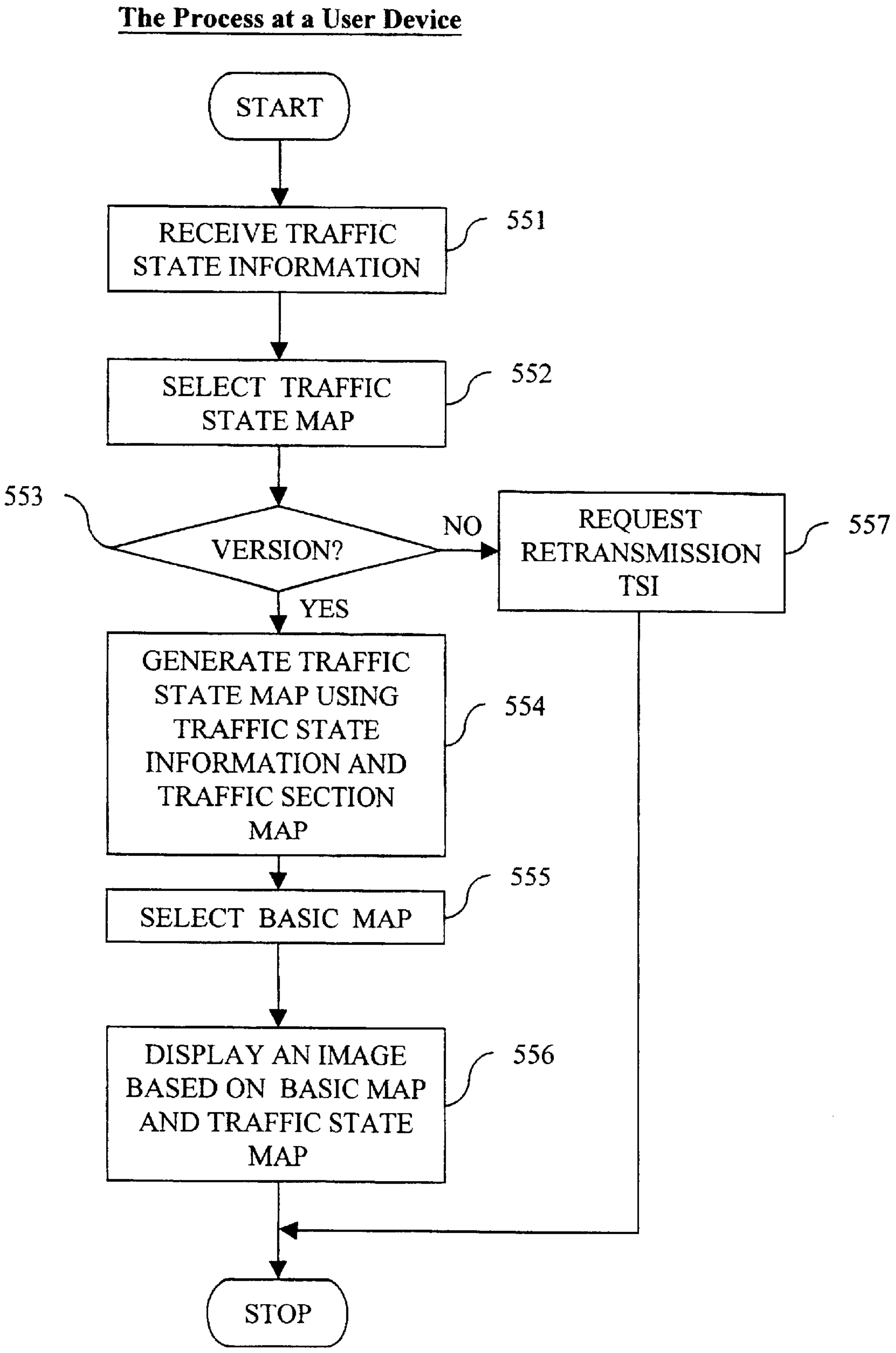

In the process of FIG. 5F, steps 551–553 and 555–557 are substantially the same with steps 541–543 and 545–547 of FIG. 5E. Also, step 554 is the same with step 512 of FIG. 5B.

Figure 5G:
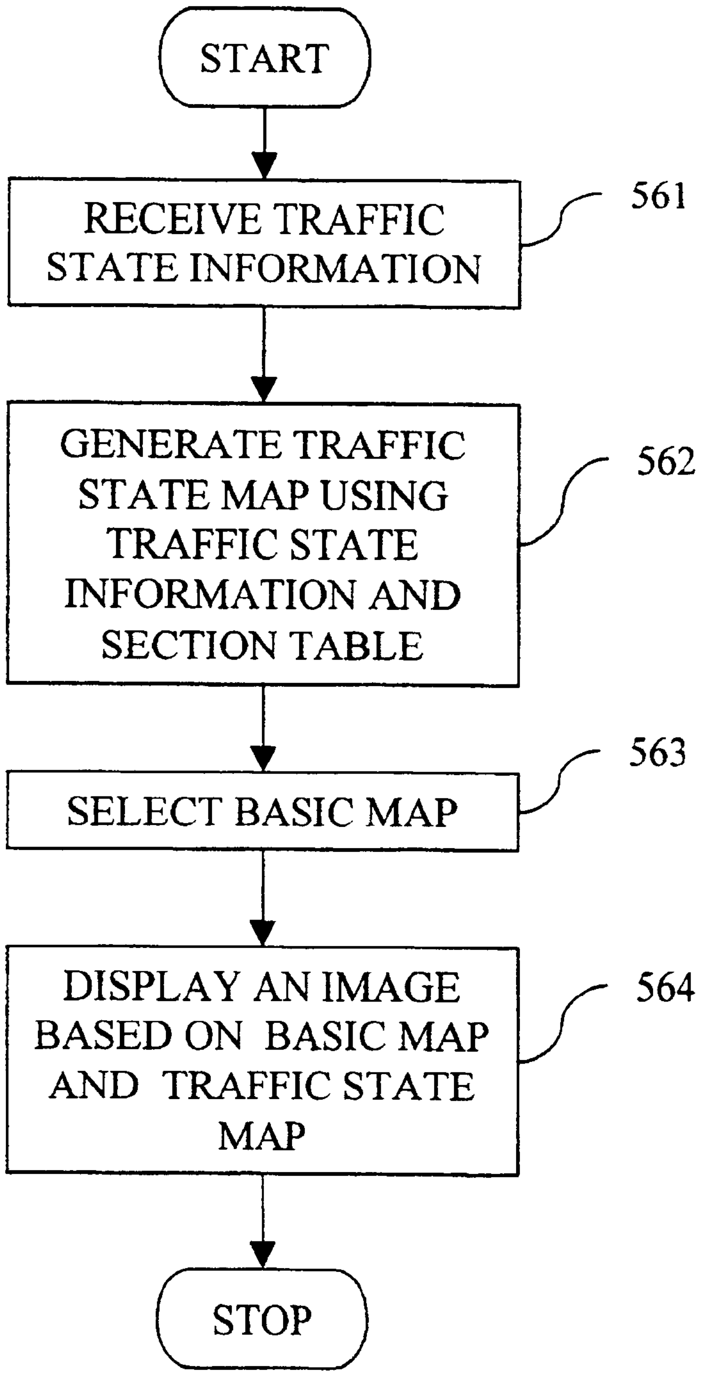

Referring to FIG. 5G, a user device receives TSI(s) at step 561 and generates at least one TSM using the received TSI(s) and corresponding section table(s) at step 562. Step 563 is for selecting at least one BM based on the 'Map Name' included in the received TSI. Then, at step 564, the user device displays an image using the selected BM and the generated TSM.

Figure 6C:
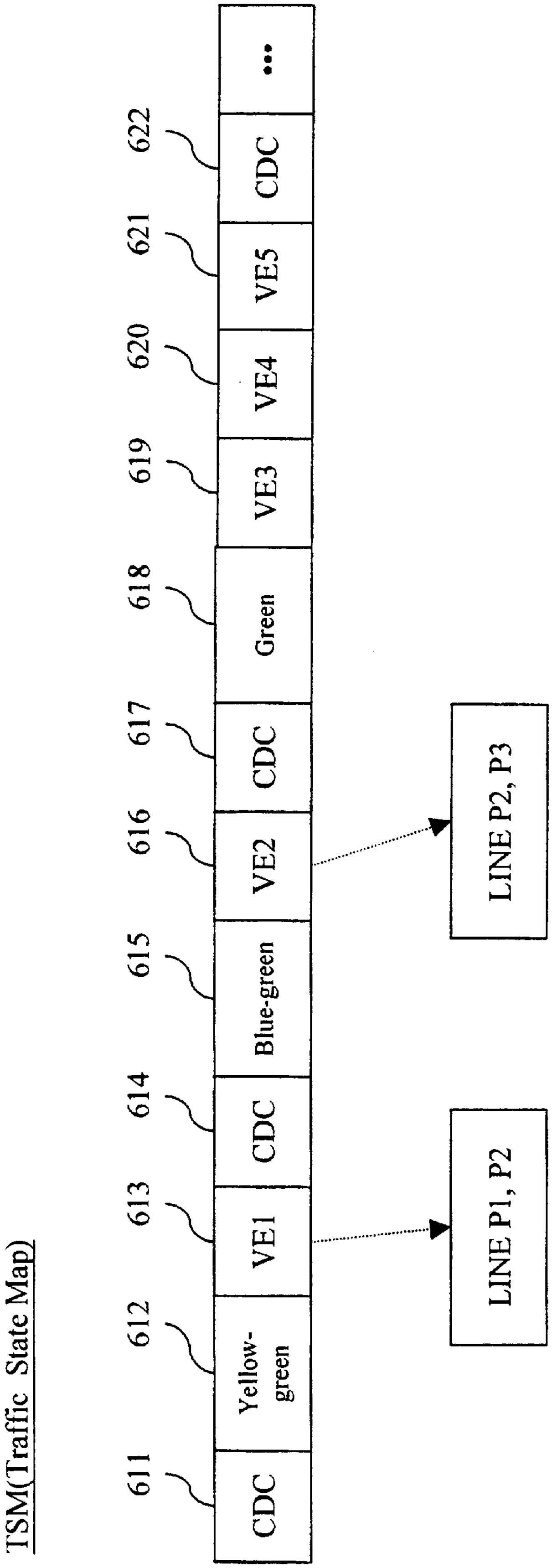

FIGS. 6A–6C are the diagrams for explaining the TSM generating process at a user device of the present invention.

FIG. 6A represents the format of a received TSI which includes a Map Name 601 and a plurality of SVs(Section Velocities) 602, 603 and 604. SV1 602 for the first section is 30 km/h; SV2 603 for the second section 60 km/h and SV3 604 for the third section 50 km/h and the like.

FIG. 6B shows an exemplary Velocity-to-Color Assignment table, in which the velocity range from 0 km/h to 10 km/h is assigned to Y(=Yellow); the velocity range from 10 km/h to 30 km/h is assigned to YG(=Yellow-Green); the velocity range from 30 km/h to 50 km/h is assigned to G(=Green); the velocity range from 50 km/h to 70 km/h is assigned to BG(=Blue-Green); the velocity range from 70 km/h to 90 km/h is assigned to B(=Blue) and the like. This kind of Velocity-to-Color table can be stored in a memory of a user device and otherwise incorporated in a program code.

FIG. 6C shows the format of the generated TSM using the TSI of FIG. 6A and the table of FIG. 6B.

Referring to FIG. 6C, CDC 611, COLOR(yellow-green) 612 and VE1 613 constitute the first section in this map; CDC 614, COLOR(blue-green) 615 and VE2 616 constitute the second section in this map; and CDC 617, COLOR (green) 618 and VE3 619, VE4 620, VE5 621 constitute the third section.

The colors of sections in TSM are determined in accordance with the corresponding Section Velocity of the received TSI. For example, since the velocity of the first section is 30 km/h whose corresponding color is Yellow-Green(see FIG. 6B), the color of the first section in TSM is Yellow-Green. Also, the VEs of sections are generated using Traffic Section Map or Section Tables.

Figure 7A:
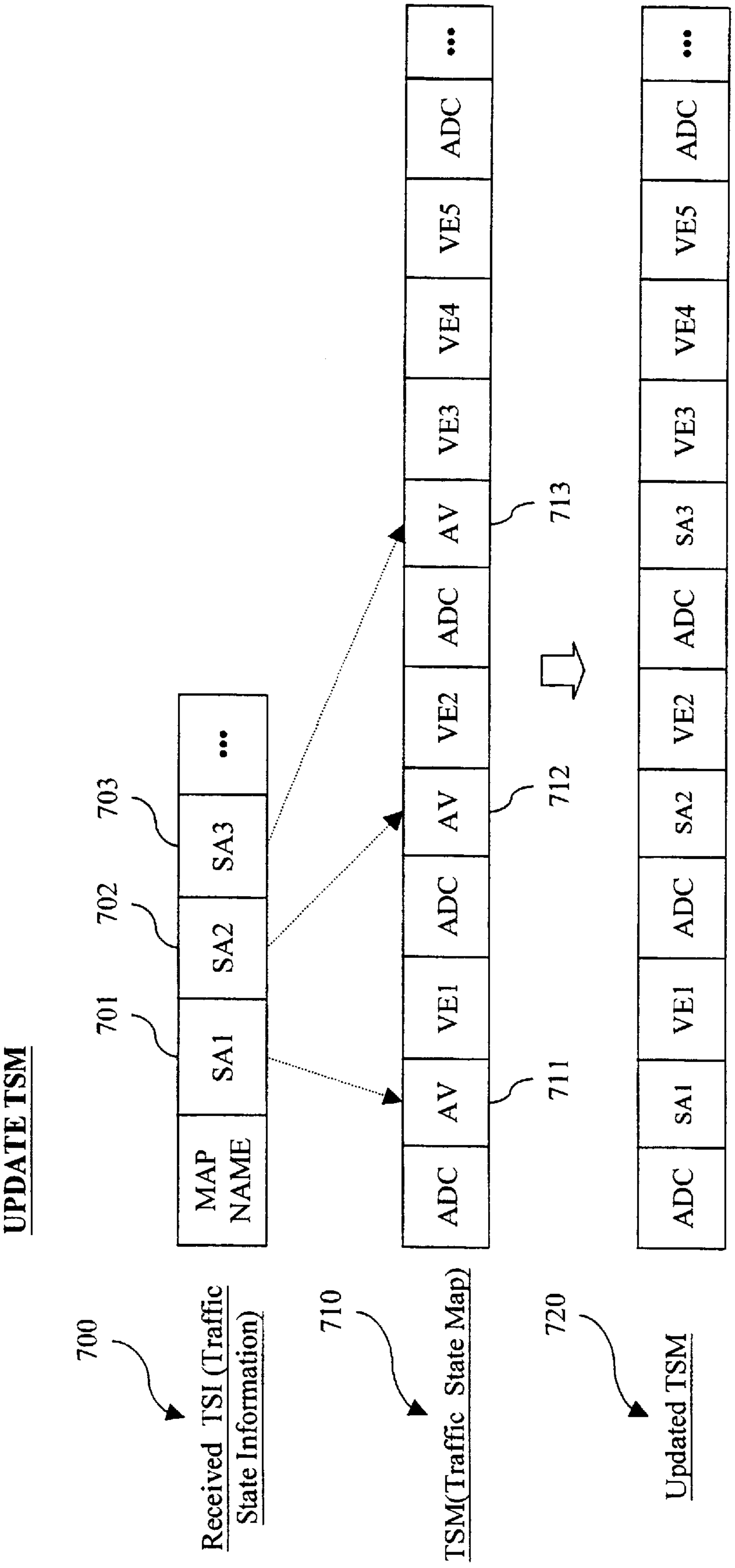
FIG. 7A is a diagram for illustrating the TSM updating process based on a received TSI(traffic state information) at a user device in accordance with one preferred embodiment of the present invention.

FIG. 7A is a diagram for illustrating the TSM updating process based on a received TSI(traffic state information) at a user device in accordance with one preferred embodiment of this invention.

In FIG. 7A, the received TSI 700 has substantially the same format of FIG. 2E. TSI 700 includes a Map Name and a plurality of SAs(Section Attribute values) 701–703.

The TSM 710 stored in the user device has the same format of FIG. 3A. The AVs of TSM 710 are changed to corresponding SVs of TSI 700. Specifically, AV 711 for the first section is substituted with SA1 701 of TSI; AV 712 for the second section is substituted with SA2 702 of TSI; AV 713 for the third section is substituted with SA3 703 of TSI, so as to produce an updated TSM 720.

Figure 7B:
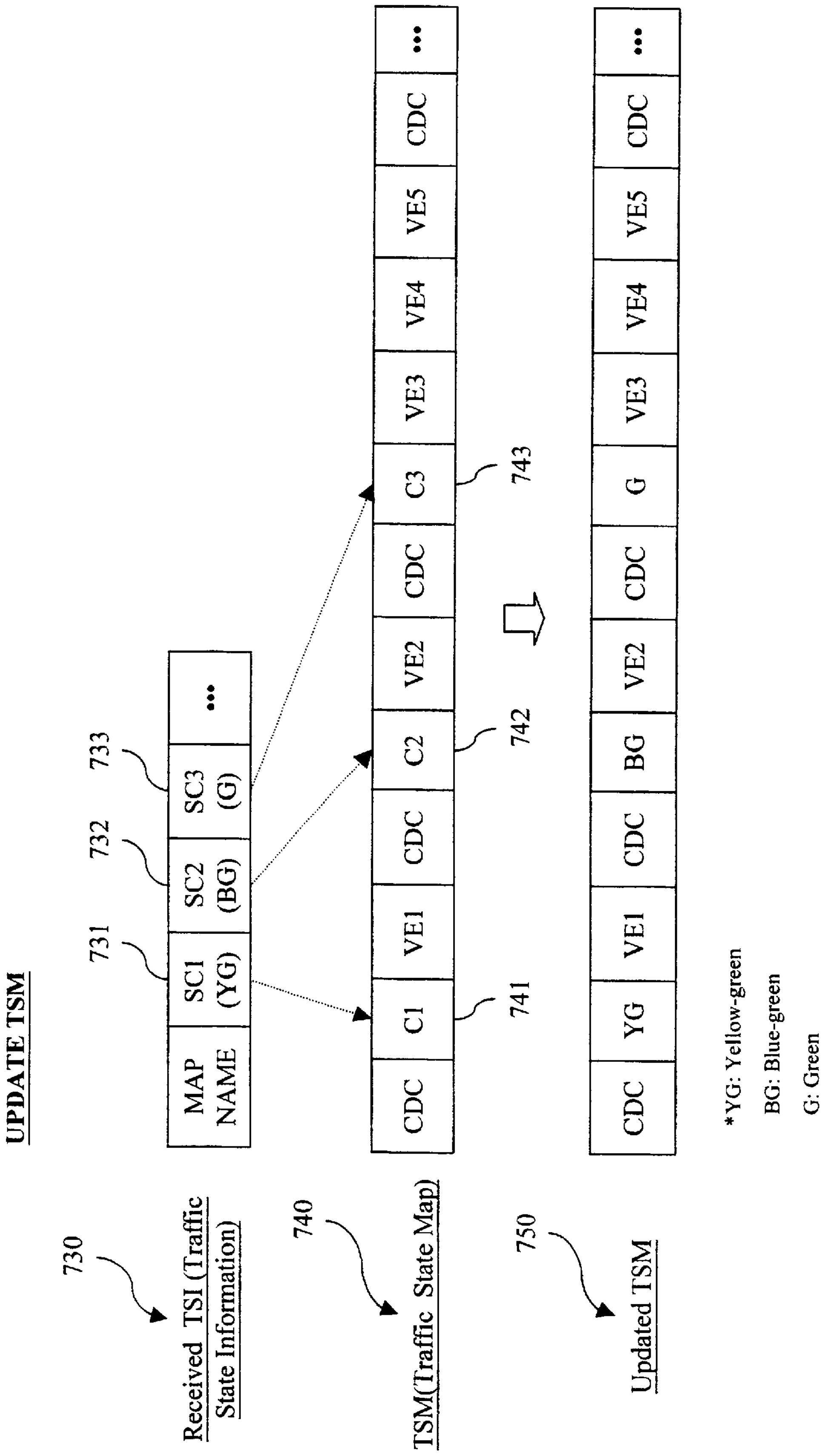
FIG. 7B is a diagram for illustrating the TSM updating process based on a received TSI(traffic state information) at a user device in accordance with another preferred embodiment of the present invention.

FIG. 7B is a diagram for illustrating the TSM updating process based on a received TSI(traffic state information) at a user device in accordance with another preferred embodiment of this invention.

In FIG. 7B, the format of the received TSI 730 is the same with that of FIG. 2G. In the TSI 730, the first section color SC1 731 is YG(Yellow-Green); the second section color SC2 732 is BG(Blue-Green); the third section color SC3 733 is G(Green).

TSM 740 of FIG. 7B has the same format with that of FIG. 3C. The first section color C1 741 is substituted with the first section color SC1 731 of TSI 730 (that is C1 741 is changed into YG(Yellow-Green)). Likewise, the second section color C2 742 of TSM 740 is substituted with the second section color SC2 732 of TSI 730 and the third section color C3 743 of TSM 740 is substituted with the second section color SC2 732 of TSI 730, as shown in the updated TSM 750.

Figure 8:
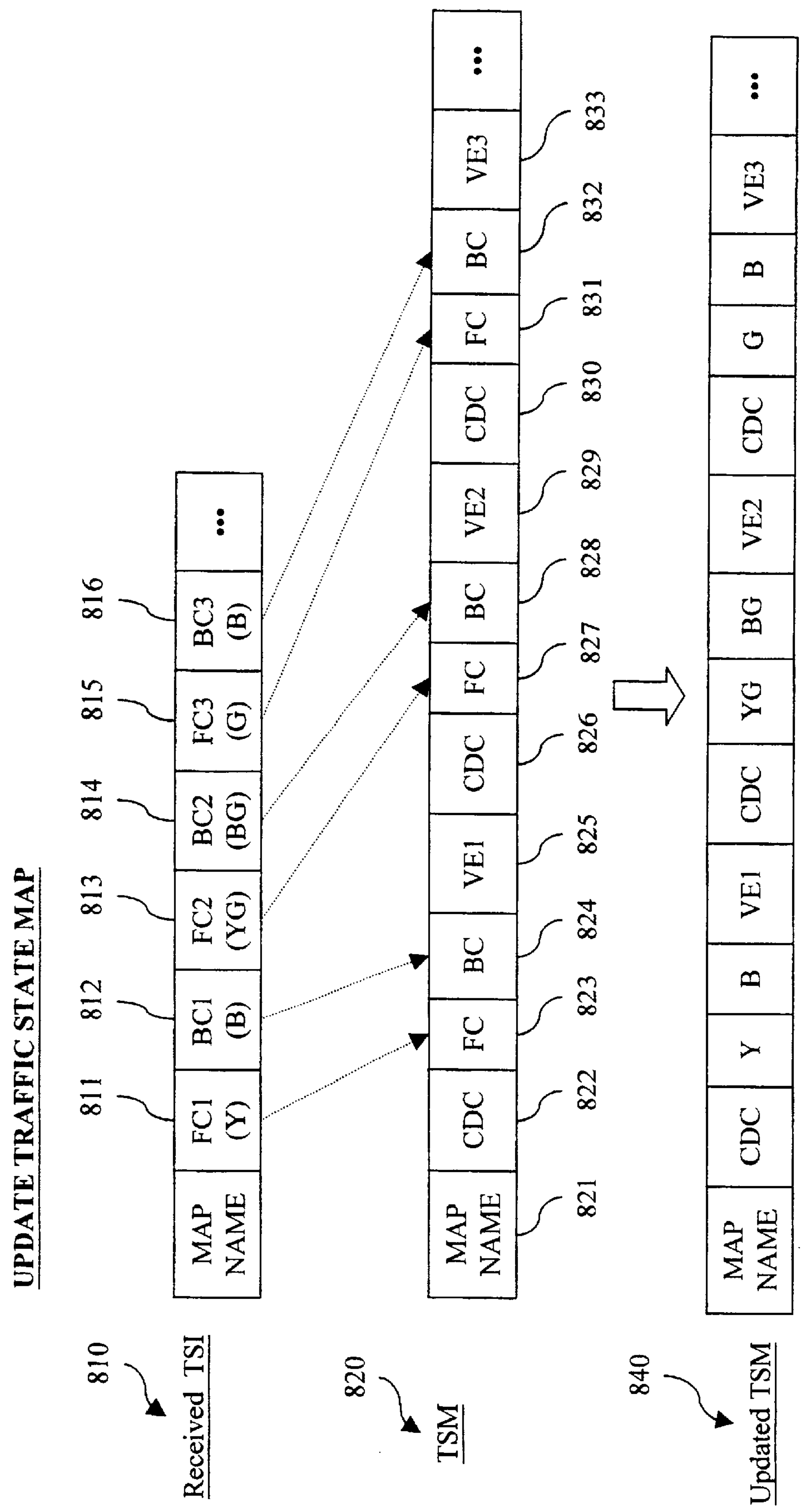
FIG. 8 is a diagram for illustrating the TSM updating process based on a received TSI(traffic state information) at a user device in accordance with still another preferred embodiment of the present invention.

FIG. 8 is a diagram for illustrating the TSM(traffic state map) updating process based on a received TSI(traffic state information) at the user device in accordance with still another preferred embodiment of this invention.

In FIG. 8, the received TSI 810 has the same format with that shown in FIG. 2H. In the TSI 810, the first section forward color FC1 811 is Y(Yellow) and the first section backward color BC1 812 is B(Blue); the second section forward color FC2 813 is YG(Yellow-Green) and the second section backward color BC2 814 is BG(Blue-Green); and the third section forward color FC3 815 is G(Green) and the third section backward color BC3 816 is B(Blue).

The TSM 820 of FIG. 8 has the same format as shown in FIG. 3D. In the TSM 820, the first section is composed of CDC 822, FC(Forward Color) 823, BC(Backward Color) 824 and VE1 825. Likewise, the second section is composed of CDC 826, FC 827, BC 828 and VE2 829; the third section is composed of CDC 830, FC 831, BC 832 and VE3 833.

The updating is as follows. The first section forward color FC 823 of TSM 820 is substituted with the first section forward color FC1(or Yellow) 811 and the first section backward color BC 824 is substituted with the first section backward color BC1(or Blue) 812. Likewise, FC 827 and BC 828 of TSM 820 are substituted with FC2 813 and BC2 814 of TSI 810, respectively; and FC 831 and BC 832 of TSM 820 are substituted with FC3 815 and BC3 816 of TSI 810, respectively. The updating result is shown in the updated TSM 840.

As described above, in the TSM 820 and the updated TSM 840, CDC(Color Designating Command such as 'SET COLOR' or 'SELECT COLOR' command in VTX format) plays a role of SDC(Section Discriminating Code).

Figure 9:
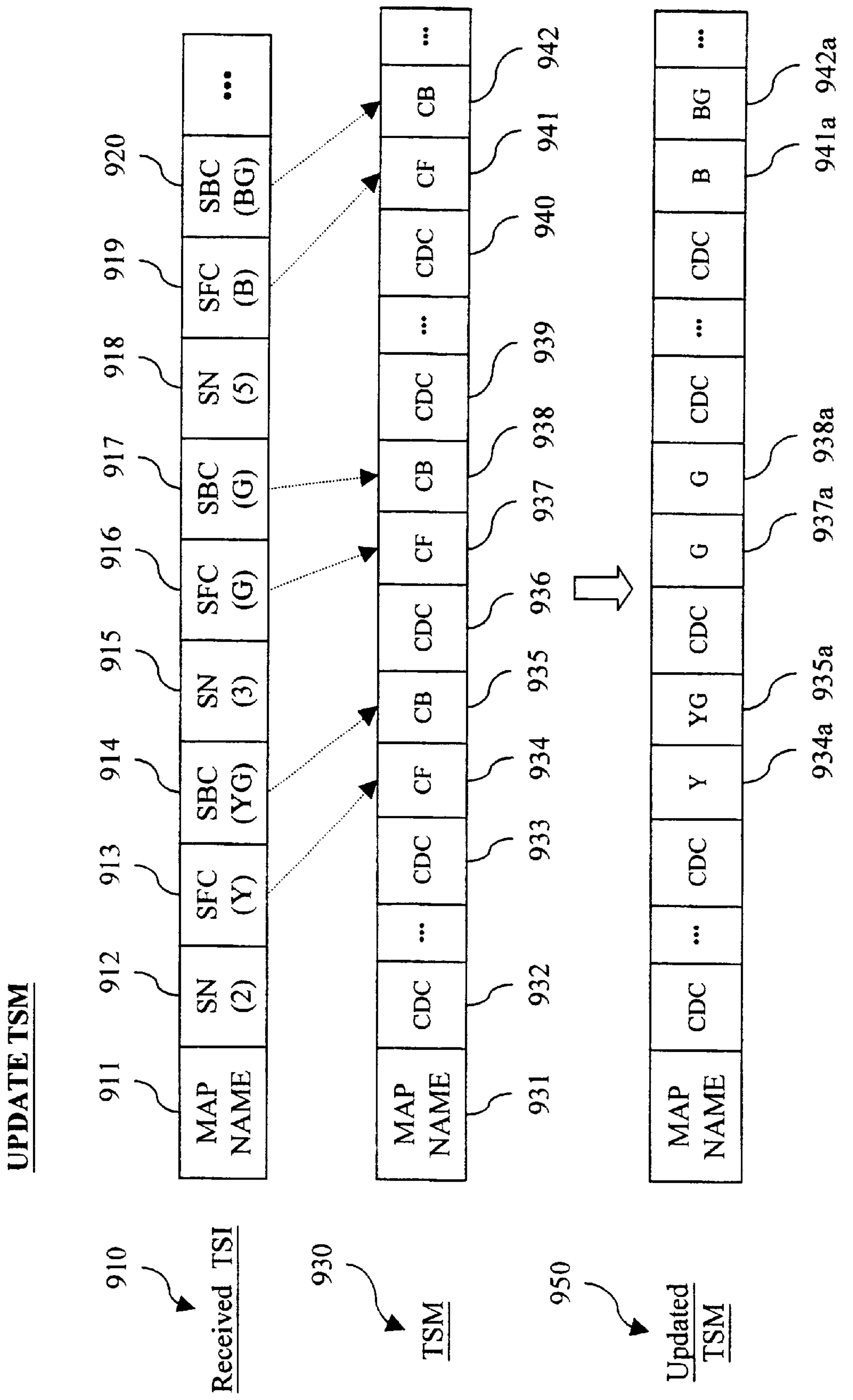
FIG. 9 is a diagram for illustrating the TSM updating process based on a received TSI(traffic state information) at a user device in accordance with still another preferred embodiment of the present invention.

FIG. 9 is a diagram for illustrating the TSM updating process based on a received TSI(traffic state information) at a user device in accordance with still another preferred embodiment of this invention.

Referring to FIG. 9, the received TSI 910 has the similar format as shown in FIG. 2B. The received TSI 910 includes a Map Name 911 and a plurality of blocks, each of which is composed of a SN(Section Number), a SFC(Section Forward Color) and a SBC(Section Backward Color). In the received TSI 910 of this figure, the first block is composed of SN 912 having the value '2', SFC 913 of 'Yellow' and SBC 914 of 'Yellow-Green'; the second block is composed of SN 915 of '3', SFC 916 of 'Green' and SBC 917 of 'Green'; the third block is composed of SN 918 of '5', SFC 919 of 'Blue' and SBC 920 of 'Blue-Green' and the like.

The TSM 930 stored in a user device has substantially the same format as that of FIG. 3D. In TSM 930, CDCs 932, 933, 936, 939, 940 and the like play a role of SDC(Section Discriminating Code).

In the first block of TSI 910, SFC 913 of 'Yellow' and SBC 914 of 'Yellow-Green' subsequent to SN 912 substitute for FC 934 and BC 935 of the second section of TSM 930, respectively, since the value of SN 912 is '2.' In the same way, SFC 916 and SBC 917 subsequent to SN 915 substitute for the third section FC 937 and the third section BC 938 of TSM 930, respectively, since the value of SN 915 is '3'; and SFC 919 and SBC 920 subsequent to SN 918 substitute for the fifth section FC 941 and the fifth section BC 942 of TSM 930, since the value of SN 915 is '5.' Thus, as shown in the updated TSM 950, FC 934*a* and BC 935*a* are changed into 'Yellow' and 'Yellow-Green'; FC 937*a* and BC 938*a* are changed into 'Green' and 'Green'; and FC 941*a* and BC 942*a* are changed into 'Blue' and 'Blue-Green.'

Figure 10:
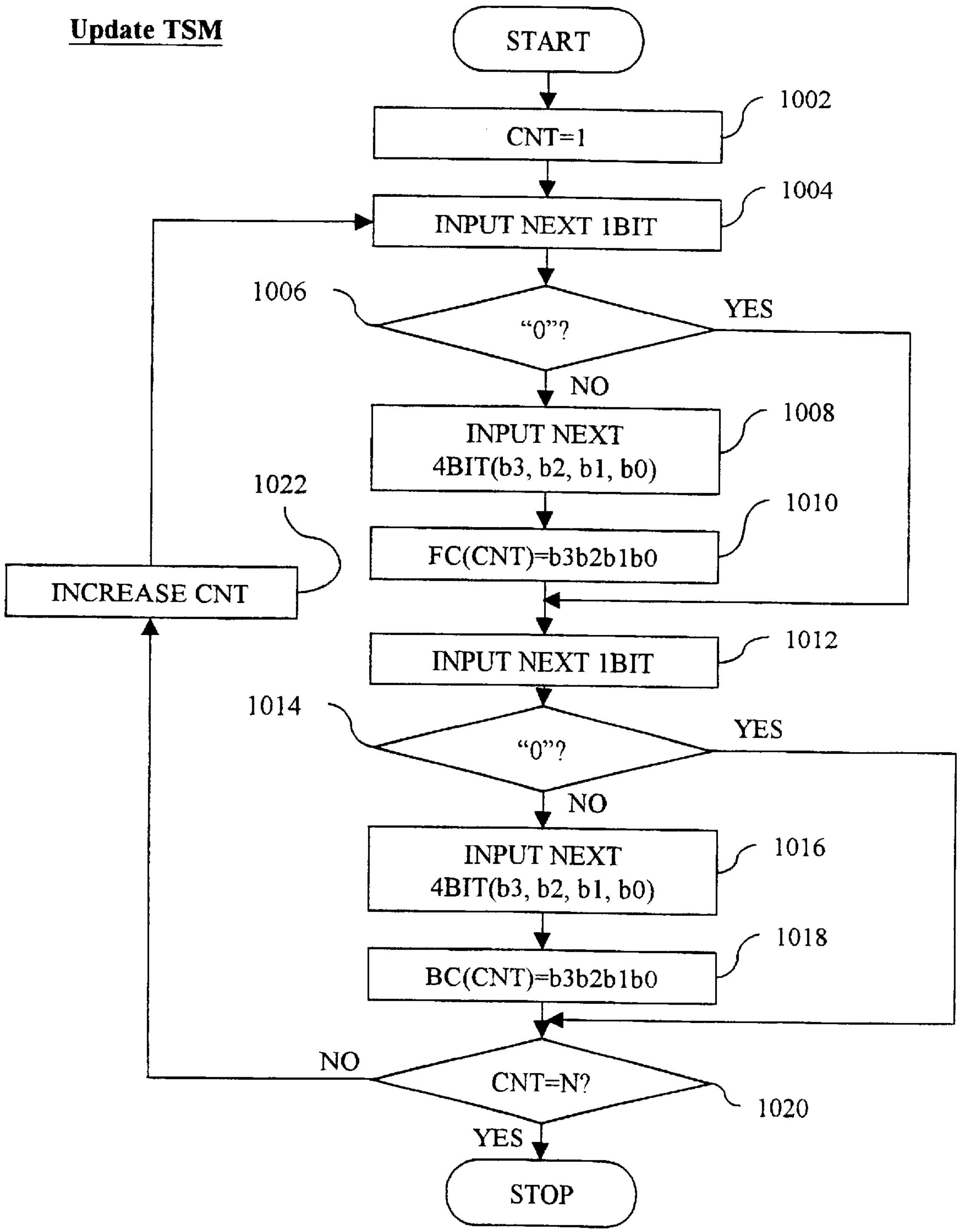
FIG. 10 is a flowchart for illustrating the TSM updating process based on a received TSI(traffic state information) at a user device in accordance with still another preferred embodiment of the present invention.

FIG. 10 is a flowchart for illustrating the TSM(traffic state map) updating process based on a received TSI(traffic state information) at a user device in accordance with still another preferred embodiment of this invention. Especially, this figure is for illustrating an exemplary updating process of TSM, when the received TSI has the flag-coded format as shown in FIG. 21, and TSM has the format as shown in FIG. 3D.

Referring to FIG. 10, at step 1002 the variable 'CNT' is initialized to '1' and then the process proceeds to step 1004 so as to input the first bit among the Section Velocity Fields subsequent to the Map Name of the flag-coded TSI. Then, the user device checks whether the input bit is "0" or "1" at step 1006. In other words, the step 1006 is for checking whether the data type flag bit is "0" or "1". If "0", the process jumps to step 1012. If "1", the user device input next 4 bits at step 1008. Here, it is assumed that the input 4-bit data are called as 'b3', 'b2', 'b1' and 'b0', respectively Then at step 1010 the 4-bit data of the CNT-th section FC(Forward Color) of TSM(=shortly denoted with FC(CNT)) is substituted (or updated) by 'b3', 'b2', 'b1' and 'b0' in bitwise. Subsequently, the user device inputs the next one bit of the flag-coded TSI.

At step 1014, it is checked whether the input bit(that is, the data type flag bit) is "0" or "1". Thus, if "0", the process jumps to step 1020. Otherwise, the next 4 bits are inputted at step 1016 and assigned to 'b3', 'b2', 'b1' and 'b0', in bitwise. The step 1018 is for substituting the 4-bit data of the CNT-th section BC(Backward Color) of TSM(=shortly denoted by BC(CNT)) with 'b3', 'b2', 'b1' and 'b0' in bitwise. Then, at step 1020 it is checked whether the variable 'CNT' is equal to 'N' or not. Here, 'N' represents the number of sections included in this TSM (or TSI) and the variable 'CNT' represents the section number. If the check result of step 1020 is positive, the process is stopped. Otherwise, the process proceeds to the step 1022 in which the variable 'CNT' is increased by 1 and then feeds back to step 1004. Accordingly, the loop composed of steps 1004–1022 is performed by 'N' times.

The flag-coded TSI as shown in FIG. 21 contributes to the improvement of data transfer efficiency. Generally, traffic is not rapidly changed but steadily changed. About ¼ or below sections among all sections in a map have been changed in average velocity every 10 minutes, according to statistics. Thus, the section velocity fields of ¾ or more sections have only 1 bit of '0.' For example, if the number of sections in a TSI is 100 and ¼ of 100 sections are changed in velocity, 75 sections are not changed in velocity. So each of 75 section velocity fields is represented by 1 bit while each of remnant 25 section velocity fields is represented by 5 bits.

The number (S) of total bits of flag-coded TSI is the sum of: the number (M) of bits for the Map Name, 75 and (25×5).

In other words, S=M+200, wherein 'S' represents the number of total bits of flag-coded TSI and 'M' represents the number of bits for the Map Name of the flag-coded TSI.

Accordingly, only a few hundreds of bit data are needed for transmitting unage-based traffic information. Furthermore, another data compression method in accordance with conventional technology can be additively applied to the flag-coded TSI for improving the transmission efficiency.

In reality, when the changed sections in traffic are very small in a predetermined period, the traffic information data for some of the oldest sections unchanged in traffic in the map or the oldest sections transmitted can be transmitted along with the traffic information data for the changed sections.

This scheme contributes to the improvement in the traffic information accuracy displayed in a user device, since the frequency of traffic information acquirement at a user device is increased while keeping the size of transmitted TSI constant. For example, when the car mounted with a user device of this invention passes a shadow area in communication such as a tunnel, it is possible that the traffic information for some sections may not reached to the user device. For solving this problem, it is preferable that re-transmission of traffic information for a section is made, when a predetermined period has passed after traffic information transmission for the section. By doing this, TSM in the user device is maintained as newest traffic information.

TSI, the flag-coded TSI, TSM, BM and etc. of this invention as described above can be added with an additional error correcting code for correcting an error which may be generated in a wireless communication path and can be re-formatted into one suitable for a specific communication system.

Figure 11A:
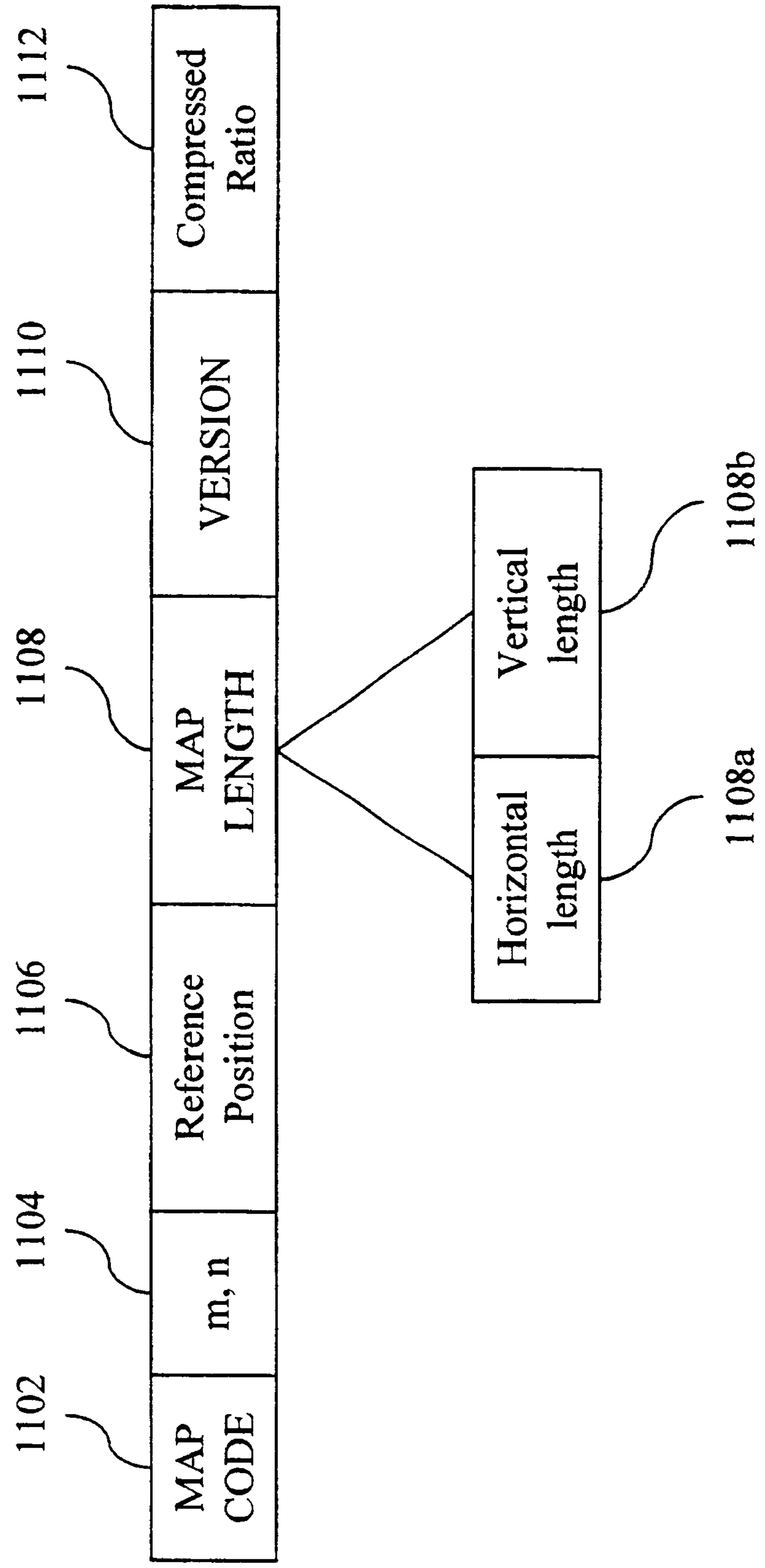
FIG. 11A is a diagram for showing an exemplary data format which illustrates a detailed configuration of the MAP NAME of the present invention and FIG. 11B illustrates the covered range which is determined on 'Reference Position' and 'Map Length' in 'MAP NAME'.
Figure 11B:
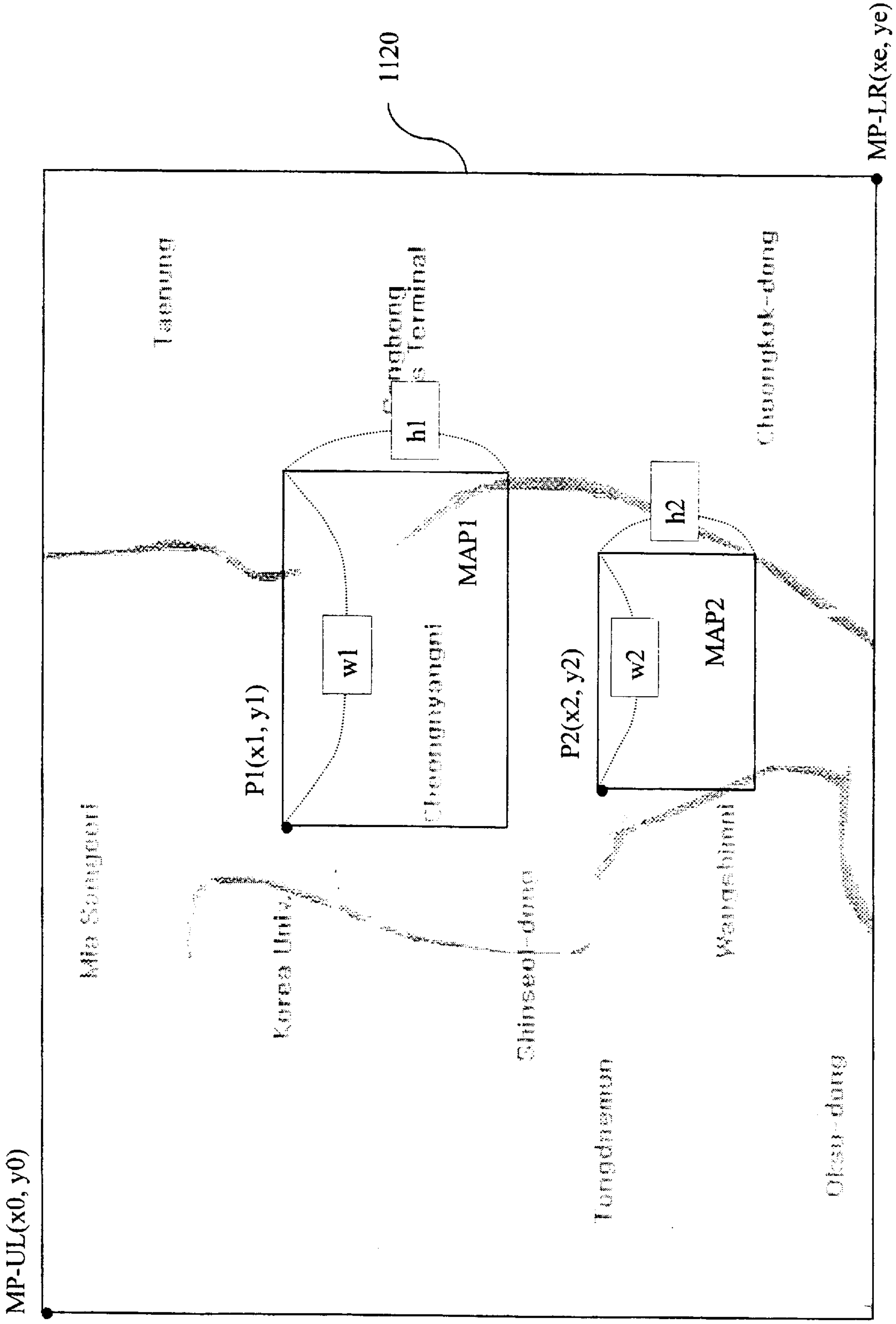

FIG. 11A is a diagram for showing an exemplary data format which illustrates a detailed configuration of the MAP NAME of the present invention and FIG. 11B illustrates the covered range which is determined on 'Reference Position', 'Map Length' in 'MAP NAME.'

Referring to FIG. 11A, Map Name includes a Map Kind 1102, a Data length 1104, a Reference Position 1106, a Map Length 1108, a Version 1110 and a Compressed Ratio 1112.

The Map Kind 1102 represents the kind of this data such as 'TSM', 'TSI', 'BM' and etc.

The following table is an exemplary code assignment for Map Kind.

| Map Kind | Map | Map Kind | Map |
|---|---|---|---|
| a | BM(Basic Map) | A | Compressed-BM |
| b | TSM(Traffic State Map) | B | Compressed-TSM |
| c | TSI(Traffic state Information) | C | Compressed-TSI |
| d | PII(Position Indication Information) | D | Compressed-PII |
| e | RII(Route Indication Information) | E | Compressed-RII |
| f | BMEI(Basic Map-Edit Information) | F | Compressed-BMEI |
| g | GPSII(GPS Indication Information) | G | Compressed-GPSII |
| h | TSIEI(Traffic State Information Edit Information) | H | Compressed-TSIEI |
| i | TSMEI(Traffic State Map Edit Information) | I | Compressed-TSMEI |
| j | FCTSI(Flag-Coded Traffic State Information) | J | Compressed-FCTSI |

In the above table, BM, TSM, TSI and FCTSI have been explained, referring to FIGS. 2A–2I and 3A–3D.

PII(Position Indication Information) is for transmitting the indication of a specific location such as a delivery source or a delivery destination. For this, PII includes at least one 'POINT' vector entity and corresponding 'TEXT' vector entity which are preferably expressed by VTX format in preferred embodiment of this invention. 'RII(Route Indication Information)' is for representing at least one available path from the current location to a specific location and related text information. For this, RII includes at least one vector entity including text vector entity, which are preferably expressed by VTX format, in preferred embodiment of this invention.

'BMEI(Basic Map Edit Information)' is the data to be used for editing BM.

'GPSII(GPS Indication Information)' is the data to be required for displaying GPS data in a user device.

'BMEI(Basic Map-Edit Information)', 'TSIEI(Traffic State Information Edit Information)' and 'TSMEI(Traffic State Map Edit Information)' are the information for editing BM, TSI and TSM.

In preferred embodiment of this invention, these edit information has the format suitable for changing parts of the content of BM, TSM and TSI, respectively.

Also, thus-described maps can be compressed using conventional compressing method. Preferably, the codes indicative of the kinds of maps can differ with how the compression is made. Also, data compression is made the map except for the map kind code.

In FIG. 11A, a Data Length 1104 represents the data length (m) of the Reference Position 1106 and the data length (n) of Map Length 1108. The Reference Position 1106 represents the reference position of the map-covered region, for example, the left-uppermost position of the map. In preferred embodiments, the Reference Position 1106 is represented by absolute coordinate value.

The Map Length 1108 includes a Horizontal Length 1108*a* indicative of the horizontal length of the map-covered region and a Vertical Length 1108*b* indicative of the vertical length of the map-covered region. If the aspect ratio is constant, the Map Length 1108 could include only one of the Horizontal Length 108*a* and the Vertical Length 1108*a* or include only a Diagonal Length.

The Version 1110 represents a version of the map. It is necessary that the map should be re-made in conformity to a road construction/closure, a building construction/removal, a governmental office movement and the like. So, it is possible that there are two or more maps whose covered region are the same and whose map kinds are also the same. For discriminating these maps, as mentioned above, the Version 1110 is needed.

In preferred embodiments, if a user device has only older version of BM than that for the received TSI, the user device could use the latest version of BM available. Also, if no TSM suitable for the received TSI is available, a user device could send a request to traffic information provider.

The compressed Ratio 1112 represents the compressed ratio of the map. This is for conforming to the need that the resolution of map covering a region should differ with user's purpose.

The following table represents an exemplary code assignment of Code-to-Compressed Ratio.

| Code | Compressed |
|---|---|
| 1 | 1/300 |
| 2 | 1/3000 |
| 3 | 1/5000 |
| 4 | 1/10000 |
| 5 | 1/25000 |

-continued

| Code | Compressed |
|---|---|
| 6 | 1/50000 |
| 7 | 1/100000 |
| 8 | 1/250000 |

FIG. 11B is a diagram for explaining an exemplary configuration of the reference coordinate and the map length of FIG. 10.

In FIG. 11B, MP-UL(x0, y0) and MP-LR(xe, ye) are coordinate values (e. g. GPS coordinate values) indicative of the left-uppermost position and the right-lowermost position of a Master Map 1120. P1(x1, y1) represents the coordinated value of the reference position of MAP1 and P2(x2, y2) represents the coordinated value of the reference position of MAP2. In addition, w1 and h1 are indicative of the horizontal length and the vertical length of MAP 1, respectively, and w2 and h2 are indicative of the horizontal length and the vertical length of MAP2, respectively.

In preferred embodiments, when a MAP has a reference position of (x, y), the Reference Position 1106 of the Map Name in FIG. 11A for the map could be x, y. Alternatively, the Reference Position 1106 may be relative coordinate values, for example, x' and y', wherein x'x−x0, y'=y−y0 and x0, y0 are the coordinated values of Master Map's reference position. For example, the Reference Position 1106 for MAP1 can be x1' and y1', wherein x1'=x1−x0 and y1'=y1−y0 and the Reference Position 1106 for MAP2 can be x2' and y2', wherein x2'=x2−x0 and y2'=y2−y0.

Since the number of bits for relative coordinate values is generally lower than that for absolute coordinate values, the above scheme could contribute to the improvement of data transmission efficiency.

Figure 12A:
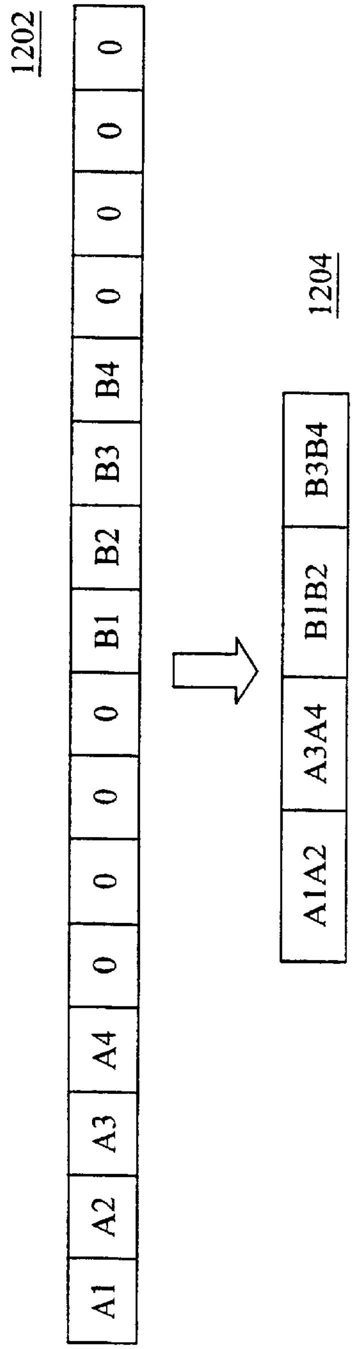
FIGS. 12A and 12B are exemplary compression methods of the present invention, which can be applied to 'Reference Position', 'Map Length' and etc.
Figure 12B:
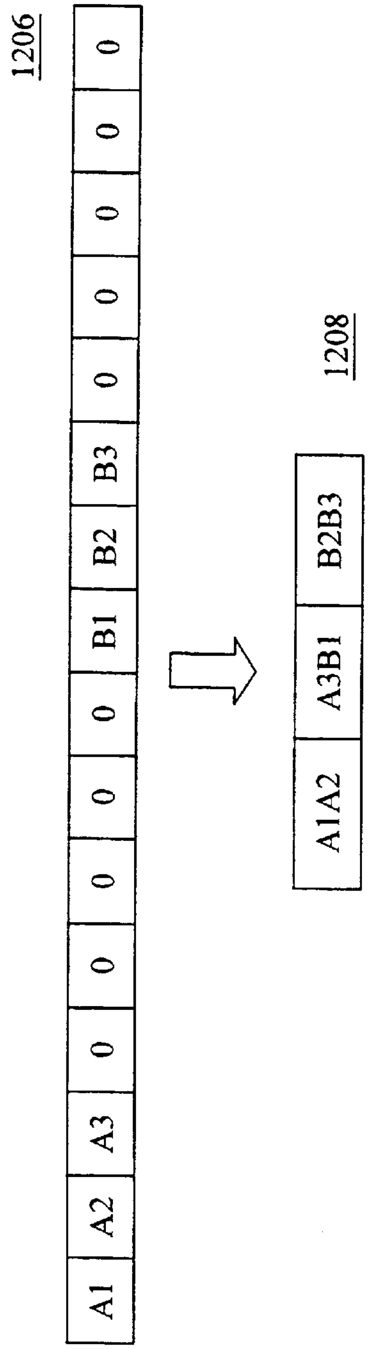

FIGS. 12A and 12B are the diagrams for explaining a compression scheme which is applicable to the Reference Position 1106 and the Map Length 1108 of FIG. 11A. For the convenience of explanation, only the compression scheme for Reference Position 1106 will be described, but it can be also applied to the Map Length 1108.

The unit for Position and/or Length is [m], [km], [min], [sec] and etc. Also, as the need arises, the unit such as [100 m] can be used.

In the following, 'Nibble' can be interpreted in hexadecimal code or BCD code. In this embodiment, 'Nibble' is understood in BCD code.

In FIG. 12A, one compartment represents one nibble (or 4 bits). In the original Reference Position 1202, the number of bits for representing a Reference Position 1106 is 64 bits (32 bits for x-coordinate values and 32 bits for y-coordinate values). However, except for the most significant 4 nibbles (that is, 'A1', 'A2', 'A3' and 'A4') for x-coordinate value and the most significant 4 nibbles(that is, 'B1', 'B2', 'B3', 'B4') for y-coordinate value, the least significant 4 nibbles for x and y coordinate values are null. Thus, these null data can be omitted in transmission, as the compressed Reference Position 1204 which is composed of only 16 bits. In this case, the 'm' of the Data Length 1104 of FIG. 11A can be set to '4.'In alternative example shown in FIG. 12B, only the most significant 3 nibbles (that is, 'A1', 'A2' and 'A3' for x-coordinate value and 'B1', 'B2' and 'B3' for y-coordinate value) of an original Reference Position 1206 is meaningful and the remnant nibbles are null. Thus the original Reference Position 1206 can be compressed into the compressed Reference Position 1208, which includes only the meaningful nibbles. In this case, the 'm' of the Data Length 1104 of FIG. 11A can be set to '3.'

Figure 13:
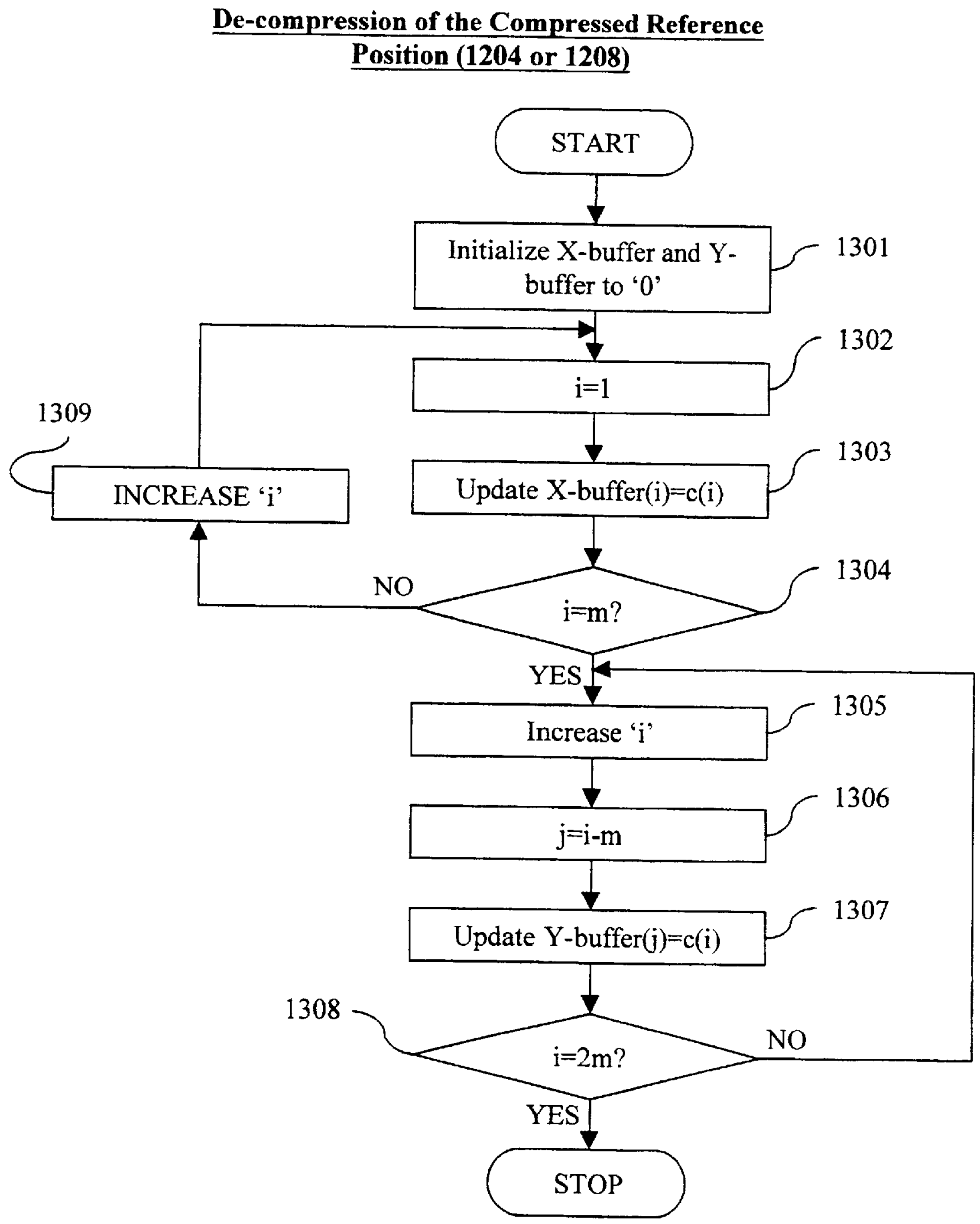
FIG. 13 is a diagram for illustrating a method of decompressing the Compressed Reference Position (or the Compressed Map Length) as shown in FIGS. 12A and 12B into an original Reference Position (or an original Map Length) at a user device.

FIG. 13 is a diagram for illustrating a method of decompressing the Compressed Reference Position (or the Compressed Map Length) as shown in FIGS. 12A and 12B into an original Reference Position (or an original Map Length) at a user device.

For convenience' sake, the de-compression of Reference Position will be explained, but the following decompression can be applicable to a Map Length.

Referring to FIG. 13, step 1301 is for initializing X-buffer and Y-buffer to '0.' Each size of X-buffer and Y-buffer is 8 nibbles, when each original x-coordinate value and y-coordinate value is 8 nibbles. At step 1302, the variable 'i' is set to 1, in which the variable 'i' is used as both the nibble pointer for X-buffer and the nibble pointer for the compressed Reference Position. Then, at step 1303, the i-th nibble (c(i)) of the compressed-Reference Position is assigned to the i-th nibble in the X-buffer and checks whether i=m at step 1304. Here, 'm' is included in the Data Length 1104 and shows the data length of Reference Position 1106. If the variable 'i' is not 'm', the process proceeds to step 1309. Otherwise, the process proceeds to step 1305. The variable 'i' is increased by 1 at step 1309. The loop composed of steps 1302–1304 and 1309 is performed by 'm' times. Step 1305 is for increasing the variable 'i' and step 1306 is for setting the variable 'j' to i−m. The variable 'j' is used as the nibble pointer for Y-buffer. Then, at step 1307, j-th nibble (shortly denoted as Y-buffer(j)) of Y-buffer is substituted with i-th nibble (shortly denoted as c(i)) of the compressed Reference Position.

At step 1308 it is checked whether i=2m. If so, the process ends. Otherwise, the process is fed back to step 1305. Thus, the loop of steps 1305–1308 is performed by 'm' times.

Meanwhile, it is also possible that x-coordinate value and y-coordinate value are expressed as ASCII code in an original Reference Position and converted into BCD code prior to the above-described compression. For this, it is necessary that the conversion from BCD code to ASCII code should be performed prior to steps 1303 and 1307 of FIG. 13.

Figure 14:
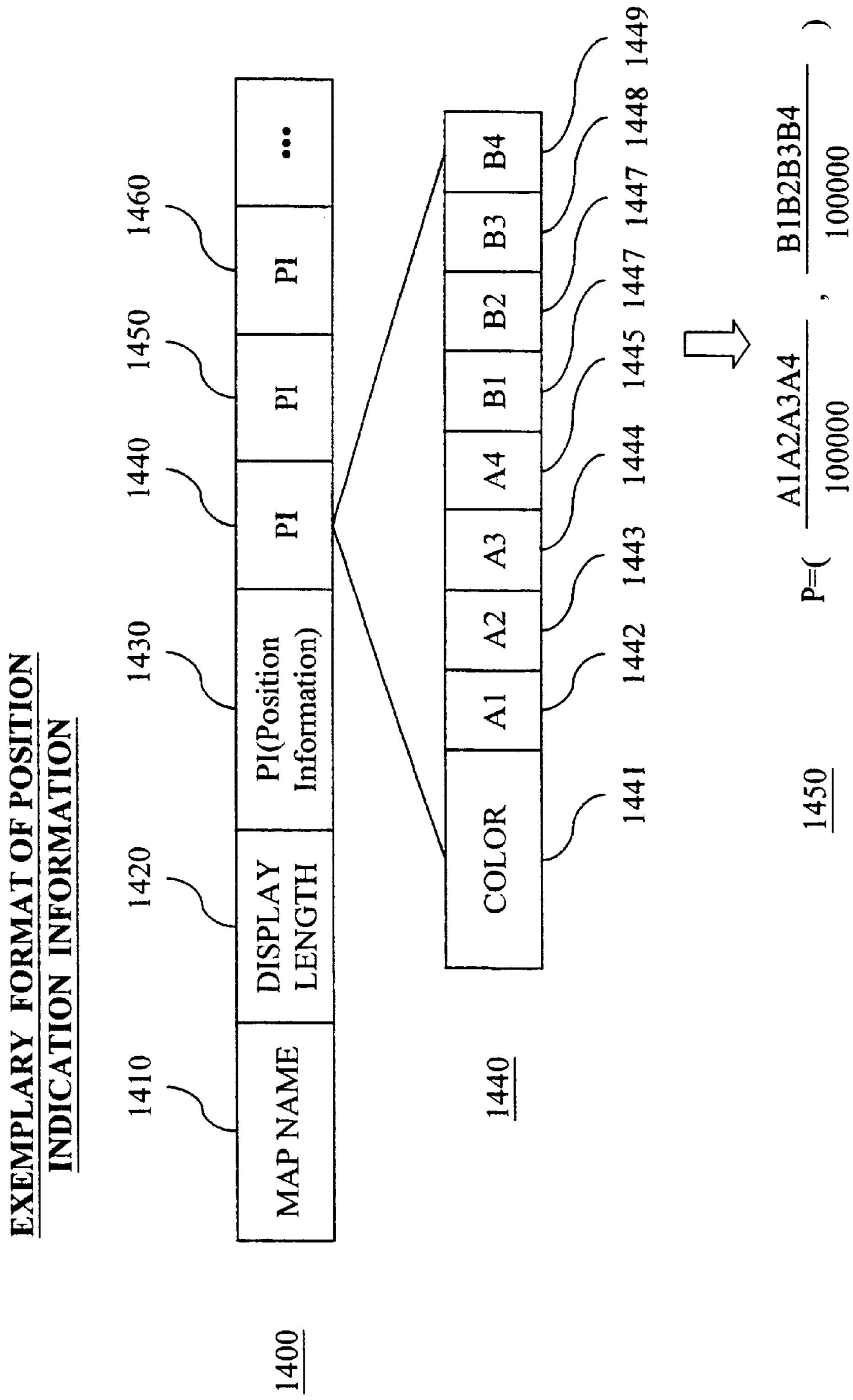
FIG. 14 is a diagram for illustrating exemplary format of PII(Position Indication Information) in accordance with the present invention.

FIG. 14 is a diagram for illustrating an exemplary format of PII(Position Indication Information) in accordance with the present invention.

In FIG. 14, PII includes a Map Name 1410, a Display Length 1420 and a plurality of Pis (Position Informations) 1440, 1450, 1460 and etc.

The Map Name 1410 can have the same format as described in FIG. 11A and the Display Length 1420 represents the size of subsequent PIs 1440, 1450, 1460 and etc.

Each PI is for representing x-coordinate value and y-coordinate value of a specific point and includes a Color 1441 and a plurality of coordinate data(A1, A2, A3, A4, B1, B2, B3, B4) 1442–1449. In preferred embodiment, one coordinate data is 1 nibble and is expressed in ASCII code. A user device displays a point using PI and the Display Length 1420 on a screen.

For example, when the Color is 'yellow'; A1–A4 and B1–B4 are '2, 5, 0, 0' and '3, 0, 0, 0'; and the Display Length 1420 is '5', the coordinate values of the point is as follows:

$$P=\left(\frac{A1A2A3A4}{10^m},\frac{B1B2B3B4}{10^m}\right)=\left(\frac{2500}{100000},\frac{3000}{100000}\right)$$

In preferred embodiments, x and y coordinate values of the point are relative values to the reference position of the Master Map.

By generalizing, $$\text{The relative x-coordinate value} = \frac{A1A2A3 \ldots A_m}{10^m}$$

$$\text{The relative y-coordinate value} = \frac{B1B2B3 \ldots B_m}{10^m}$$

The point on a screen has the color designated by the Color 1441 and preferably has a predetermined size and/or shape. Alternatively, the size and/or the shape of a point can be automatically controlled.

Figure 15:
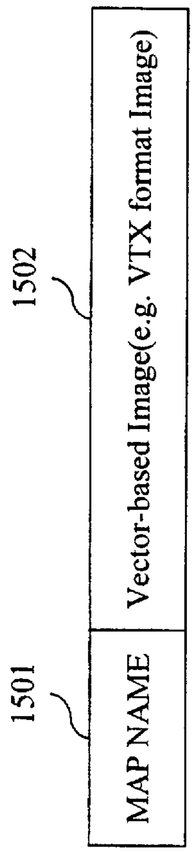
FIG. 15 shows an exemplary format of RMI(Route Map Information) of the present invention.

FIG. 15 shows an exemplary format of RMI(Route Map Information) of the present invention.

Referring to FIG. 15, RMI includes a Map Name 1501 and a Vector-based Image 1502 (e. g. VTX format image). Here,. Vector-based Image preferably includes at least one line vector entity. Specifically, a line vector entity is preferably composed of a shape designating statement (e. g. 'LINE' in VTX) and a position designating statement (e. g. 'P1, P2). Also, the line vector entity further includes an attribute designating statement which is composed of an attribute designating command(e. g. 'SELECT COLOR') and an attribute value(e. g. 'Green'). The RMI may further includes other kinds of vector entities, for example, 'polyline' vector entity, and 'text' vector entity.

Figure 16:
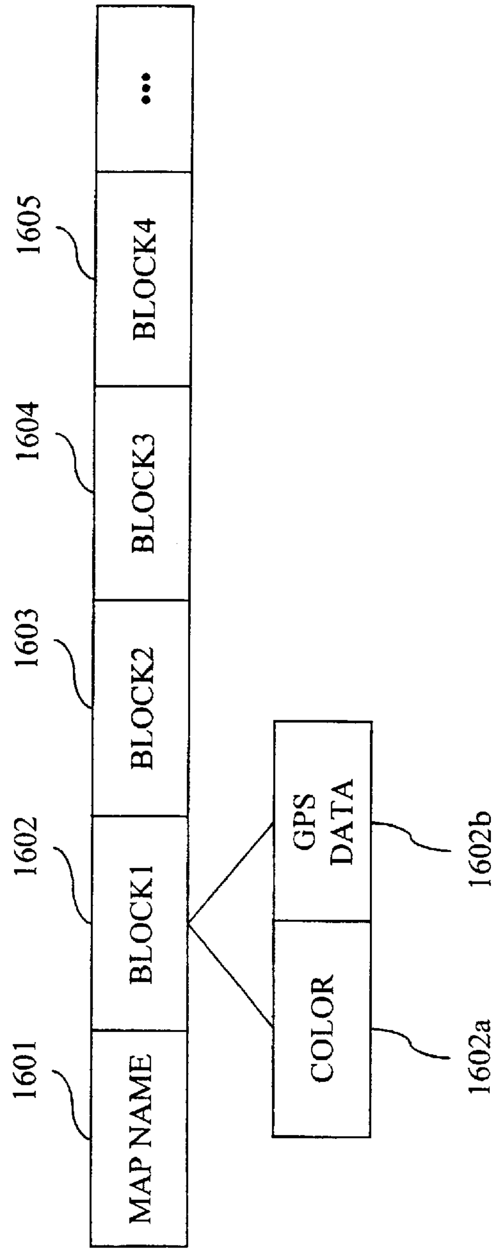
FIG. 16 shows an exemplary format of GPS(Global Positioning System) data of the present invention.

FIG. 16 shows an exemplary format of GPS(Global Positioning System) data of the present invention. GPSII (GPS Indication Information) includes a Map Name 1601 and a plurality of blocks 1602, 1603, 1604 and etc. Each block 1602 includes a Color 1602*a* and a GPS Data 1602*a*. The GPS data is, for example, for representing a specific position.

A user device displays a vector-image based on the received GPSII.

FIGS. 17A–17E show a hierarchical configuration of an exemplary MEI(Map Edit Information) format of the present invention.

Figure 17A:
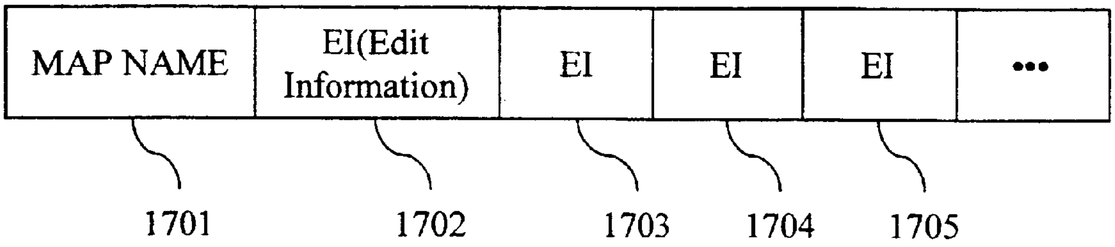
FIGS. 17A–17E show a hierarchical configuration of an exemplary MEI(Map Edit Information) format of the present invention.

Referring to FIG. 17A, a Map Edit Information includes a Map Name 1701 and a plurality of EIs(Edit Informations) 1702, 1703, 1704, 1705 and etc. Each of EIs 1702–1705 may have the formats shown in FIGS. 17B–17E, but the format for EI is not limited to them. That is, EI may have any other format for any other edit command, which is compatible to those shown in FIGS. 17B and 17E.

Also, the format of FIG. 17 is applicable to BMEI(Basic Map Edit Information), TSMEI(Traffic State Map Edit Information) and TSIEI(Traffic State Information Edit Information) of this invention.

Figure 17B:
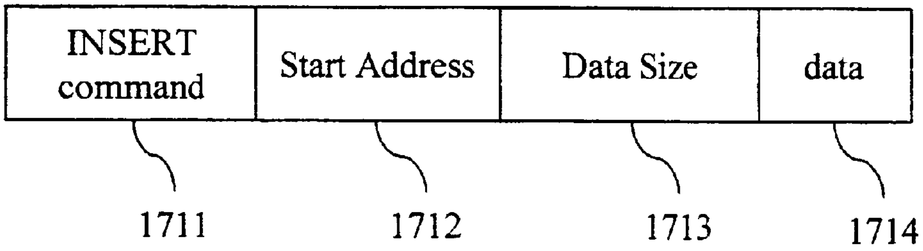
Figure 17C:
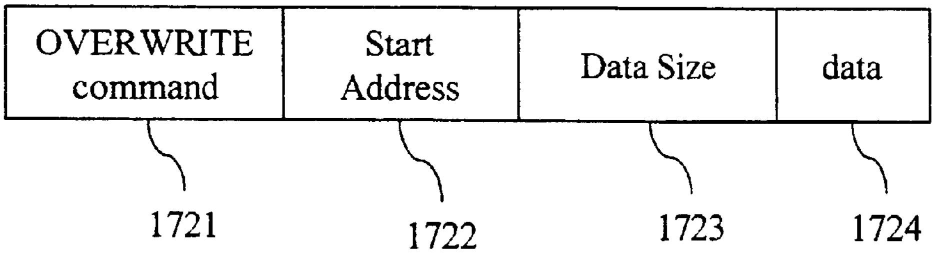
Figure 17D:
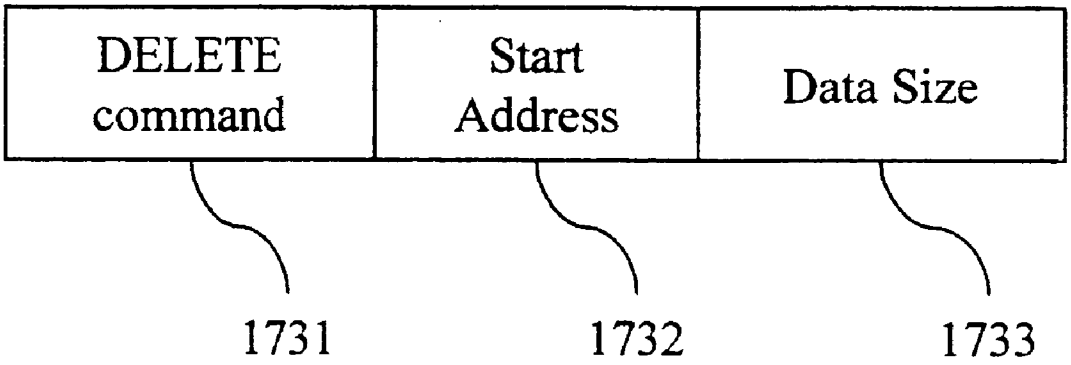
Figure 17E:
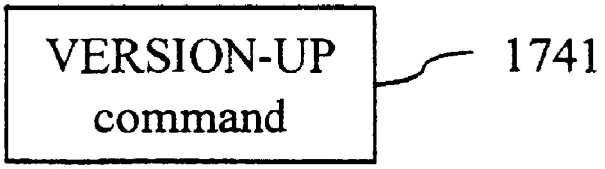

Referring to FIGS. 17B–17E, the first field is for representing the kind of edit command, specifically, 'Insert' command in FIG. 17B, 'Overwrite'command in FIG. 17C, 'Delete' command in FIG. 17D and 'Version-Up' command in FIG. 17E.

The subsequent parts to the first field differ with the edit command.

FIG. 17B is an exemplary format of EI for 'inserting.' Here, EI includes an Insert Command 1711, a Start Address 1712, a Data Size 1713 and at least one Data 1714.

The Start Address 1712 represents the start address (or location) at which data insertion is started and the Data Size 1713 represents the size of the Data 1714. In preferred embodiments, the size is expressed in the number of bytes. The Data 1714 represents data to be inserted.

Referring to FIG. 17C, which is an exemplary format of EI for 'overwriting', EI includes an Overwrite Command 1721, a Start Address 1722, a Data Size 1723 and at least one Data 1724.

The Start Address 1722 represents the start address (or location) at which data overwriting is started and the Data Size 1723 represents the size of the Data 1724. The Data 1724 represents the data to be newly written in data overwriting operation.

Referring to FIG. 17D, which is an exemplary format of EI for 'deleting', EI includes a Delete Command 1731, a Start Address 1732 and a Data Size 1733.

The Start Address 1732 represents the start address (or location) at which data deletion is started and the Data Size 1733 represents the size of the Data to be deleted.

In FIG. 17E, EI includes a Version-Up Command 1741. When a Version-Up command 1741 is detected, the version of the corresponding map is updated (or increased).

Figure 18:
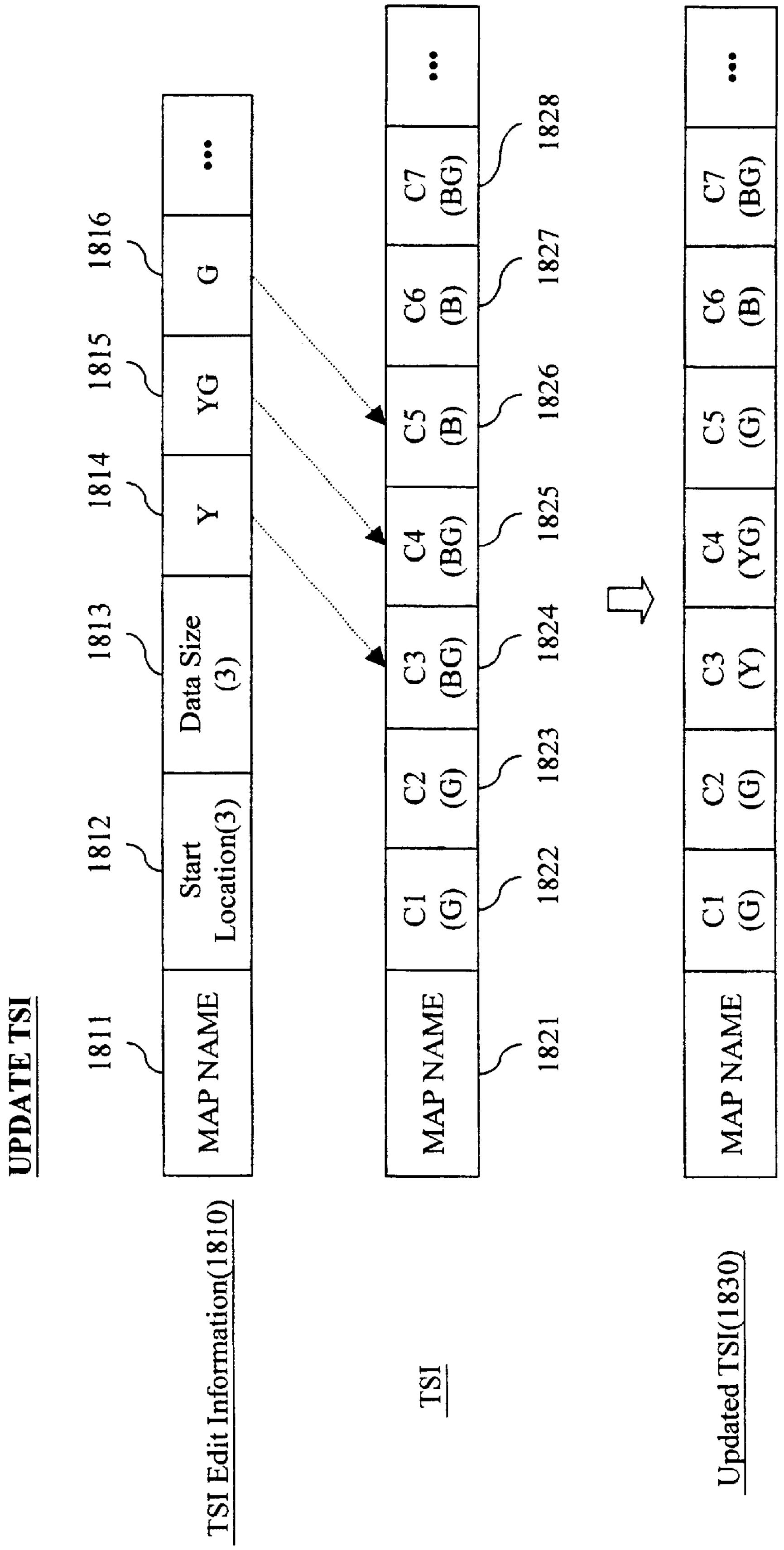
FIG. 18 is a diagram for illustrating a TSI(Traffic State Information) updating process using TSI Edit Information in accordance with one preferred embodiment of the present invention.

FIG. 18 is a diagram for illustrating an updating process of TSI(Traffic State Information) using TSI Edit Information in accordance with one preferred embodiment of the present invention.

in FIG. 18, TSIEI(Traffic State Information Edit Information) 1810 includes a Map Name 1811, a Start Location 1812 (whose content is '3'), a Data Size 1813 (whose content is '3') and a plurality of Data 1814, 1815 and 1816. TSI includes a Map Name 1821 and a plurality of Colors (each of which corresponds to a section velocity) 1822, 1823, 1824, 1825, 1826, 1827, 1828 and etc.

In this example, since the Start Location 1812 is '3' and the Data Size 1813 is '3', 'Blue-Green', 'Blue-Green' and 'Blue' of C3–C5 1824–1826 are substituted with 'Yellow', 'Yellow-Green' and 'Green' of the Data 1814–1816, so as to produce the updated TSI 1830.

In preferred embodiments, the displaying of BM image, the updating TSI and the updating TSM can be performed independently and/or in parallel.

Figure 19A:
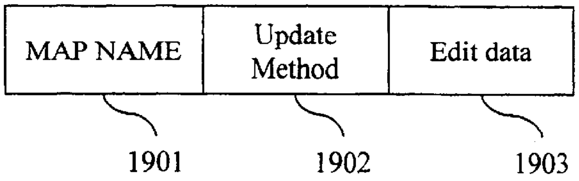
FIGS. 19A–19C illustrate a hierarchical configuration of an exemplary TSIEI(Traffic State Information Edit Information) of the present invention.
Figure 19B:
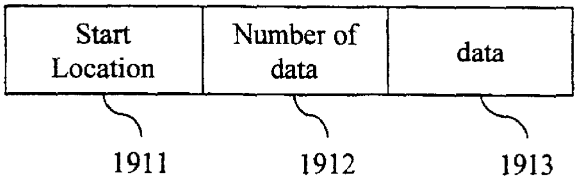
Figure 19C:
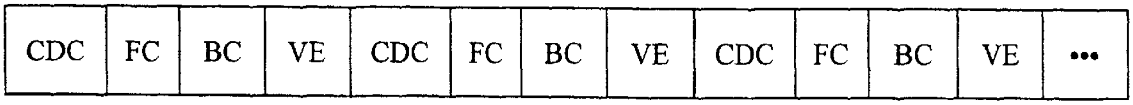

FIGS. 19A–19C illustrate a hierarchical configuration of an exemplary TSIEI(Traffic State Information Edit information) of the present invention.

In FIG. 19A, TSIEI includes a Map Name 1901, an Update Method 1902 and an Edit Data 1903. The Update Method 1902 represents which of the formats for 'partial updating' and 'entire updating' the subsequent the Edit Data 1903 has.

FIG. 19B shows the format of Edit Data 1903 for partial updating. In FIG. 19B, Edit Data 1903 includes a Start Location 1911, a Data Size 1912 and at least one Data 1913. The Start Location 1911 represents the start location at which data updating is started and the Data Size 1912 represents the size of the Data 1913. The Data 1913 represents the data to be newly written in data updating operation.

FIG. 19C shows the format of Edit Data 1903 for 'entire updating.' As shown in FIG. 19C, the Edit Data 1903 of TSIEI for 'entire updating' has substantially the same format as that of TSI. Here, CDC plays a role of SDC(Section Discriminating Code), as mentioned above.

A user device of this invention, which can handle the above described Maps or Data, may be implemented in the form of On-Vehicle type, Handy type, Desk-top type and the like.

Also, the user device has a memory for storing at least one BM and a TSM and has a communication function for receiving a TSI of this invention. In addition, the user device has a function for processing vector entities so as to produce an image according thereto.

Figure 20A:
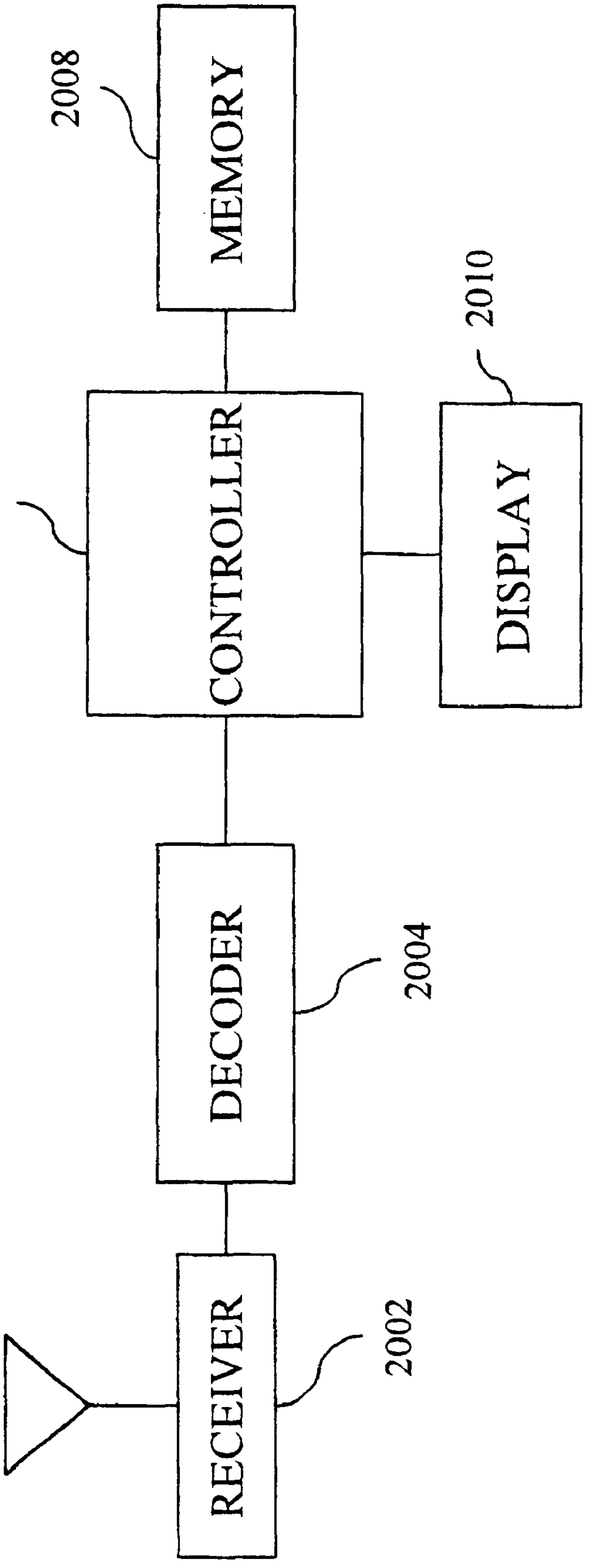
FIG. 20A shows an exemplary configuration of a user device of the present invention.

FIG. 20A shows an exemplary configuration of a user device of the present invention.

In FIG. 20A, the user device of this invention includes a receiver 2002, a decoder 2004, a controller 2006, a memory 2008 and a display 2010.

The receiver 2002 receives a signal carrying TSI and preferably TSM, BM and the like of this invention, so as to apply it to the decoder 2004. The decoder 2004 decodes the received signal to produce TSI(Traffic state Information) and it can further decode TSM(Traffic State Map), Compressed-TSM, BM(Basic Map), Compressed-BM, Compressed-TSI, PII(Position Indication Information), Compressed-PII, RII (Route Indication Information), Compressed-RII, BMEI (Basic Map-Edit Information), Compressed-BMEI, GPSII (GPS Indication Information), Compressed-GPSII, TSIEI (Traffic State Information Edit Information), Compressed-TSIEI, TSMEI(Traffic State Map Edit Information), Compressed-TSMEI, FCTSI(Flag-Coded Traffic State Information) and Compressed-FCTSI of this invention. The decoded result is applied to the controller 2006. The controller 2006 performs the above explained functions: TSM updating using TSI; TSM generating; Producing an image based on a BM and/or TSM; Selecting a suitable BM, TSM, TSectM and etc. based on the information of Map Name; Confirming Version of Maps; Editing Maps(or Data); and the like.

The memory 2008 stores at least one BM and preferably at least one TSM or TSectM. The memory 2008 can store TSI(Traffic state Information), PII(Position Indication Information), RII(Route Indication information), BMEI (Basic Map-Edit Information), GPSII(GPS Indication Information), TSIEI(Traffic State Information Edit Information), TSMEI(Traffic State Map Edit Information), FCTSI(Flag-Coded Traffic State Information)and etc.

The display 2010 can be implemented by any kind of display panel (e. g. a TFT-LCD panel).

Here, the display 2010 can be omitted. In this case, the user device of this invention can be used in connection with a conventional display such as a LCD panel or the like.

Figure 20B:
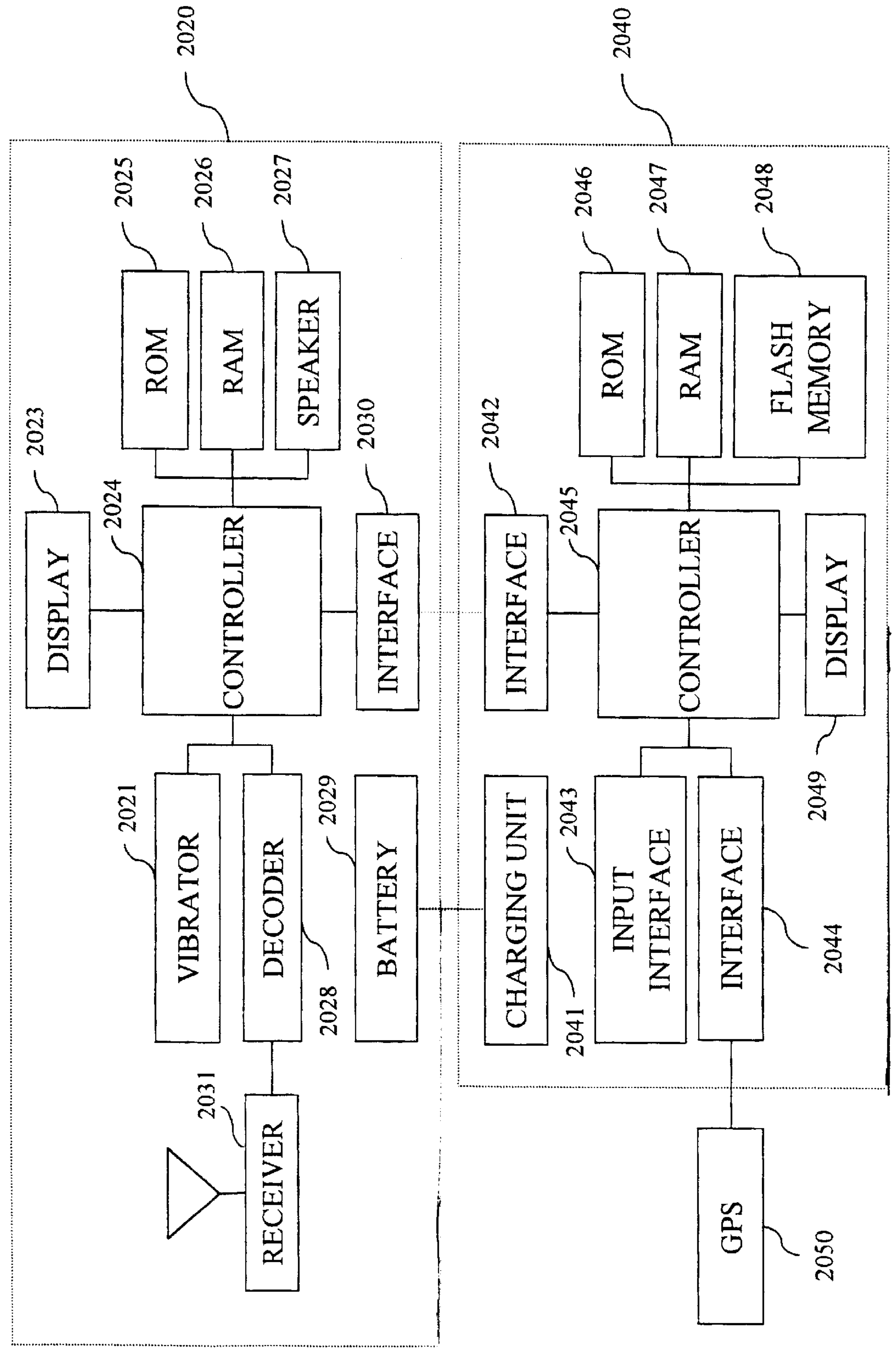
FIG. 20B illustrates an alternative configuration of a user device of the present invention.

FIG. 20B illustrates an alternative configuration of a user device of the present invention, in which the user device is composed of two parts: a mobile unit 2020 and a body unit 2020.

The mobile unit 2020 can be implemented including a beeper function, a cellular phone function, a PCS phone function, a FM receiver function or a TRS receiver function along with the functions of this invention. The mobile unit 2020 includes an antenna 2031, a vibrator 2021, a display 2023, a controller 2024, at least one memory(i. e. ROM 2025 and RAM 2026), speaker 2027, a receiver 2022, a decoder 2028, a battery 2029 and an interface 2030.

The operations of the components in the mobile unit 2020 are substantially the same as those in a conventional beeper, a cellular phone or a PCS phone, except for the following functions according to this invention. For example, the decoder 2028 performs a decoding suitable for a specific communication protocol. In other words, when the traffic information of this invention is transmitted through a PCS phone to the user device, the decoder 2028 performs the decoding suitable for the PCS related protocols.

Thus, only the components for the inventive function of the present invention will be described in the following.

The display 2023 is preferably a LCD display and more preferably a color display panel such as a TFT-LCD panel. The controller 2024 is typically implemented with a microprocessor and the processing of traffic informations such as TSI, TSM and etc. is implemented by a software program. Alternatively, a dedicated IC for the inventive traffic information processing can be designed.

However, for dispersing the load of data processing, the inventive data processing is preferably performed in the controller 2045 in the body unit 2040. Also, BM and TSM of this invention are preferably stored in the memory (i. e. ROM 2046 or the flash memory 2048) of the body unit 2040, in stead of being stored in the mobile unit 2020. In other words, the memory of the mobile unit 2020 stores a TSI master file and updates it based on the received TSI. This is because the received TSI could not be transmitted to the body unit when the mobile unit 2020 is not coupled to the body unit 2040, so as not to be immediately used for updating or modifying the TSM.

Then, on the request and/or the detection of connection to the body unit, the mobile unit 2020 may transmit some parts or the entire of the updated TSI master file to the body unit.

The interface 2030 can be coupled to the interface 2042 of the body unit 2040. These interfaces 2030 and 2042 perform the communication between the mobile unit 2020 and the body unit 2040. Also, the interface 2030 detects whether the mobile unit 2020 is mounted onto the body unit 2040 or not, so as to produce a detection signal to the controller 2024.

In preferred embodiments, the TSI master file may be stored in the RAM 2026.

In summary, in the mobile unit 2020 the traffic information of this invention is applied through the antenna 2031, the receiver 2022 and the decoder 2028 to the controller 2024 and then decoded in the controller 2024 so as to be used for updating the TSI master file in the RAM 2025. Thus, the TSI master file in the RAM 2025 can be maintained with the newest traffic state information.

The body unit 2040 includes a controller 2045, ROM 2046, RAM 2047, the flash memory 2048, the interface 2042, a charging unit 2041, a display 2049, an interface 2044 for GPS and an input interface 2043. The input interface 2043 is for inputting a user's command and can be implemented by a key pad, a touch screen and the like. The charging circuit 2041 can be connected to the battery 2029 which is re-chargable, so as to charge the battery 2029 while connecting.

Subsequently, the communication between the body unit 2040 and the mobile unit 2020 will be explained in later with reference to FIGS. 25–27.

Also, BM and TSM(or TSectM) are stored in the memory in the body unit and preferably in a re-writable non-volatile memory such as the flash memory 2048. The display 2049 is preferably implemented by a color TFT-LCD panel.

Like this, by implementing the user device with two unit: the body unit and the mobile unit, the needed capacity of the memory of the mobile unit can be decreased. Also, the body unit 2040 may not have any antenna and a receiver.

Figure 21A:
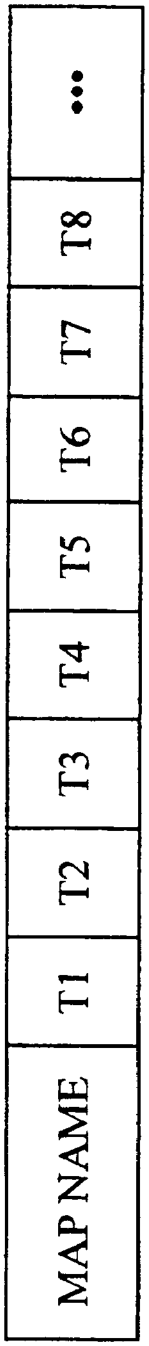
FIG. 21A is a diagram for illustrating an exemplary format of the data to be transmitted to the body unit 2040 from the mobile unit 2020 and FIG. 21B is a diagram for illustrating an exemplary format of the TSM master file stored in the mobile unit 2020.
Figure 21B:
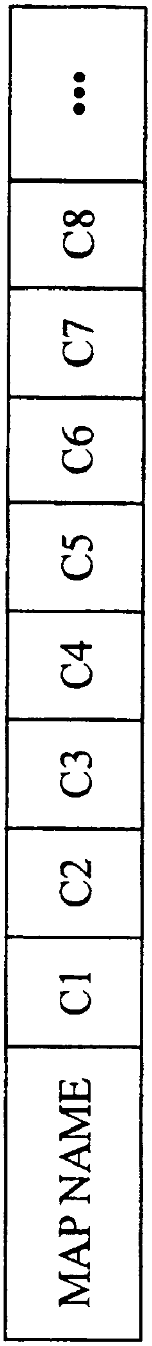

FIG. 21A is a diagram for illustrating an exemplary format of the data to be transmitted to the body unit 2040 from the mobile unit 2020 and FIG. 21B is a diagram for illustrating an exemplary format of the TSI master file stored in the mobile unit 2020.

As shown in FIGS. 21A and 21B, the formats for the transmitted TSI or the TSI master file have substantially the same as that for TSI. Also, the transmitted TSI or the TSI master file can have other formats which are similar to those explained in FIG. 2.

Figure 22:
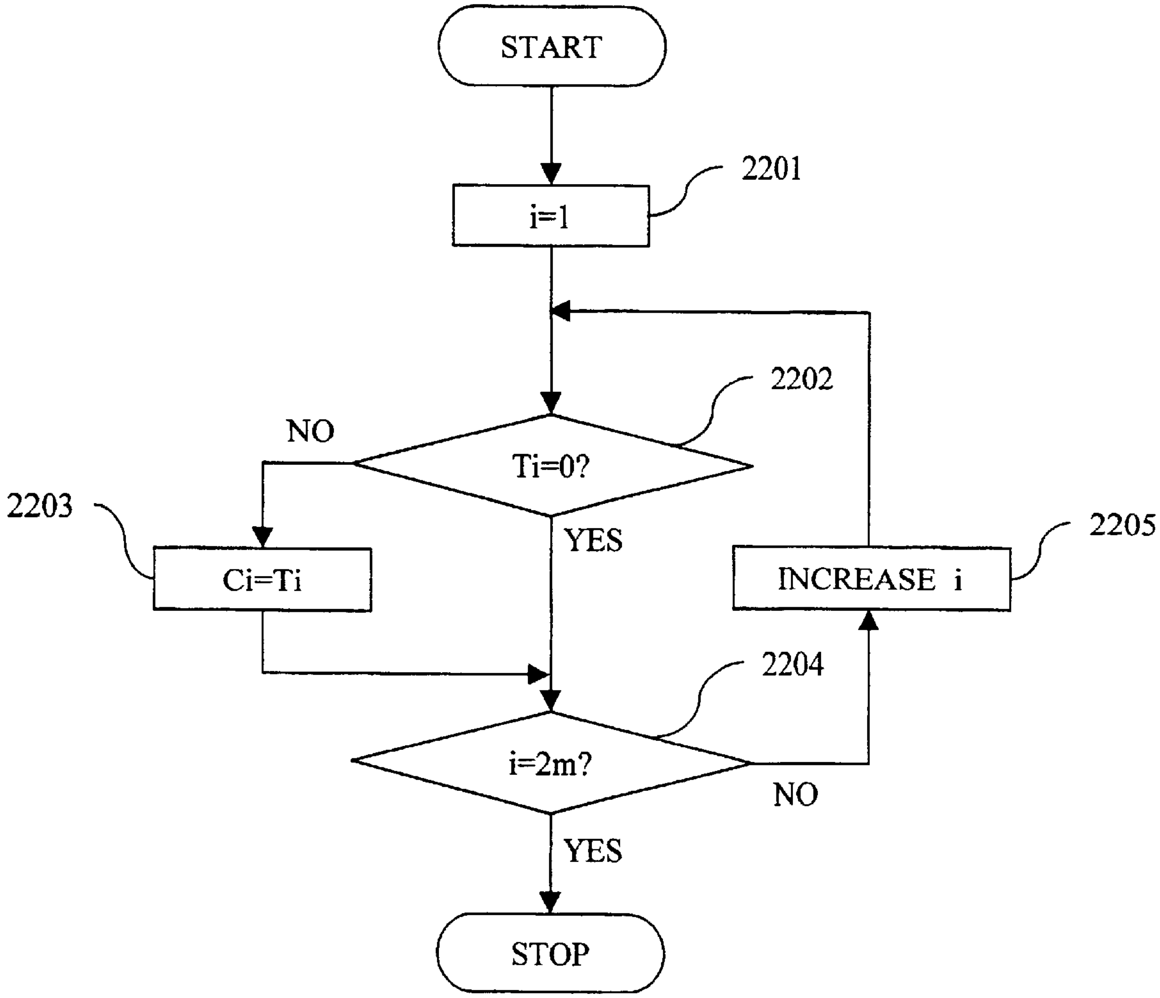
FIG. 22 is a flowchart for representing a method of updating a TSM stored in the body unit based on the received TSI(Traffic State Information) as shown in FIG. 21A.

FIG. 22 is a flowchart for representing a method of updating a TSM stored in the body unit based on the received TSI(Traffic State Information) as shown in FIG. 21A.

Referring to FIG. 22, at step 2201 the variable 'i' is initialized to '1.' This variable '1' functions not only as a nibble pointer for the received TSI but also as a section pointer for the TSM to be updated.

The step 2202 is for checking whether Ti=0 or not, in which Ti means the i-th nibble in the data portion among the received TSI. If so, it is checked whether i=2m or not at step 2204. Here, 'm' represents the number of bytes of the data for TSI except for the Map Name. Otherwise, the attribute value of i-th section in TSM is substituted with Ti and then the process goes to the step 2204. If the check result of step 2204 is negative, the variable 'i' is increased at step 2205 and then the process is fed to the step 2202. Also, if the check result of step 2204 is positive, the process ends.

Figure 23:
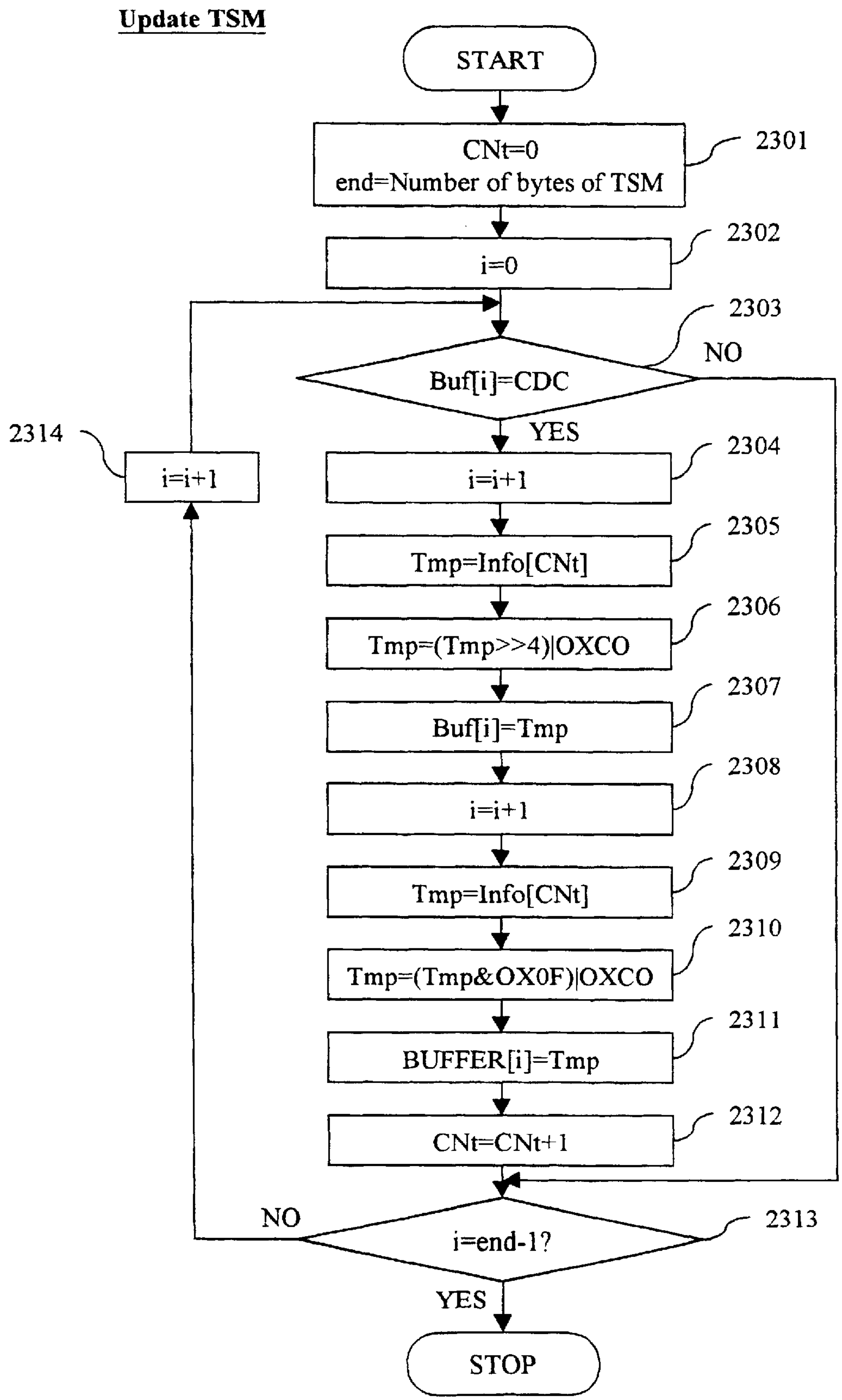
FIG. 23 is a flowchart for illustrating an exemplary detailed process of updating the traffic state map based on the traffic state information in accordance with the present invention.

FIG. 23 is a flowchart for illustrating an exemplary detailed process of updating the traffic state map based on the traffic state information in accordance with the present invention. This figure illustrates a detailed processing flow related to the method as explained with reference to FIG. 8.

For simplicity in explanation, it is assumed that each of CDC(e. g. 'SELECT COLOR' command), SFC(Section Forward Color) and SBC(Section Backward Color) in TSM is 1 byte(=8 bits), while each of FC(Forward Color) and BC(Backward Color) in TSI is 1 nibble(=4 bitss).

At step 2301 the variable 'CNt' and 'end' are initialized to '0' and 'Number of bytes of TSM', respectively and the variable 'i' is initialized to '0' at step 2302.

'Info' represents the data part subsequent to the Map Name in the TSI and 'Buf' represents the data part subsequent to the Map Name in the TSM. Thus, 'Info' includes only color values, while 'Buf includes CDCs(e. g. 'SET COLOR' commands), section forward colors, section backward colors and vector entities.

The step 2303 is for checking whether i-th nibble in the Buf is CDC or not. If so, the process performs steps 2304–2312 and then goes to step 2313. Otherwise the process goes to step 2313.

At step 2304 the variable 'i' is increased by 1 and CNt-th byte in the Info is assigned to a 8-bit temporary buffer Tmp at step 2305.

Subsequently, at step 2306 the data of Tmp is shifted to the right(or the least significant bit) and then logic-OR operated in bitwise with 'C0' in BCD code (that is '11000000').

In other words, if lnfo[CNT]=[C0,C1,C2,C3, C4, C5, C6, C7], , the content of Tmp is [1, 1, 0, 0, C0,C1,C2,C3]. Here, one element represents one bit. Also, the first and the second bits (or '11') is indicative that the byte is color value.

Then, at step 2307, Buf[i] is substituted with Tmp and the variable 'i' is increased at step 2308.

The step 2309 is for setting the 8*b* it temporary buffer Tmp to Info[CNT] and the content of Tmp is logic-AND operated in bitwise with OF(='0000111') in BCD code at step 2310. The logic-ANDed result is also logic-OR operated in bitwise with C0(='11000000') in BCD code. Thus, if Info[CNT]=[C0,C1,C2,C3, C4, C5, C6, C7], the content of Tmp would be [1, 1, 0, 0, C4, C5, C6, C7].

Then, at step 2311 Buf[i] is substituted with Tmp and the variable CNt is increased by 1 at step 2312.

The step 2313 is for checking whether i=end−1 or not. If so, the process ends. Otherwise, the process goes to step 2314 at which the variable 'i' is increased by 1 and then proceeds to step 2303. Thus, until all section attribute values are updated, the loop composed of steps 2303–2313 and 2314 is repeatedly performed.

Figure 24A:
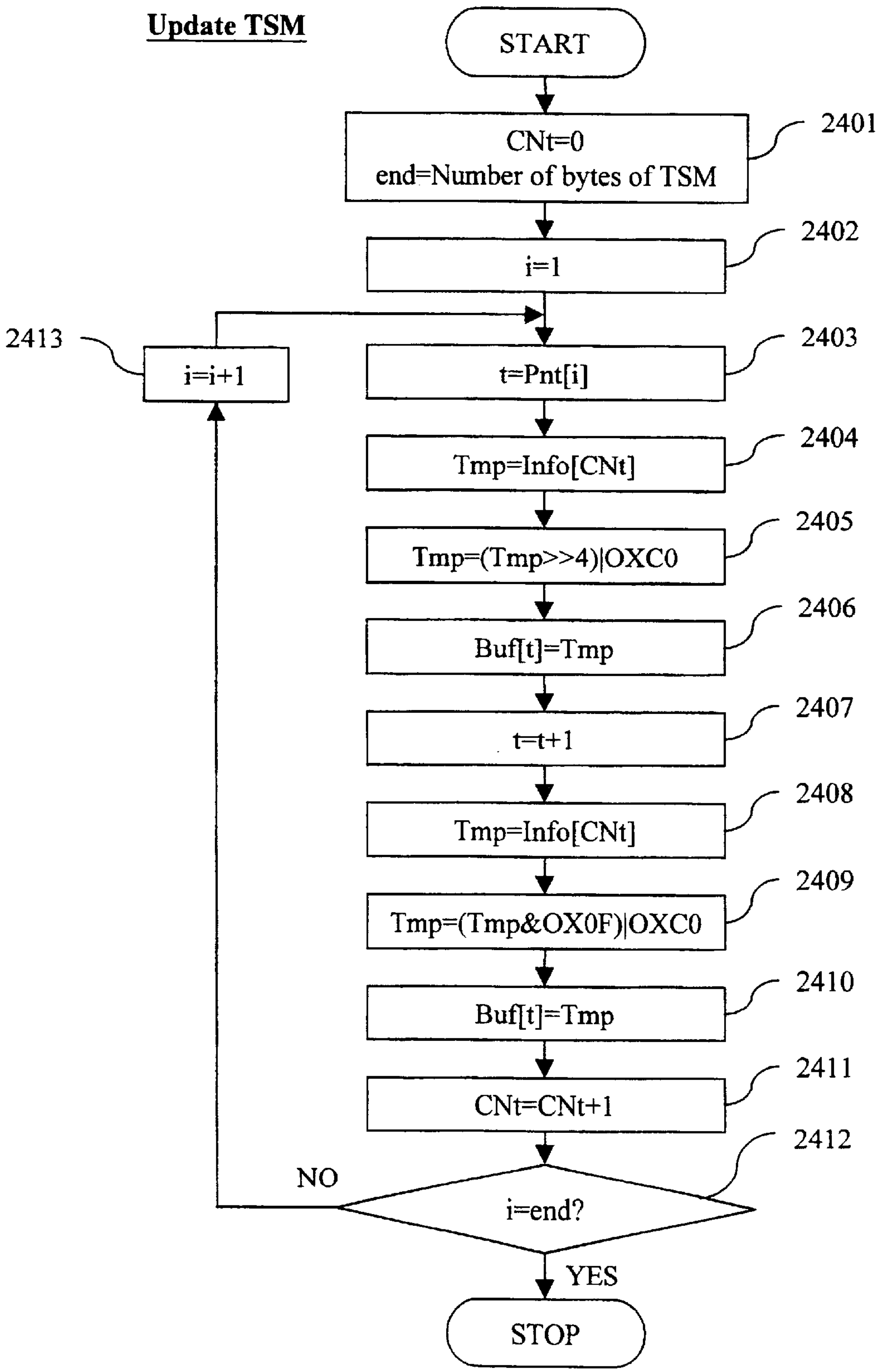
FIG. 24A is a flowchart for illustrating an alternative method of updating the traffic state map based on the received traffic state information in the traffic information method in accordance with the present invention.

FIG. 24A is a flowchart for illustrating an alternative method of updating the traffic state map based on the received traffic state information in the traffic information method in accordance with the present invention, and FIG. 24B represents an exemplary LOCATION TABLE for 'Attribute Value' available for the alternative updating method.

Referring to FIG. 24A, the variable 'CNt' is initialized to '0'; at step 2401 and the variable 'end' is set to the number of bytes of TSM. In FIG. 24A, 'Info' represents the data part subsequent to the Map Name in the TSI and 'Buf' represents the data part subsequent to the Map Name in the TSM. Thus, 'Info' includes only color values, while 'Buf includes CDCs (e. g. 'SET COLOR' commands), section forward colors, section backward colors and vector entities. In addition, 'Pnt' represents the location table(see FIG. 24B). Then, the variable 'i' is initialized to '1' at step 2402 and the variable 't' is set to Pnt[i] which represents the i-th content of Pnt. The step 2404 is for assigning Info[CNt] to an 8-bit temporary buffer Tmp. Then, at step 2405, the data of Tmp is shifted by 4 bits to right and then logic-OR operated in bitwise with 'C0' in BCD code (or '11000000'). Thus, similarly to FIG. 23, if Info[CNt]=[C0,C1,C2,C3, C4, C5, C6, C7], the content of Tmp is [1, 1, 0, 0, C0, C1, C2, C3]. Here, one element represents one bit. Also, the first and second bits '11' plays a role of indicating that the byte is color value. The third and the fourth bits can be set with other value, especially when any collision with color values.

Then, at step 2406 Buf[t]=Tmp and then at step 2407 the variable 't' is. increased by one. The 8-bit temporary buffer Tmp is set with Info[CNt] at step 2408 and then the content of Tmp is logic-ANDed in bitwise with 0F in BCD code (that is '00001111'). This logic-ANDed result is also logic-ORed in bitwise with CO(='11000000) in BCD code. Thus, if Info[CNt]=[C0,C1,C2,C3, C4, C5, C6, C7], the content of Tmp is [1, 1, 0, 0, C4, C5, C6, C7]. Then, Buf[t] is updated with Tmp at step 2410 and the variable CNt is increased by one at step 2411. The step 2412 is for checking whether i=end or not. If the answer of step 2412 is 'yes', the process ends. Otherwise, the process goes to step 2413 at which the variable 'i' is increased by one, and then proceeds to step 2403.

Thus, until all section attribute values are updated, the process is performed, repeating the loop of steps 2403–2412 and 2413.

Figure 25A:
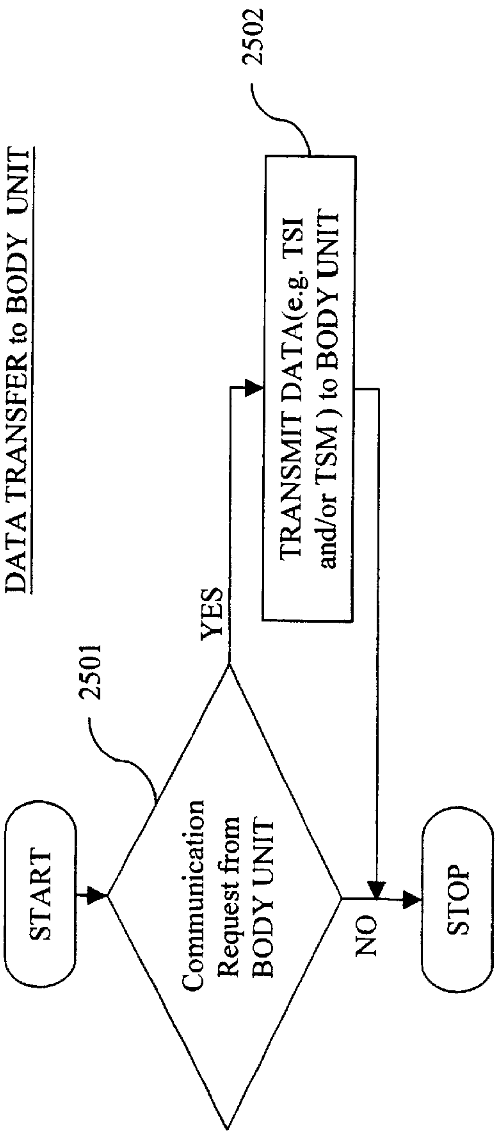
FIGS. 25A and 25B are flowcharts of exemplary methods for exchanging information between the body unit 2040 and the mobile unit 2020 in accordance with the present invention.
Figure 25B:
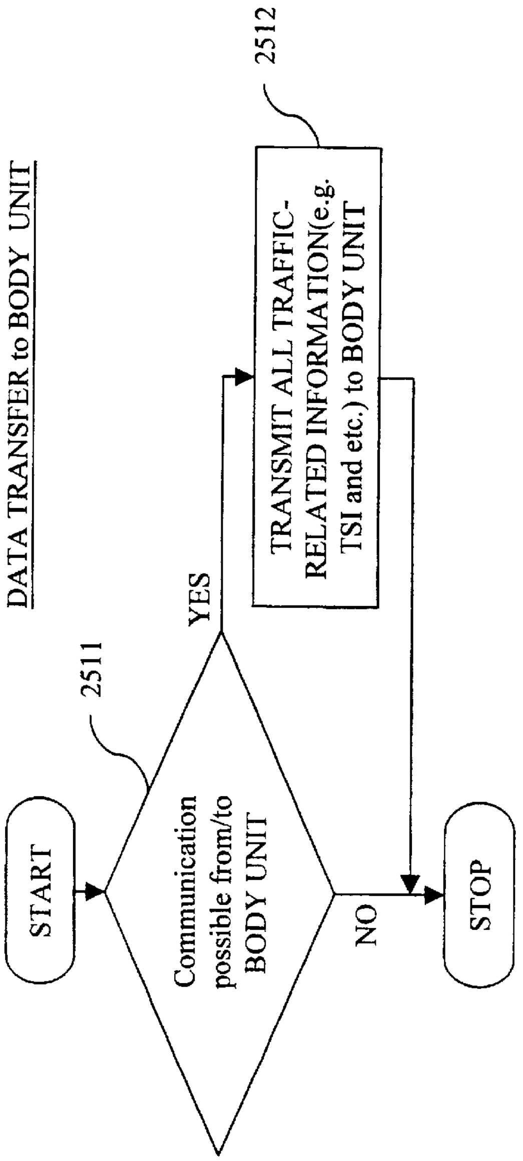

FIGS. 25A and 25B are flowcharts of exemplary methods for exchanging information between the BODY UNIT and the MOBILE UNIT in accordance with the present invention.

Referring to FIG. 25A, it is checked whether any communication request from the body unit is detected or not in the mobile unit at step 2501. If so, the process goes to step 2502 at which the requested TSI (and/or TSM) is sent to the body unit.

In FIG. 25B, the step 2511 is for determining whether the mobile unit is mounted onto the body unit by detecting a MOUNT signal. If so, the process goes to step 2512 at which all the traffic-related information(e. g. TSI and etc.) are sent to the body unit.

Figure 26:
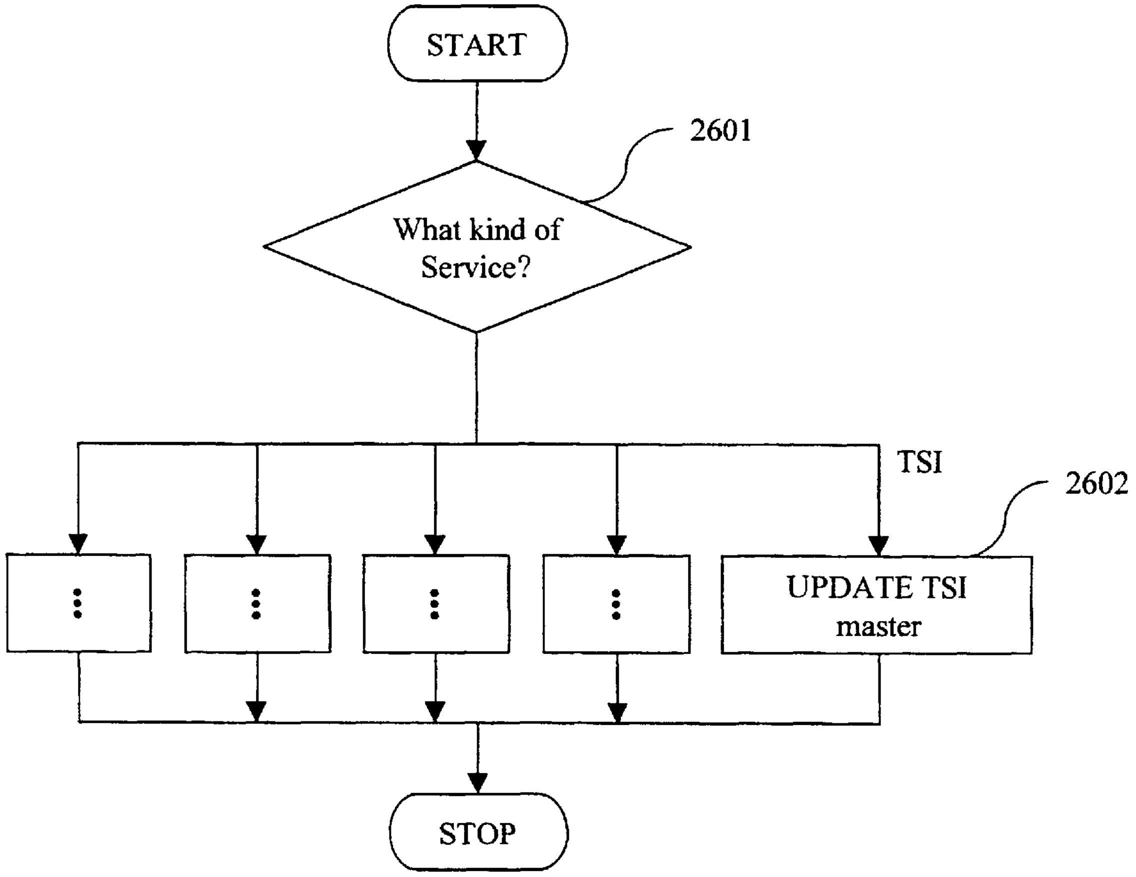
FIG. 26 is a flowchart for illustrating an exemplary method performed by the mobile unit in accordance with the present invention.

FIG. 26 is a flowchart for illustrating an exemplary method performed by MOBILE UNIT in accordance with the present invention.

Referring to FIG. 26, it is examined what kind of service the user wants at step 2601 so as to proceed to the suitable step according to the selected service kind. If the user wants to be served with traffic information service, the process goes to step 2602 at which a suitable TSI is received via a communication network and the TSI master file is updated based on the received TSI.

Here, when a conventional PCS phone function is incorporated in the user device, a telephone service, a mailing service, traffic information service and the like can be supported, as the services available by a user.

Figure 27:
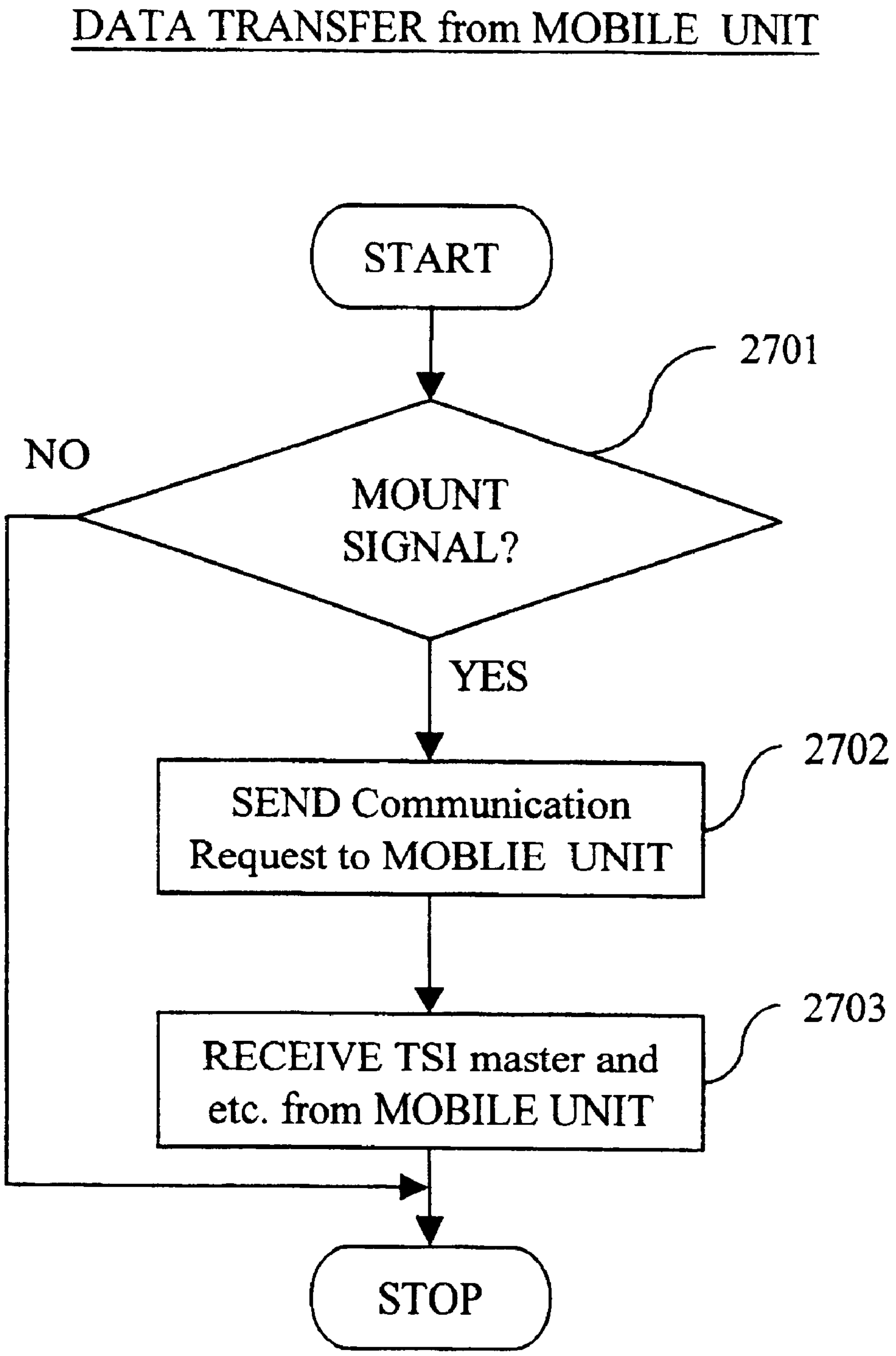
FIG. 27 is a flowchart for illustrating an exemplary method for exchanging between body unit and mobile unit, which is performed by the body unit, when the mobile unit (e. g. cellular phone) is mounted onto the body unit of the present invention.

FIG. 27 is a flowchart for illustrating an exemplary method for exchanging between BODY UNIT and MOBILE UNIT, which is performed by the BODY UNIT, when the MOBILE UNIT (e. g. cellular phone) is mounted onto the BODY UNIT of the present invention.

Referring to FIG. 27, Step 2701, it is detected whether the mobile unit is mounted onto the body unit. This detection can be made by an interrupt detection or a polling confirmation. If so, the process goes to step 2702 in which a communication request is sent to the mobile unit and then at step 2703 the body unit receives a TSI master file and etc. from the mobile unit.

Although preferred embodiments of the present invention has been illustrated and described, various alternatives, modifications and equivalents may be used. Therefore, the foregoing description should not be taken as limiting the scope of the present invention which is defined by the appended claims. Particularly, while the above explanation of the present invention has been made in connection with traffic information, this invention is also applicable to any kind of time-variant regional information such as navigation information, transportation management information, bus operation information and etc.

In addition, computer-readable mediums containing a program of instructions to perform the inventive methods are provided.

INDUSTRIAL APPLICABILITY

As described above, the inventive method reduces the data quantity to be transmitted for providing an image-based time-variant regional information such as image-based traffic information by introducing the concept of 'section.' If 1500 sections in a map including 6000 sections are changed in velocity every 10 minutes, the occupancy of channel to be required for transmitting the inventive TSI is reduced to 1.5% or below (especially 0.7% or below in FLEX protocol for beeper).

Also, the Edit Information for TSM, BM, TSI are preferably transmitted in night when a very little communication is typically made.

Furthermore, the inventive user device can incorporate the functions for serving various kinds of daily-life-information that can be visualized.

What is claimed is:

1. A data signal embodied in a carrier wave, said data signal providing traffic state information to a user device, wherein said traffic section map includes at least one section including at least one vector entity, said data signal comprising:

a map identifier to be used for selecting a suitable traffic state map which corresponds to the traffic state information; and at least one traffic state data in section-wise, wherein said traffic state data is to be used for designating an attribute of said vector entity included in corresponding section of said traffic section map.

2. The data signal embodied in a carrier wave according to claim 1, wherein said user device further stores at least one basic map.

3. The data signal embodied in a carrier wave according to claim 1, wherein each section of said traffic section map further includes a section discriminating code.

4. The data signal embodied in a carrier wave according to claim 3, wherein said section discriminating code is an attribute designating command.

5. The data signal embodied in a carrier wave according to claim 4, wherein said section discriminating code is a color designating command.

6. The data signal embodied in a carrier wave according to claim 5, wherein said traffic state data is a color value.

7. The data signal embodied in a carrier wave according to claim 1, wherein said map identifier comprises a version identification.

8. The data signal embodied in a carrier wave according to claim 1, wherein said traffic state data for one section includes a forward color value and a backward color value.

9. The data signal embodied in a carrier wave according to claim 1, wherein said traffic state data includes a data type flag having a first value or a second value;

said first value being indicative of 'no change'; and said second value being followed by a 'changed traffic state data.'

10. A data signal embodied in a carrier wave, said data signal providing time-variant geographical information to a user device which stores at least one section map, wherein said section map includes at least one section, said data signal comprising:

a map identifier to be used for selecting a suitable section map at the user device; and at least one time-variant value in section-wise, wherein said time-variant value is to be used for updating at least one component included in corresponding section of said section map.

11. The data signal embodied in a carrier wave according to claim 10, wherein the section of said section map includes at least one vector entity, and wherein said time-variant value is to be used for designating an attribute of at least one vector entity included in corresponding section of said section map.

12. A method for providing traffic information to a user device comprising the step of:

transmitting a TSI(=traffic state information) to the user device, wherein said user device stores at least one basic map and at least one traffic section map;

wherein said traffic section map includes at least one section including at least one vector entity; and wherein said TSI comprises:

a map identifier to be used for selecting a suitable traffic section map which corresponds to said TSI at the user device; and at least one traffic state data in section-wise, wherein said traffic state data is to be used for designating an attribute of said vector entity included in corresponding section of said traffic section map.

13. The method for providing traffic information according to claim 12, wherein said user device further stores at least one basic map.

14. The method for providing traffic information according to claim 12, wherein each section of said traffic section map further includes a section discriminating code.

15. The method for providing traffic information according to claim 14, wherein said section discriminating code is an attribute designating command.

16. The method for providing traffic information according to claim 15, wherein said section discriminating code is a color designating command.

17. The method for providing traffic information according to claim 16, wherein said traffic state data is a color value.

18. The method for providing traffic information according to claim 12, wherein said map identifier comprises a version identification.

19. The method for providing traffic information according to claim 12, wherein said traffic state data for one section includes a forward color value and a backward color value.

20. The method for providing traffic information according to claim 12, wherein said traffic state data includes a data type flag having a first value or a second value;

said first value being indicative of 'no change'; and said second value being followed by a 'changed traffic state data.'

21. The method for providing traffic information according to claim 12, further comprising the step of:

transmitting the traffic section map; and wherein said traffic section map includes a map identification and a plurality of sections; and wherein said section of the traffic section map comprises: an attribute designating command; and at least one vector entity.

22. The method for providing traffic information according to claim 21, wherein said attribute designating command is used as a section discriminating code.

23. The method for providing traffic information according to claim 22, wherein said section of the traffic section map further comprises at least one attribute value.

24. The method for providing traffic information according to claim 23, further comprising the step of:

transmitting a MEI(=map edit information) which includes a map identification and a plurality of edit information blocks, wherein said map identification of MEI is to be used for selecting a map to be edited; and wherein each of said plurality of edit information blocks includes an edit command.

25. The method for providing traffic information according to claim 24, wherein, if said edit command is 'insert' command, each of said plurality of edit information blocks further comprises:

a start address representing an address at which an inserting is started;

a data size representing the size of data to be inserted; and at least one data to be inserted.

26. The method for providing traffic information according to claim 24, wherein, if said edit command is 'delete' command, each of said plurality of edit information blocks further comprises:

a start address representing an address at which an deleting is started; and a data size representing the size of data to be deleted.

27. The method for providing traffic information according to claim 24, wherein, if said edit command is 'overwrite' command, each of said plurality of edit information blocks further comprises:

a start address representing an address at which an overwriting is started;

a data size representing the size of data to be overwritten; and at least one data to be used for overwriting.

28. The method for providing traffic information according to claim 23, wherein said attribute value includes a forward color and a backward color.

29. The method for providing traffic information according to claim 23, wherein said attribute value is color.

30. The method for providing traffic information according to claim 12, further comprising the step of:

transmitting a basic map including a map identification and an image data, said map identification representing a region covered by the basic map.

31. The method for providing traffic information according to claim 12, further comprising the step of:

transmitting a RII(route indication information) including a map identification and a plurality of graphic vectors;

wherein said user device stores at least one basic map including a map identification and an image data, said map identification of the basic map representing a region covered by the basic map;

wherein said map identification of RII is used for selecting at least one suitable basic map at the user device; and wherein said graphic vectors for RII including an attribute designating statement, a shape designating statement and a position designating statement, said attribute designating statement being composed of an attribute designating command and at least one attribute value.

32. The method for providing traffic information according to claim 12, wherein said traffic state data in section-wise of TSI includes a section number and at least one section value.

33. The method for providing traffic information according to claim 32, wherein said section value is color value.

34. A method for providing a geographical information to a user device including at least one map to be used for displaying an information-containing image, comprising the step of:

transmitting a MEI(=map edit information) which includes a map identification and a plurality of edit information blocks, wherein said map identification of MEI is to be used for selecting a map to be edited; and wherein each of said plurality of edit information blocks includes an edit command.

35. The method for providing a geographical information according to claim 34, wherein, if said edit command is 'insert' command, each of said plurality of edit information blocks further comprises:

a start address representing an address at which an inserting is started;

a data size representing the size of data to be inserted; and at least one data,to be inserted.

36. The method for providing a geographical information according to claim 34, wherein, if said edit command is 'delete' command, each of said plurality of edit information blocks further comprises:

a start address representing an address at which an deleting is started; and a data size representing the size of data to be deleted.

37. The method for providing a geographical information according to claim 34, wherein, if said edit command is 'overwrite' command, each of said plurality of edit information blocks further comprises:

a start address representing an address at which an overwriting is started;

a data size representing the size of data to be overwritten; and at least one data to be used for overwriting.

38. A method for providing time-variant geographical information to a user device storing at least one basic map including a map identification and an image data, said map identification of the basic map representing a region covered by the basic map, comprising the step of:

transmitting a RII(route indication information) including a map identification and a plurality of graphic vectors, said RII and said basic map being used for producing an information-containing image at the user device;

wherein said map identification of RII is used for selecting at least one suitable basic map at the user device; and wherein each of said graphic vectors for RII including an attribute designating statement, a shape designating statement and a position designating statement, said attribute designating statement being composed of an attribute designating command and at least one attribute value.

39. A method for providing a time-variant geographical information to a user device comprising the step of:

transmitting a TVI(=time-variant information) to the user device, wherein said user device stores at least one section map;

wherein said section map includes at least one section including at least one component; and wherein said TVI comprises:

a map identifier to be used for selecting a suitable section map which corresponds to said TVI, at the user device; and at least one time-variant data in section-wise, wherein said time-variant data is to be used for updating at least one component included in corresponding section of said section map.

40. The method for providing a time-variant geographical information according to claim 39, wherein the section of said section map includes at least one vector entity, and wherein said time-variant value is to be used for designating an attribute of at least one vector entity included in corresponding section of said section map.

41. A method for processing traffic information at a user device comprising the steps of:

receiving a TSI(=traffic state information), said TSI including a map identifier and at least one traffic state data in section-wise;

retrieving at least one traffic section map in accordance with the map identifier of said TSI from a library of stored traffic section maps, wherein each of said traffic section maps includes a plurality of sections and each section includes at least one vector entity;

producing a TSM(=traffic state map) using said traffic section map and said TSI, said traffic state data of TSI being used for designating an attribute of said vector entity included in corresponding section of said traffic section map;

retrieving at least one BM(=basic map) in accordance with the map identifier of said TSI from a library of stored basic maps, said BM including an image data for time-invariant components in a region; and displaying a traffic-information-containing image in accordance with said BM and said TSM.

42. A method for processing traffic information at a user device comprising the steps of:

receiving a TSI(=traffic state information), said TSI including a map identifier and at least one traffic state data in section-wise;

selecting at least one TSM(=traffic state map) based on the map identifier of said TSI, wherein said TSM includes at least one section and each section of said TSM includes an attribute designating statement and at least one vector entity, said attribute designating statement including an attribute designating command and at least one attribute value;

modifying the TSM using said TSI, said traffic state data of TSI being used for updating said attribute value of corresponding section of said TSM;

selecting at least one BM(=basic map) based on the map identifier of said TSI, said BM including an image data for representing time-invariant components in a region; and displaying a traffic-information-containing image in accordance with said BM and said TSM.

43. The method for processing traffic information at a user device according to claim 42, wherein said attribute value is color value.

44. The method for processing traffic information at a user device according to claim 42, further comprising the steps of:

receiving a RII(route indication information) including a map identification and a plurality of graphic vectors, each of said graphic vectors for RII including an attribute designating statement, a shape designating statement and a position designating statement, said attribute designating statement being composed of an attribute designating command and at least one attribute value; and selecting the basic map in accordance with said map identification of the RII; and displaying a route-information containing image in accordance with said BM and said RII.

45. The method for processing traffic information at a user device according to claim 42, further comprising the steps of:

receiving a MEI(=map edit information) which includes a map identification and a plurality of edit information blocks;

selecting one of said TSM and said BM in accordance with said map identification of MEI; and editing said selected map according to said plurality of edit information blocks.

46. The method for processing traffic information at a user device according to claim 45, wherein each of said plurality of edit information blocks includes an edit command; and if said edit command is an 'insert' command, each of said plurality of edit information blocks further comprising:

a start address representing an address at which an inserting is started;

a data size representing the size of data to be inserted; and at least one data to be inserted.

47. The method for processing traffic information at a user device according to claim 45, wherein each of said plurality of edit information blocks includes an edit command; and if said edit command is 'delete' command, each of said plurality of edit information blocks further comprising:

a start address representing an address at which an deleting is started; and a data size representing the size of data to be deleted.

48. The method for processing traffic information at a user device according to claim 45, wherein each of said plurality of edit information blocks includes an edit command; and if said edit command is 'overwrite' command, each of said plurality of edit information blocks further comprising:

a start address representing an address at which an overwriting is started;

a data size representing the size of data to be overwritten; and at least one data to be used for overwriting.

49. A method for processing a route information representing at least one path to a specific location at a user device, comprising the steps of:

receiving a RII(route indication information) including a map identification and a plurality of graphic vectors, each of said graphic vectors for RII including an attribute designating statement, a shape designating statement and a position designating statement, said attribute designating statement being composed of an attribute designating command and at least one attribute value; and selecting a basic map in accordance with said map identification of the RII, said BM including an image data for representing time-invariant components in a region; and displaying a route-information containing image in accordance with said BM and said RII.

50. A method for processing a time-variant geographical traffic information at a user device comprising the steps of:

receiving a MEI(=map edit information) which includes a map identification and a plurality of edit information blocks;

selecting one of a plurality of maps in accordance with said map identification of MEI, each map including an image data to be used for producing an information-containing geographical image; and editing said selected map according to said plurality of edit information blocks.

51. The method for processing a time-variant geographical traffic information according to claim 50, wherein each of said plurality of edit information blocks includes an edit command; and if said edit command is an 'insert' command, each of said plurality of edit information blocks further comprising:

a start address representing an address at which an inserting is started;

a data size representing the size of data to be inserted; and at least one data to be inserted.

52. The method for processing a time-variant geographical traffic information according to claim 50, wherein each of said plurality of edit information blocks includes an edit command; and if said edit command is 'delete' command, each of said plurality of edit information blocks further comprising:

a start address representing an address at which an deleting is started; and a data size representing the size of data to be deleted.

53. The method for processing a time-variant geographical traffic information according to claim 50, wherein each of said plurality of edit information blocks includes an edit command; and if said edit command is 'overwrite' command, each of said plurality of edit information blocks further comprising:

a start address representing an address at which an overwriting is started;

a data size representing the size of data to be overwritten; and at least one data to be used for overwriting.

54. A method for processing time-variant geographical information at a user device comprising the steps of:

receiving a TVI(=time-variant information), said TVI including a map identifier and at least one time-variant data in section-wise;

selecting at least one section map based on the map identifier of said TVI, wherein said section map includes a plurality of sections, each section of said section map including at least one component;

designating an attribute of said component based on the time-variant data of said TVI in section-wise, so as to produce a graphic file for a region; and displaying an information-containing image in accordance with said graphic file.

55. The method for processing time-variant geographical information at a user device according to claim 54, wherein said component is vector entity.

56. The method for processing time-variant geographical information at a user device according to claim 54, wherein said component is a position value of a point within said region.

57. A traffic information device capable of being coupled to a display panel comprising:

receiver for receiving a TSI(=traffic state information), said TSI including a map identifier and at least one traffic state data in section-wise;

means for selecting at least one TSM(=traffic state map) based on the map identifier of said TSI, wherein said TSM includes at least one section and each section of said TSM includes an attribute designating statement and at least one vector entity, said attribute designating statement including an attribute designating command and at least one attribute value;

means for modifying the TSM using said TSI, each of said traffic state data of TSI being used for updating said attribute value of corresponding section of said TSM;

means for selecting at least one BM(=basic map) based on the map identifier of said TSI, said BM including an image data for representing time-invariant components in a region;

means for producing traffic information-containing image data in accordance with said BM and said TSM so as to apply the traffic information-containing image data to the display panel; and memory for storing said BM and said TSM.

58. The traffic information device according to claim 57, wherein said attribute value is color value.

59. The traffic information device according to claim according to claim 57, wherein said traffic information device further receives a RII(route indication information) including a map identification and a plurality of graphic vectors, each of said graphic vectors for RII including an attribute designating statement, a shape designating statement and a position designating statement, said attribute designating statement being composed of an attribute designating command and at least one attribute value; and said traffic information device further comprising:

means for selecting the basic map in accordance with said map identification of the RII; and means for producing a route-information containing image in accordance with said BM and said RII to the display panel.

60. The traffic information device according to claim 57, wherein said traffic information device further receives a MEI(=map edit information) which includes a map identification and a plurality of edit information blocks, and said traffic information device further comprising:

means for selecting one of said TSM and said BM in accordance with said map identification of MEI; and means for editing said selected map according to said plurality of edit information blocks.

61. The traffic information device according to claim 60, wherein each of said plurality of edit information blocks includes an edit command; and if said edit command is an 'insert' command, each of said plurality of edit information blocks further comprising:

a start address representing an address at which an inserting is started;

a data size representing the size of data to be inserted; and at least one data to be inserted.

62. The traffic information device according to claim 60, wherein each of said plurality of edit information blocks includes an edit command; and if said edit command is 'delete' command, each of said plurality of edit information blocks further comprising:

a start address representing an address at which an deleting is started; and a data size representing the size of data to be deleted.

63. The traffic information device according to claim 60, wherein each of said plurality of edit information blocks includes an edit command; and if said edit command is 'overwrite' command, each of said plurality of edit information blocks further comprising:

a start address representing an address at which an overwriting is started;

a data size representing the size of data to be overwritten; and at least one data to be used for overwriting.

64. Time-variant geographical information device capable of being coupled to a display panel, comprising:

a receiver for receiving a RII(route indication information) including a map identification and a plurality of graphic vectors, each of said graphic vectors for RII including an attribute designating statement, a shape designating statement and a position designating statement, said attribute designating statement being composed of an attribute designating command and at least one attribute value;

a memory for storing at least one BM(=basic map), said BM including an image data for representing time-invariant components in a region;

means for selecting a basic map in accordance with said map identification of the RII; and means for producing a route-information containing image in accordance with said BM and said RII, said route information-containing image representing at least one path to a specific location.

65. Time-variant geographical information device capable of being coupled to a display panel, comprising:

receiver a MEI(=map edit information) which includes a map identification and a plurality of edit information blocks;

memory for storing a plurality of maps, each map including an image data to be used for producing an information-containing geographical image;

means for selecting one of said plurality of maps in accordance with said map identification of MEI; and means for editing said selected map according to said plurality of edit information blocks.

66. The time-variant geographical information device according to claim 65, wherein each of said plurality of edit information blocks includes an edit command; and if said edit command is an 'insert' command, each of said plurality of edit information blocks further comprising:

a start address representing an address at which an inserting is started;

a data size representing the size of data to be inserted; and at least one data to be inserted.

67. The time-variant geographical information device according to claim 65, wherein each of said plurality of edit information blocks includes an edit command; and if said edit command is 'delete' command, each of said plurality of edit information blocks further comprising:

a start address representing an address at which an deleting is started; and a data size representing the size of data to be deleted.

68. The time-variant geographical information device according to claim 65, wherein each of said plurality of edit information blocks includes an edit command; and if said edit command is 'overwrite' command, each of said plurality of edit information blocks further comprising:

a start address representing an address at which an overwriting is started;

a data size representing the size of data to be overwritten; and at least one data to be used for overwriting.

69. Time-variant geographical information device capable of being coupled to a display panel comprising:

receiver a TVI(=time-variant information), said TVI including a map identifier and at least one time-variant data in section-wise;

means for selecting at least one section map based on the map identifier of said TVI, wherein said section map includes a plurality of sections, each section of said section map including at least one component;

means for designating an attribute of said component based on the time-variant data of said TVI in section-wise, so as to produce a graphic file for a region; and means for producing an information-containing image in accordance with said graphic file, so as to apply the information-containing image data to said display panel.

70. The time-variant geographical information device according to claim 69, wherein said component is vector entity.

71. The time-variant geographical information device according to claim 69, wherein said component is a position value of a point within said region.

72. Time-variant geographical information device capable of being coupled to a display panel, comprising:

a receiver for receiving a PII(Position indication information) including a map identification, at least one position vector entity and at least one text vector entity;

a memory for storing at least one BM(=basic map), said BM including an image data for representing time-invariant components in a region;

means for selecting a basic map in accordance with said map identification of the PII; and means for producing a position-indicative-information containing image data in accordance with said BM and said PII, so as to apply the position-indicative-information containing image data to the display panel.

73. A computer-readable medium containing a program for processing traffic information, comprising the steps of:

receiving a TSI(=traffic state information), said TSI including a map identifier and at least one traffic state data in section-wise;

retrieving at least one traffic section map in accordance with the map identifier of said TSI from a library of stored traffic section maps, wherein each of said traffic section maps includes a plurality of sections and each section includes at least one vector entity;

producing a TSM(=traffic state map) using said traffic section map and said TSI, each of said traffic state data of TSI being used for designating an attribute of said vector entity included in corresponding section of said traffic section map;

retrieving at least one BM(=basic map) in accordance with the map identifier of said TSI from a library of stored basic maps, said BM including an image data for time-invariant components in a region; and producing a traffic-information-containing image data in accordance with said BM and said TSM, said traffic-information-containing image data being to be applied to a display panel.

74. A computer-readable medium containing a program of instructions to perform a method for processing traffic information, said method comprising the steps of:

receiving a TSI(=traffic state information), said TSI including a map identifier and at least one traffic state data in section-wise;

retrieving at least one TSM(=traffic state map) based on the map identifier of said TSI from a library of stored TSMs, wherein said TSM includes at least one section and each section of said TSM includes an attribute designating statement and at least one vector entity, said attribute designating statement including an attribute designating command and at least one attribute value;

modifying the TSM using said, TSI, each of said traffic state data of TSI being used for updating said attribute value of corresponding section of said TSM;

retrieving at least one BM(=basic map) based on the map identifier of said TSI from a library of stored BMs, said BM including an image data for representing time-invariant components in a region; and producing a traffic-information-containing image data in accordance with said BM and said TSM, which is to be applied to a display panel.

75. The computer-readable medium containing a program of instructions to perform a method for processing traffic information according to claim 74, said method further comprising the steps of:

receiving a RII(route indication information) including a map identification and a plurality of graphic vectors, each of said graphic vectors for RII including an attribute designating statement, a shape designating statement and a position designating statement, said attribute designating statement being composed of an attribute designating command and at least one attribute value; and retrieving the basic map in accordance with said map identification of the RII; and producing a route-information containing image data in accordance with said BM and said RII, which is to be applied to the display panel.

76. The computer-readable medium containing a program of instructions to perform a method for processing traffic information according to claim 74, said method further comprising the steps of:

receiving a MEI(=map edit information) which includes a map identification and a plurality of edit information blocks;

selecting one of said TSM and said BM in accordance with said map identification of MEI; and editing said selected map according to said plurality of edit information blocks.

77. A computer-readable medium containing a program of instructions to perform a method for processing a route information representing at least one path to a specific location, said method comprising the steps of:

receiving a RII(route indication information) including a map identification and a plurality of graphic vectors, each of said graphic vectors for RII including an attribute designating statement, a shape designating statement and a position designating statement, said attribute designating statement being composed of an attribute designating command and at least one attribute value; and selecting a basic map in accordance with said map identification of the RII, said BM including an image data for representing time-invariant components in a region; and producing a route-information containing image data in accordance with said BM and said RII which is to be applied to a display panel.

78. A computer-readable medium containing a program of instructions to perform a method for a time-variant geographical traffic information, said method comprising the steps of:

receiving a MEI(=map edit information) which includes a map identification and a plurality of edit information blocks;

selecting one of a plurality of maps in accordance with said map identification of MEI, each map including an image data to be used for producing an information-containing geographical image; and editing said selected map according to said plurality of edit information blocks.

79. A computer-readable medium containing a program of instructions to perform a method for a time-variant geographical traffic information, said method comprising the steps of:

receiving a TVI(=time-variant information), said TVI including a map identifier and at least one time-variant data in section-wise;

selecting at least one section map based on the map identifier of said TVI, wherein said section map includes a plurality of sections, each section of said section map including at least one component;

designating an attribute of said component based on the time-variant data of said TVI in section-wise, so as to produce a graphic file for a region; and producing an information-containing image data in accordance with said graphic file, which is to be applied to a display panel.

80. A method for providing time-variant geographical information to a user device storing at least one basic map including a map identification and an image data, said map identification of the basic map representing a region covered by the basic map, comprising the step of:

transmitting a PII(position indication information) including a map identification, at least one position vector entity and at least one text vector entity, to the user device, wherein said map identification of PII is used for selecting at least one suitable basic map at the user device; and wherein said user device displays a position-indicative-information containing image in accordance with said selected BM and said PII.

81. A method for processing time-variant geographical information at a user device comprising the steps of:

receiving a PII(Position indication information) including a map identification, at least one position vector entity and at least one text vector entity;

selecting a basic map in accordance with said map identification of the PII from a library of stored BM(=basic map)s, each of said BM including an image data for representing time-invariant components in a region; and producing a position-indicative-information containing image data in accordance with said selected BM and said PH, which is to be applied to a display panel coupled to the user device.

82. A computer-readable medium containing a program of instructions to perform a method for processing time-variant geographical information, said method comprising the steps of:

receiving a PII(Position indication information) including a map identification, at least one position vector entity and at least one text vector entity;

retrieving a basic map in accordance with said map identification of the PII from a library of stored BM(= basic map)s, each of said BM including an image data for representing time-invariant components in a region; and producing a position-indicative-information containing image data in accordance with said selected BM and said PII, which is to be applied to a display panel coupled to the user device.

83. An apparatus for providing traffic information through a network to a user device comprising:

means for generating a TSI(=traffic state information) so as to provide the TSI to the user device, wherein said user device stores at least one basic map and at least one traffic section map;

wherein said traffic section map includes at least one section including at least one vector entity; and wherein said TSI comprises:

a map identifier to be used for selecting a suitable traffic section map which corresponds to said TSI at the user device; and at least one traffic state data in section-wise, wherein each of said traffic state data is to be used for designating an attribute of said vector entity included in corresponding section of said traffic section map.

84. The apparatus for providing traffic information according to claim 83, wherein said user device further stores at least one basic map.

85. The apparatus for providing traffic information according to claim 83, wherein each section of said traffic section map further includes a section discriminating code.

86. The apparatus for providing traffic information according to claim 85, wherein said section discriminating code is an attribute designating command.

87. The apparatus for providing traffic information according to claim 86, wherein said section discriminating code is a color designating command.

88. The apparatus for providing traffic information according to claim 87, wherein said traffic state data is a color value.

89. The apparatus for providing traffic information according to claim 83, wherein said map identifier comprises a version identification.

90. The apparatus for providing traffic information according to claim 83, wherein said traffic state data for one section includes a forward color value and a backward color value.

91. The apparatus for providing traffic information according to claim 83, wherein each of said traffic state data includes a data type flag having a first value or a second value;

said first value being indicative of ‘no change’; and said second value being followed by a ‘changed traffic state data.’

92. The apparatus for providing traffic information according to claim 83, further comprising:

means for generating the traffic section map so as to provide the traffic section map to the user device through the network; and wherein said traffic section map includes a map identification and a plurality of sections; and wherein said section of the traffic section map comprises:

an attribute designating command; and at least one vector entity.

93. The apparatus for providing traffic information according to claim 92, wherein said attribute designating command is used as a section discriminating code.

94. The apparatus for providing traffic information according to claim 93, wherein said section of the traffic section map further comprises at least one attribute value.

95. The apparatus for providing traffic information according to claim 94, further comprising the step of:

means for generating a MEI(=map edit information) which includes a map identification and a plurality of edit information blocks, wherein said map identification of MEI is to be used for selecting a map to be edited; and wherein each of said plurality of edit information blocks includes an edit command.

96. The apparatus for providing traffic information according to claim 94, wherein said attribute value includes a forward color and a backward color.

97. The apparatus for providing traffic information according to claim 83, further comprising:

means for generating a basic map including a map identification and an image data, so as to provide the basic map to the user device through the network, wherein said map identification representing a region covered by the basic map.

98. The apparatus for providing traffic information according to claim 83, further comprising:

means for generating a RII(route indication information) including a map identification and a plurality of graphic vectors, so as to provide the RII to the user device through the network, wherein said user device stores at least one basic map including a map identification and an image data, said map identification of the basic map representing a region covered by the basic map;

wherein said map identification of RII is used for selecting at least one suitable basic map at the user device; and wherein each of said graphic vectors for RII including an attribute designating statement, a shape designating statement and a position designating statement, said attribute designating statement being composed of an attribute designating command and at least one attribute value.

99. The apparatus for providing traffic information according to claim 83, wherein each of said traffic state data in section-wise of TSI includes a section number and at least one section value.

100. The apparatus for providing traffic information according to claim 83, wherein said section value is color value.

101. An apparatus for providing a geographical information to a user device including at least one map to be used for displaying an information-containing image, comprising:

means for generating a MEI(=map edit information) which includes a map identification and a plurality of edit information blocks, so as to provide the MEI to the user device through a network, wherein said map identification of MEI is to be used for selecting a map to be edited; and wherein each of said plurality of edit information blocks includes an edit command.

102. The apparatus for providing a geographical information according to claim 101, wherein, if said edit command is 'insert' command, each of said plurality of edit information blocks further comprises:

a start address representing an address at which an inserting is started;

a data size representing the size of data to be inserted; and at least one data to be inserted.

103. The apparatus for providing a geographical information according to claim 101, wherein, if said edit command is 'delete' command, each of said plurality of edit information blocks further comprises:

a start address representing an address at which an deleting is started; and a data size representing the size of data to be deleted.

104. The apparatus for providing a geographical information according to claim 101, wherein, if said edit command is 'overwrite' command, each of said plurality of edit information blocks further comprises:

a start address representing an address at which an overwriting is started;

a data size representing the size of data to be overwritten; and at least one data to be used for overwriting.

105. An apparatus for providing time-variant geographical information to a user device storing at least one basic map including a map identification and an image data, said map identification of the basic map representing a region covered by the basic map, comprising:

means for generating a RII(route indication information) including a map identification and a plurality of graphic vectors, so as to provide the RII to the user device through a network, said RII and said basic map being used for producing an information-containing image at the user device, wherein said map identification of RII is used for selecting at least one suitable basic map at the user device; and wherein each of said graphic vectors for RII including an attribute designating statement, a shape designating statement and a position designating statement, said attribute designating statement being composed of an attribute designating command and at least one attribute value.

106. An apparatus for providing a time-variant geographical information to a user device through a network, comprising:

means for generating a TVI(=time-variant information) so as to provide the TVI to the user device, wherein said user device stores at least one section map;

wherein said section map includes at least one section including at least one component; and wherein said TVI comprises:

a map identifier to be used for selecting a suitable section map which corresponds to said TVI, at the user device; and at least one time-variant data in section-wise, wherein each of said time-variant data is to be used for updating at least one component included in corresponding section of said section map.

107. The apparatus for providing time-variant geographical information according to claim 106, wherein the section of said section map includes at least one vector entity, and wherein said time-variant value is to be used for designating an attribute of at least one vector entity included in corresponding section of said section map.

* * * * *